United States Patent
Huang et al.

(10) Patent No.: US 10,980,001 B2
(45) Date of Patent: Apr. 13, 2021

(54) COMMUNICATION METHOD FOR IMPLEMENTING DUAL CARD DUAL STANDBY DUAL PASS AND TERMINAL

(71) Applicant: Huawei Technologies Co., Ltd., Shenzhen (CN)

(72) Inventors: Bin Huang, Shanghai (CN); Delai Zheng, Shanghai (CN); Fengguang Qiu, Shanghai (CN); Bao Zhang, Shanghai (CN); Xu Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/497,250

(22) PCT Filed: May 9, 2017

(86) PCT No.: PCT/CN2017/083656
§ 371 (c)(1),
(2) Date: Sep. 24, 2019

(87) PCT Pub. No.: WO2018/171012
PCT Pub. Date: Sep. 27, 2018

(65) Prior Publication Data
US 2020/0245292 A1  Jul. 30, 2020

(30) Foreign Application Priority Data

Mar. 24, 2017  (CN) .......................... 201710184912.2

(51) Int. Cl.
*H04W 68/12*   (2009.01)
*H04W 76/16*   (2018.01)
*H04W 88/06*   (2009.01)

(52) U.S. Cl.
CPC .......... *H04W 68/12* (2013.01); *H04W 76/16* (2018.02); *H04W 88/06* (2013.01)

(58) Field of Classification Search
CPC ..... H04W 68/12; H04W 76/16; H04W 88/06; H04W 68/00; H04W 68/02;
(Continued)

(56) References Cited

U.S. PATENT DOCUMENTS 7,945,273 B2 *  5/2011  Flint .............................. 455/458
8,934,460 B1    1/2015  Hu et al.
(Continued)

FOREIGN PATENT DOCUMENTS

CN    101621865 A    1/2010
CN    104053220 A    9/2014
(Continued)

OTHER PUBLICATIONS

Machine Translation and Abstract of Chinese Publication No. CN101621865, Jan. 6, 2010, 22 pages.
(Continued)

*Primary Examiner* — Meless N Zewdu
(74) *Attorney, Agent, or Firm* — Conley Rose, P.C.

(57) ABSTRACT

A terminal supporting dual receive single transmit dual card dual standby single pass DR-DSDS includes a first SIM card interface and a second SIM card interface. The first SIM card interface is configured to communicate with a first SIM card, and the second SIM card interface is configured to communicate with a second SIM card. A method includes, when the terminal is in a first communications connection, receiving a paging request for setting up a second communications connection. The method further includes, when the terminal receives the paging request for the second communications connection, if the terminal has a to-be-sent voice packet of the first communications connection, delaying, by the ter-
(Continued)

minal, responding to the paging request for setting up the second communications connection, or if the terminal has no to-be-sent voice packet of the first communications connection, responding to the paging request for setting up the second communications connection.

20 Claims, 35 Drawing Sheets

(58) Field of Classification Search
CPC ... H04W 68/005; H04W 64/00; H04W 88/08; H04W 88/18; H04W 4/50; H04W 4/60; H04W 64/003; H04W 88/02; H04W 88/00; H04W 88/023; H04W 92/00; H04W 92/10; H04W 92/08; H04W 84/027; H04W 84/025; H04W 84/02; H04W 36/0027; H04W 36/28; H04B 5/00; H04B 5/04; H04B 7/0413; H04B 5/02; H04B 7/0452; H04B 10/2581; H04B 1/44; H04B 1/50; H04B 2001/485; H04B 1/58; H04M 2207/00; H04M 2215/8137; H04M 2215/8133; H04M 2203/4581; H04M 1/725; H04M 2250/66; H04M 1/72522; H04M 3/42246
See application file for complete search history.

(56) References Cited

U.S. PATENT DOCUMENTS

| | | | | |
|---|---|---|---|---|
| 2002/0046287 | A1* | 4/2002 | LaPorta et al. | 709/230 |
| 2009/0156257 | A1 | 6/2009 | Shi | |
| 2011/0217969 | A1 | 9/2011 | Spartz et al. | |
| 2013/0150013 | A1 | 6/2013 | Liu et al. | |
| 2013/0244626 | A1 | 9/2013 | Isidore | |
| 2013/0316718 | A1* | 11/2013 | Hsu et al. | H04W 72/1278 |
| 2014/0273974 | A1 | 9/2014 | Varghese et al. | |
| 2014/0364118 | A1 | 12/2014 | Belghoul et al. | |
| 2015/0023258 | A1* | 1/2015 | Hu et al. | H04W 76/026 |
| 2015/0222748 | A1 | 8/2015 | Liu et al. | |
| 2015/0282083 | A1* | 10/2015 | Jeong et al. | H04W 52/0225 |
| 2015/0289221 | A1 | 10/2015 | Nayak et al. | |
| 2016/0135213 | A1* | 5/2016 | Zhu et al. | H04W 72/1278 |
| 2016/0142960 | A1 | 5/2016 | Liu et al. | |
| 2016/0262200 | A1* | 9/2016 | Su | H04W 76/025 |
| 2016/0301790 | A1* | 10/2016 | Kanamarlapudi et al. | H04M 1/575 |
| 2016/0302114 | A1* | 10/2016 | Jain et al. | H04W 36/0083 |
| 2018/0115978 | A1* | 4/2018 | Shi et al. | H04W 72/10 |

FOREIGN PATENT DOCUMENTS

| | | | | |
|---|---|---|---|---|
| CN | 104754643 | A | 7/2015 | |
| CN | 104954546 | A | 9/2015 | |
| CN | 105338178 | A | 2/2016 | |
| CN | 105611588 | A | 5/2016 | |
| CN | 106131808 | A | 11/2016 | |
| CN | 106330242 | A | 1/2017 | |
| CN | 105338178 | A * | 6/2019 | H04W 88/06 |
| EP | 2472973 | A1 | 7/2012 | |
| JP | 2016518744 | A | 6/2016 | |
| KR | 20130066531 | A | 6/2013 | |
| WO | 2015127588 | A1 | 9/2015 | |
| WO | 2016164149 | A1 | 10/2016 | |

OTHER PUBLICATIONS

Machine Translation and Abstract of Chinese Publication No. CN104954546, Sep. 30, 2015, 13 pages.
Machine Translation and Abstract of Chinese Publication No. CN105338178, Feb. 17, 2016, 16 pages.
Machine Translation and Abstract of Chinese Publication No. CN106330242, Jan. 11, 2017, 21 pages.
Foreign Communication From A Counterpart Application, European Application No. 17901765.2, Extended European Search Report dated Nov. 27, 2019, 7 pages.
Foreign Communication From A Counterpart Application, PCT Application No. PCT/CN2017/083656, English Translation of International Search Report dated Dec. 27, 2017, 2 pages.
Foreign Communication From A Counterpart Application, PCT Application No. PCT/CN2017/083656, English Translation of Written Opinion dated Dec. 27, 2017, 4 pages.
Machine Translation and Abstract of Chinese Publication No. CN104053220, Sep. 17, 2014, 11 pages.
Machine Translation and Abstract of Chinese Publication No. CN104754643, Jul. 1, 2015, 19 pages.
Machine Translation and Abstract of Chinese Publication No. CN106131808, Nov. 16, 2016, 15 pages.
Foreign Communication From A Counterpart Application, Chinese Application No. 201780033962.9, Chinese Office Action dated Dec. 23, 2019, 6 pages.

* cited by examiner

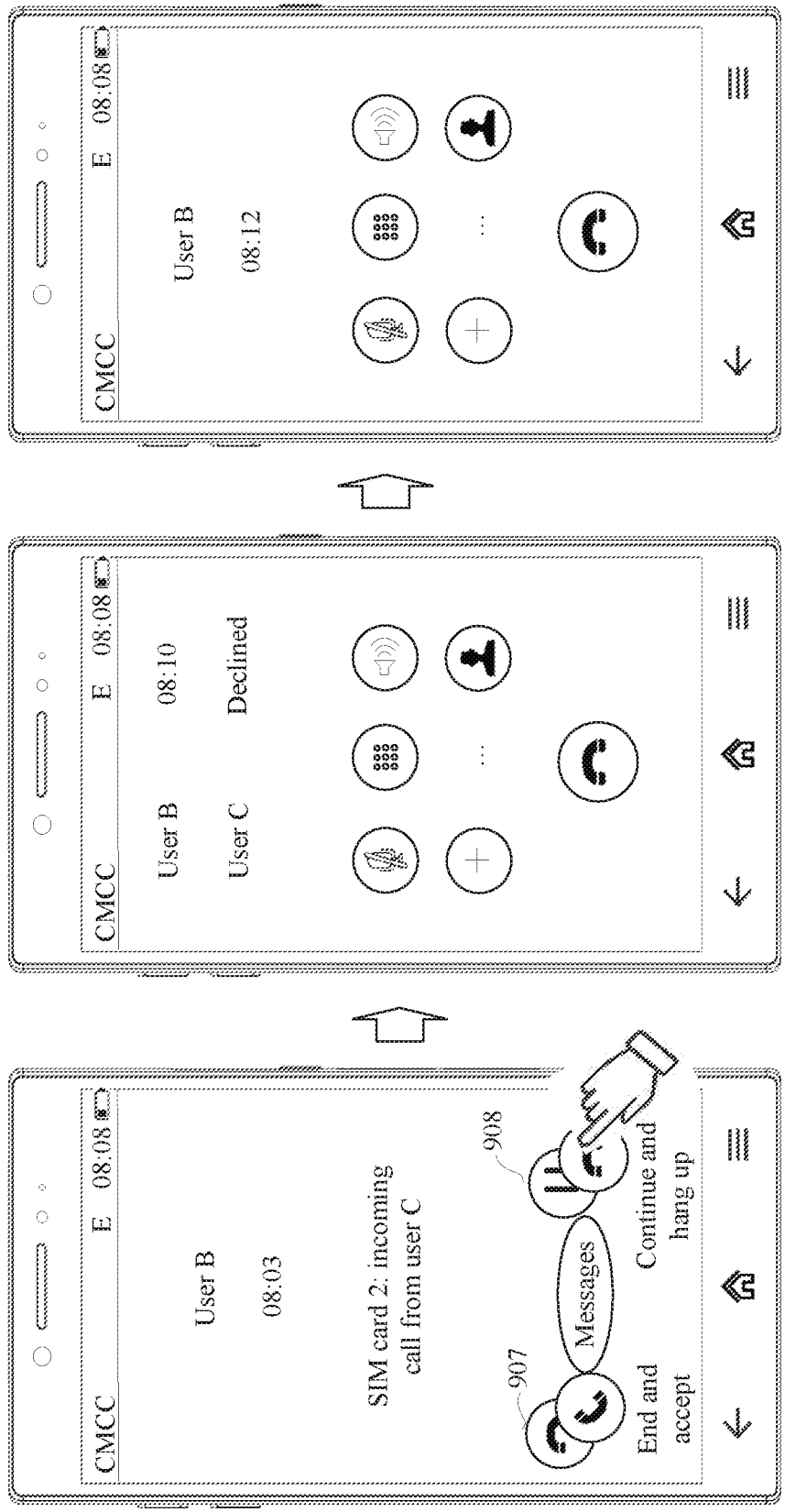

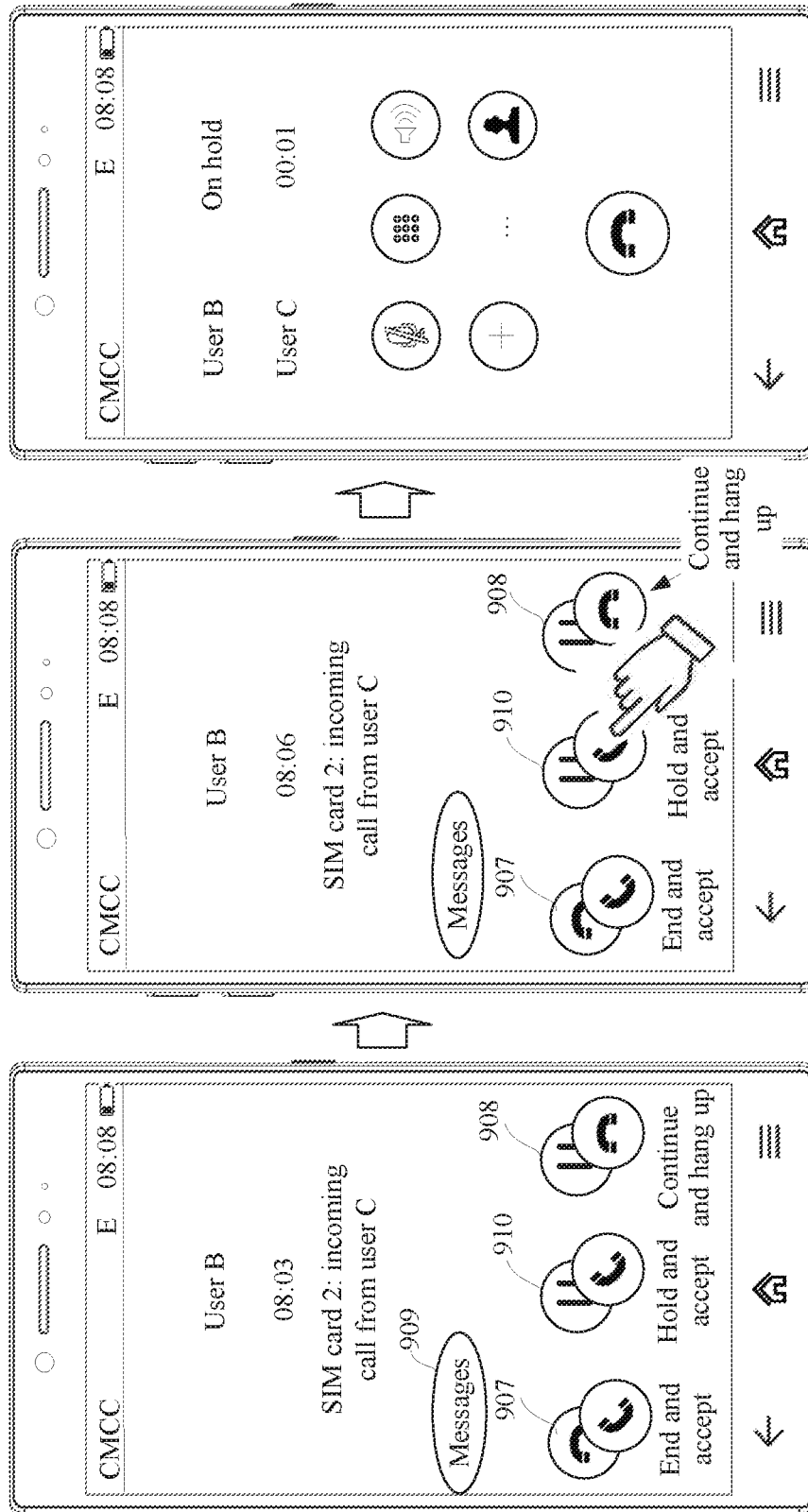

```
                    CONT.
                    FROM
                    FIG. 21B

CONT.
         FROM
         FIG. 21B

CONT.                 S1801'. Transmit a data packet on the radio frequency Tx channel according to a fourth priority rule
FROM
FIG. 21B              S509'. Give an incoming call notification of the SIM card 1

Yes, and hold
                                                              the voice
                                                              communication
                                                              of the SIM card
                                                              2
                      S510'. Determine whether a user accepts an incoming
                      call request for the SIM card 1

Yes, and end the           S511'. End the voice communication of the SIM card 2,
                                    voice communication        and perform voice communication with the terminal 130 by
                                    of the SIM card 2          using the SIM card 1 of the terminal 110

S512'. Hold voice communication between the SIM card 2
                                                               and the terminal 120, and perform voice communication
                                                               with the terminal 130 by using the SIM card 1

CONT.          No
FROM
FIG. 21B
```

FIG. 21C

COMMUNICATION METHOD FOR IMPLEMENTING DUAL CARD DUAL STANDBY DUAL PASS AND TERMINAL

This application is a national stage of International Application No. PCT/CN2017/083656, filed on May 9, 2017, which claims priority to Chinese Patent Application No. 201710184912.2, filed on Mar. 24, 2017. Both of the aforementioned applications are hereby incorporated by reference in their entireties.

TECHNICAL FIELD

Embodiments of the present invention relate to the field of communications technologies, and in particular, to a communication method for implementing dual card dual standby dual pass and a terminal.

BACKGROUND

With the development of communications technologies, many mobile terminals (such as mobile phones) have a dual card dual standby function. Dual card dual standby means that two subscriber identity module (Subscriber Identity Module, SIM) cards are installed on a mobile phone, and the two SIM cards can be on a network and in a standby state at the same time.

Dual card dual standby single pass (Dual SIM Dual Standby, DSDS) is a common dual card dual standby solution. One set of transmit and receive radio frequencies are configured in a DSDS mobile phone, and when the mobile phone is in a standby state, the two SIM cards may perform monitoring and paging in a time division manner. However, because only one set of transmit and receive radio frequencies are configured in the DSDS mobile phone, the DSDS mobile phone can implement only dual card dual standby, but the two cards cannot perform communication at the same time. For example, when one SIM card uses transmit and receive radio frequencies to transmit voice data, because the SIM card completely occupies radio frequency resources, the other SIM card cannot receive a paging (paging) request due to unavailability of radio frequency resources, causing a failure in answering a call.

To implement dual card dual standby dual pass of the mobile phone, a dual card dual standby dual pass (Dual SIM Dual pass. DSDA) technology is applied to the mobile phone. Two sets of transmit and receive radio frequencies are configured in the DSDA mobile phone. In other words, each SIM has one independent set of transmit and receive radio frequencies. Consequently, even if one SIM card uses one set of transmit and receive radio frequencies to transmit voice data, the other SIM card can use the other set of transmit and receive radio frequencies to receive a paging paging message and answer a call. However, it is relatively costly to configure two sets of transmit and receive radio frequencies in the DSDA mobile phone. In addition, configuring two sets of transmit and receive radio frequencies occupies a relatively large layout area, and increases a size of the mobile phone.

Currently, a mobile phone supporting dual receive single transmit DSDS (Dual Receive-DSDS, DR-DSDS) is proposed. In comparison with the DSDA mobile phone, only one radio frequency transmit (Transmit, Tx) channel and two radio frequency receive (Receive, Rx) channels are configured in the DR-DSDS mobile phone. Therefore, a layout area occupied by a radio frequency circuit can be reduced, reducing costs of the mobile phone.

Two radio frequency receive (Rx) channels are configured in the DR-DSDS mobile phone, and when one SIM card transmits voice data, the other SIM card can receive a paging paging message. However, only one radio frequency transmit (Tx) channel is configured in the DR-DSDS mobile phone. Therefore, when one SIM card transmits voice data and occupies the radio frequency transmit channel, the other SIM card cannot answer a call due to unavailability of radio frequency transmit channels for setting up a connection to a network device. In other words, the DR-DSDS mobile phone cannot implement dual card dual standby dual pass, that is, cannot implement ringing for an incoming call of one SIM card when the other SIM card performs a voice call, which brings relatively great inconvenience to a user.

SUMMARY

This application provides a communication method for implementing dual card dual standby dual pass and a terminal, to implement dual card dual standby dual pass of a terminal supporting DR-DSDS, and improve user experience.

To achieve the foregoing objectives, this application uses the following technical solutions:

According to a first aspect, this application provides a communication method for implementing dual card dual standby dual pass, where the method is applied to a terminal supporting DR-RSDS, the terminal includes a first SIM card interface and a second SIM card interface, the first SIM card interface is configured to communicate with a first SIM card, and the second SIM card interface is configured to communicate with a second SIM card. The method includes: when the terminal is in a first communications connection (in other words, the terminal is in a call state related to the first SIM card), receiving a paging request for setting up a second communications connection related to the second SIM card (namely, the paging request for the second SIM card); and when the terminal receives the paging request for the second communications connection, if the terminal has a to-be-sent voice packet of the first communications connection, delaying, by the terminal, responding to the paging request for setting up the second communications connection, or if the terminal has no to-be-sent voice packet of the first communications connection, immediately responding, by the terminal, to the paging request for setting up the second communications connection.

In this application, when the terminal is in the first communications connection (in other words, the terminal is in the call state related to the first SIM card), if the terminal receives the paging request for the second SIM card, the terminal may delay responding to the paging request when the terminal has the to-be-sent voice packet of the first communications connection (in other words, there is a voice packet of the first SIM card to be transmitted on a radio frequency Tx resource). In other words, the terminal may respond to the paging request only when the terminal 110 has no to-be-sent voice packet of the first communications connection (in other words, there is no voice packet of the first SIM card to be transmitted on the radio frequency Tx resource). In this way, the terminal may give an incoming call notification of the second SIM card in response to the paging request for the second SIM card without affecting voice call quality of the first SIM card.

In conclusion, according to this solution, the terminal can implement dual card dual standby dual pass of the terminal without affecting voice call quality of a call card, to improve user experience.

With reference to the first aspect, in a first possible implementation, the paging request for setting up the second communications connection may be used to request to perform a VoLTE voice service, or may be used to request to perform a common data service (such as a network access data service). In this application, the terminal can determine whether the second communications connection is a voice call related to the second SIM card; and when determining that the second communications connection is not the voice call related to the second SIM card, continue to process the first communications connection.

With reference to the first aspect, in a second possible implementation, the paging request for the second communications connection may be a paging request of a Long Term Evolution (Long Term Evolution, LTE) network. After receiving the paging request of the LTE network, the terminal cannot determine whether the paging request is used to request to perform a VoLTE voice service, or is used to request to perform a common data service (such as a network access data service). The terminal may determine, based on an INVITE message that is sent by a network device and that is received after an RRC connection is set up, whether the second communications connection is the voice call related to the second SIM card. Specifically, the foregoing determining, by the terminal, whether the second communications connection is a voice call related to the second SIM card includes: sending, by the terminal to the network device, radio resource control (Radio Resource Control, RRC) signaling for setting up the RRC connection, and sending SIP signaling to the network device; and determining, based on whether the terminal is able to receive the INVITE message, whether the second communications connection is the voice call related to the second SIM card.

After the terminal sets up the RRC connection to the network device, if the paging request is used to request to perform a VoLTE voice service, the network device may send the INVITE (Invite) message (namely, the INVITE message of the second communications connection) to the terminal.

With reference to the first possible implementation, in a third possible implementation, the paging request may be a paging request of a circuit switched (Circuit Switched, CS) domain service. The paging request of the CS domain service may directly indicate that the paging request is used to request to perform a CS domain service, and the terminal does not need to wait for receiving the INVITE message to determine whether the paging request is used to request to perform a CS domain service or a common data service. Specifically, the foregoing determining, by the terminal, whether the second communications connection is a voice call related to the second SIM card includes: determining, based on the paging request for setting up the second communications connection, whether the second communications connection is the voice call related to the second SIM card.

With reference to any one of the first to the third possible implementations, when determining that the second communications connection is the voice call related to the second SIM card, the terminal may give an incoming call notification of the second communications connection. If the second communications connection is the voice call related to the second SIM card, the terminal may set up the RRC connection to the network device. After setting up the RRC connection, the terminal exchanges the Session Initiation Protocol (Session Initiation Protocol, SIP) signaling with the network device to obtain incoming call information corresponding to the second communications connection from the network device, and give an incoming call notification of the second communications connection.

With reference to the fourth possible implementation, in a fifth possible implementation, to ensure that the terminal can exchange the SIP signaling of the second communications connection with the network device to obtain the incoming call information of the second communications connection, and give an incoming call notification of the second communications connection, a priority for sending an uplink data packet of the second communications connection by the terminal is higher than a priority for sending an uplink data packet of the first communications connection before the terminal gives an incoming call notification of the second communications connection. To be specific, before the terminal gives an incoming call notification of the second communications connection, the terminal transmits the uplink data packet on the radio frequency transmit resource according to a second priority rule. The second priority rule may be set as follows: A transmit priority of the uplink data packet of the second communications connection on the radio frequency transmit resource is higher than a transmit priority of the uplink data packet of the first communications connection on the radio frequency transmit resource.

With reference to the fourth possible implementation or the fifth possible implementation, in a sixth possible implementation, to preferentially ensure voice communication quality of the first SIM card, when the terminal gives an incoming call notification of the second communications connection, a priority for sending an uplink voice packet of the first communications connection by the terminal is higher than a priority for sending an uplink signaling packet of the second communications connection. For example, after the terminal receives the incoming call information sent by the network device, the priority for sending the uplink voice packet of the first communications connection by the terminal is higher than the priority for sending the uplink signaling packet of the second communications connection. Alternatively, after the terminal sends the SIP signaling used to obtain the incoming call information to the network device, the priority for sending the uplink voice packet of the first communications connection by the terminal is higher than the priority for sending the uplink signaling packet of the second communications connection.

To be specific, when the terminal gives an incoming call notification of the second communications connection, the terminal transmits the uplink data packet on the radio frequency transmit resource according to a first priority rule. The first priority rule may be set as follows: A transmit priority of the uplink voice packet of the first communications connection on the radio frequency transmit resource is higher than a transmit priority of the uplink signaling packet of the second communications connection on the radio frequency transmit resource.

With reference to any one of the first to the fourth possible implementations, in a seventh possible implementation, it is assumed that the first SIM card is a primary SIM card of the terminal, the second SIM card is a secondary SIM card of the terminal, and a network access data service of the terminal is on the first SIM card. After the terminal gives an incoming call notification, the method in this application may further include: when the terminal ends the first communications connection and is in the second communications connection, a priority for sending an uplink voice packet of the second communications connection by the terminal is higher than a priority for sending an uplink network access data packet of the first communications connection. To be specific, when the terminal ends the first communications connection and is in the second communications connection, the terminal transmits the uplink data packet on the radio frequency transmit resource according to a third priority rule.

The third priority rule may be as follows: (1) A transmit priority of a high-priority packet of the call card on a radio frequency Tx channel is higher than a transmit priority of a network access data service packet of an access card on the radio frequency Tx channel; and (2) the transmit priority of the network access data service packet of the access card on the radio frequency Tx channel is higher than a transmit priority of low-priority packets of the two cards on the radio frequency Tx channel. For details about the high-priority packet of the call card and low-priority packets of the two cards, refer to related term descriptions in the embodiments of this application. Details are not described herein in this application.

It can be understood that, although the first SIM card of the terminal ends voice communication, there is a network access data service on the first SIM card. To ensure that the network access data service of the first SIM card is normally performed without imposing relatively great impact on voice communication quality of the second SIM card, the terminal can transmit the uplink data packet on the radio frequency transmit resource according to the third priority rule.

According to a second aspect, this application provides a terminal, where the terminal supports DR-RSDS, the terminal includes a first SIM card interface and a second SIM card interface, the first SIM card interface is configured to communicate with a first SIM card, and the second SIM card interface is configured to communicate with a second SIM card. The terminal includes: a receiving module, a sending module, and a responding module. The receiving module is configured to: when the terminal is in a first communications connection, receive a paging request for setting up a second communications connection, where the first communications connection is a voice call related to the first SIM card, and the second communications connection is related to the second SIM card. The sending module is configured to send a voice packet of the first communications connection when the terminal is in the first communications connection. The responding module is configured to: when the receiving module receives the paging request for the second communications connection, if the sending module has a to-be-sent voice packet of the first communications connection, delay responding to the paging request for setting up the second communications connection; or if the sending module has no to-be-sent voice packet of the first communications connection, respond to the paging request for setting up the second communications connection.

With reference to the second aspect, in a first possible implementation, the terminal further includes: a determining module. The determining module is configured to determine whether the second communications connection is a voice call related to the second SIM card. The sending module is further configured to: when the determining module determines that the second communications connection is not the voice call related to the second SIM card, continue to send the voice packet of the first communications connection.

With reference to the first possible implementation, in a second possible implementation, the sending module is further configured to send, to a network device, RRC signaling for setting up an RRC connection, and send SIP signaling to the network device. The receiving module is further configured to receive an INVITE message sent by the network device. The determining module is specifically configured to determine, based on whether the receiving module is able to receive the INVITE message, whether the second communications connection is the voice call related to the second SIM card.

With reference to the first possible implementation, in a third possible implementation, the determining module is specifically configured to determine, based on the paging request, received by the receiving module, for setting up the second communications connection, whether the second communications connection is the voice call related to the second SIM card.

With reference to any one of the first to the third possible implementations, in a fourth possible implementation, the terminal may further include: an incoming call notification module. The incoming call notification module is configured to: when the determining module determines that the second communications connection is the voice call related to the second SIM card, give an incoming call notification of the second communications connection.

With reference to the fourth possible implementation, in a fifth possible implementation, before the incoming call notification module gives an incoming call notification of the second communications connection, a priority for sending an uplink data packet of the second communications connection by the sending module is higher than a priority for sending an uplink data packet of the first communications connection.

With reference to the fourth possible implementation, in a sixth possible implementation, when the incoming call notification module gives an incoming call notification of the second communications connection, a priority for sending an uplink voice packet of the first communications connection by the sending module is higher than a priority for sending an uplink signaling packet of the second communications connection.

With reference to any one of the first to the sixth possible implementations, in a seventh possible implementation, after the incoming call notification module gives an incoming call notification of the second communications connection, when the terminal ends the first communications connection and is in the second communications connection, a priority for sending an uplink voice packet of the second communications connection by the sending module is higher than a priority for sending an uplink network access data packet of the first communications connection.

It should be noted that, for the first priority rule and the second priority rule in the second aspect or any possible implementation of the second aspect in this application, reference may be made to detailed descriptions in the possible implementations of the first aspect. Details are not described herein again in this application.

According to a third aspect, this application provides a terminal, where the terminal supports DR-DSDS, and the terminal includes: one or more processors, a memory, a communications interface, a first SIM card interface, and a second SIM card interface. The memory, the communications interface, the first SIM card interface, and the second SIM card interface are coupled to the one or more processors; and the first SIM card interface is configured to communicate with a first SIM card, the second SIM card interface is configured to communicate with a second SIM card, and the communications interface includes two radio frequency receive channels (for example, a radio frequency receive channel 1 and a radio frequency receive channel 2) and one radio frequency transmit channel. For example, the radio frequency receive channel 1 is configured to receive a downlink data packet of a first communications connection, and the radio frequency receive channel 2 is configured to receive a downlink data packet of a second communications connection.

The memory is configured to store computer program code, where the computer program code includes an instruction, and when the one or more processors execute the instruction, the terminal performs the communication method for implementing dual card dual standby dual pass according to the first aspect or any possible implementation of the first aspect in this application.

Specifically, the communications interface is configured to: When the terminal is in the first communications connection, receive a paging request for setting up the second communications connection, where the first communications connection is a voice call related to the first SIM card, and the second communications connection is related to the second SIM card; and the one or more processors are configured to: when the radio frequency receive channel 1 receives the paging request for the second communications connection, if the radio frequency transmit channel has a to-be-sent voice packet of the first communications connection, delay responding to the paging request for setting up the second communications connection; or if the radio frequency transmit channel has no to-be-sent voice packet of the first communications connection, respond to the paging request for setting up the second communications connection.

With reference to the third aspect, in a first possible implementation, the one or more processors are further configured to determine whether the second communications connection is a voice call related to the second SIM card; and when determining that the second communications connection is not the voice call related to the second SIM card, continue to process the first communications connection.

With reference to the first possible implementation, in a second possible implementation, the communications interface is further configured to send, to a network device through the radio frequency transmit channel, RRC signaling for setting up an RRC connection, and send SIP signaling to the network device. The one or more processors are further configured to determine, based on whether the radio frequency receive channel 2 can receive an INVITE message, whether the second communications connection is the voice call related to the second SIM card.

With reference to the first possible implementation, in a third possible implementation, that the one or more processors are configured to determine whether the second communications connection is a voice call related to the second SIM card includes: the one or more processors are configured to determine, based on the paging request, received on the radio frequency receive channel 2, for setting up the second communications connection, whether the second communications connection is the voice call related to the second SIM card.

With reference to any one of the first to the third possible implementations, in a fourth possible implementation, the one or more processors are further configured to: when determining that the second communications connection is the voice call related to the second SIM card, give an incoming call notification of the second communications connection.

With reference to the fourth possible implementation, in a fifth possible implementation, before the one or more processors give an incoming call notification of the second communications connection, a priority for sending an uplink data packet of the second communications connection on the radio frequency transmit channel is higher than a priority for sending an uplink data packet of the first communications connection.

With reference to the fourth possible implementation or the fifth possible implementation, in a sixth possible implementation, when the one or more processors give an incoming call notification of the second communications connection, a priority for sending an uplink voice packet of the first communications connection on the radio frequency transmit channel is higher than a priority for sending an uplink signaling packet of the second communications connection.

With reference to any one of the first to the fourth possible implementations, in a seventh possible implementation, after the one or more processors give an incoming call notification of the second communications connection, when the one or more processors end the first communications connection and are in the second communications connection, a priority for sending an uplink voice packet of the second communications connection on the radio frequency transmit channel is higher than a priority for sending an uplink network access data packet of the first communications connection.

According to a fourth aspect, this application provides a computer storage medium, where the computer storage medium includes a computer instruction, and when the computer instruction runs on a terminal supporting DR-RSDS, the terminal performs the communication method for implementing dual card dual standby dual pass according to the first aspect or any possible implementation of the first aspect.

According to a fifth aspect, this application provides a computer program product, where when the computer program product runs on a computer, the computer performs the communication method for implementing dual card dual standby dual pass according to the first aspect or any possible implementation of the first aspect.

It can be understood that, the terminal in the second aspect, any possible implementation of the second aspect, and the third aspect, the computer storage medium in the fourth aspect, and the computer program product in the fifth aspect in this application are all configured to perform the corresponding method provided above. Therefore, for beneficial effects that can be achieved thereby, refer to the beneficial effects in the corresponding method provided above. Details are not described herein again.

BRIEF DESCRIPTION OF DRAWINGS

FIG. 12A, FIG. 12B, and FIG. 12C are a schematic diagram 3 of a GUI, according to an embodiment of the present invention, displayed when a terminal performs a method in an embodiment of the present invention;

FIG. 13A, FIG. 13B, and FIG. 13C are a schematic diagram 4 of a GUI, according to an embodiment of the present invention, displayed when a terminal performs a method in an embodiment of the present invention;

FIG. 21A, FIG. 21B, and FIG. 21C are a flowchart 9 of a communication method for implementing dual card dual standby dual pass according to an embodiment of the present invention;

DESCRIPTION OF EMBODIMENTS

The embodiments of the present invention provide a communication method for implementing dual card dual standby dual pass, and the method can be applied to a terminal supporting DR-DSDS. Two SIM cards (a first SIM card and a second SIM card) may be installed on the terminal, and one radio frequency transmit (Tx) channel and two radio frequency receive (Rx) channels are configured in the terminal. The first SIM card and the second SIM card in the terminal each may occupy one of the two radio frequency Rx channels for use, and use the radio frequency Tx channel of the terminal in a time division manner.

Figure 1:
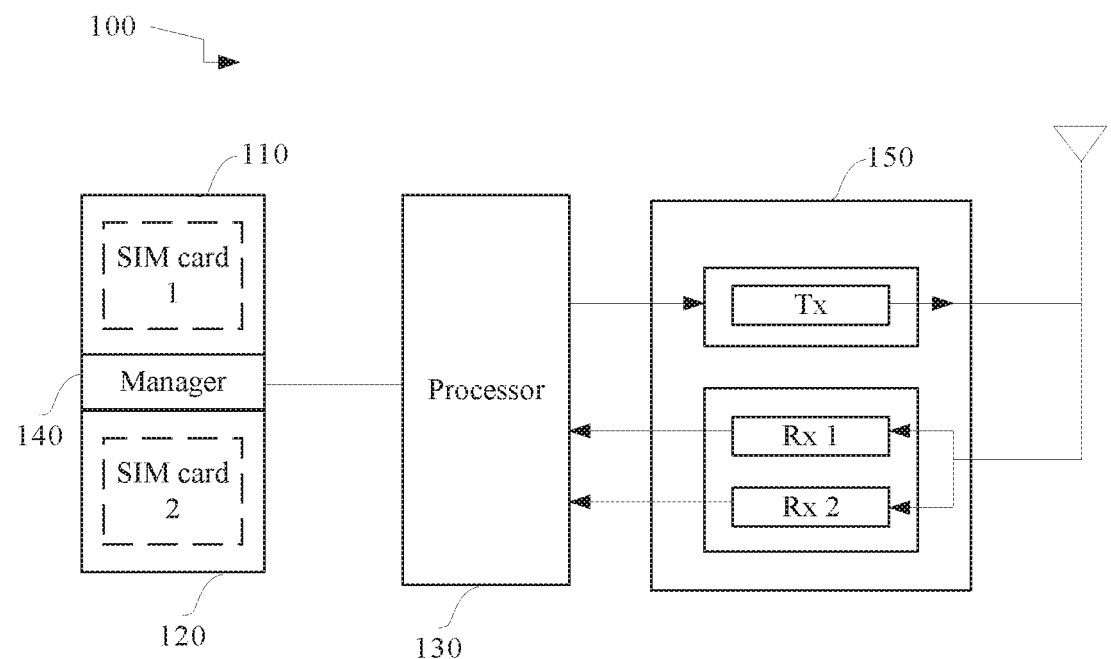
FIG. 1 is a schematic structural diagram of a terminal supporting DR-RSDS according to an embodiment of the present invention.

FIG. 1 is a schematic structural diagram of a terminal supporting DR-DSDS according to an embodiment of the present invention. As shown in FIG. 1, a terminal 100 may include: a first SIM card interface 110, a second. SIM card interface 120, a manager 140 coupled to the first SIM card interface 110 and the second SIM card interface 120, a processor 130 coupled to the manager 140, and a transceiver 150 connected to the processor 130. The processor 130 may be a baseband processor (Base Band Processor, BBP). As shown in FIG. 1, the transceiver 150 includes a radio frequency Rx 1 channel, a radio frequency Rx 2 channel, and a radio frequency Tx channel.

The first SIM card interface 110 is configured to install a SIM card 1, and communicate with the SIM card 1, and the second SIM card interface 120 is configured to install a SIM card 2, and communicate with the SIM card 2. The manager 140 may send an uplink data packet related to a service of the SIM card 1 and an uplink data packet related to a service of the SIM card 2 to the processor 130. The processor 130 may send an uplink data packet on the radio frequency Tx channel to a network device based on transmit priorities of uplink data packets of the SIM card 1 and the SIM card 2 on the radio frequency Tx channel.

It should be noted that, the radio frequency Tx channel in this embodiment of the present invention may be referred to as a Tx radio frequency resource or a transmitter (Transmitter), and the radio frequency Rx channel may be referred to as an Rx radio frequency resource or a receiver (Receiver).

In this embodiment of the present invention, the radio frequency Tx channel and the radio frequency Rx 1 channel may be referred to as RF primary channels, and the radio frequency Rx 2 channel may be referred to as an RF secondary channel. To be specific, uplink and downlink RF components (for example, the radio frequency Tx channel and the radio frequency Rx 1 channel) of the RF primary channels are multiplexed, and the RF secondary channel has only a downlink RF component (for example, the RF Rx 2 channel).

Specifically, the communication method for implementing dual card dual standby dual pass provided in this embodiment of the present invention can be applied to the following: When one SIM card (for example, a first SIM card, or the SIM card 1) of the terminal supporting DR-DSDS occupies the Tx radio frequency resource for a voice call (in other words, the terminal is in a first communications connection), if the other SIM card (for example, a second SIM card, or the SIM card 2) has a voice paging (paging) request for access (in other words, the terminal receives a paging request for setting up a second communications connection), the terminal rings (ring) in response to the voice paging request, and provides a voice call service of the second SIM card for a riser. The first communications connection is a voice call related to the first SIM card, and the second communications connection is related to the second SIM card.

Figure 2:
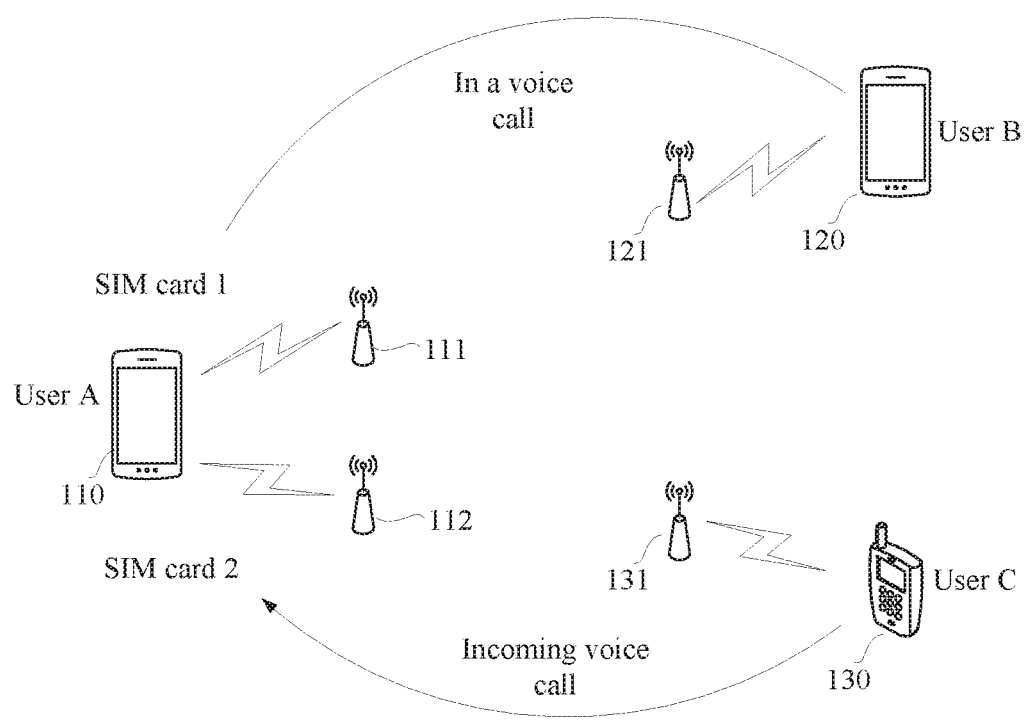
FIG. 2 is a schematic diagram of an example of an application scenario of a communication method for implementing dual card dual standby dual pass according to an embodiment of the present invention.

FIG. 2 is a schematic diagram of an example of an application scenario of a communication method for implementing dual card dual standby dual pass according to an embodiment of the present invention. A terminal 110 of a user A shown in FIG. 2 may be the terminal supporting DR-DSDS, and two SIM cards may be installed on the terminal 110: a SIM card 1 and a SIM card 2. The SIM card 1 of the terminal 110 may be a primary card of the terminal 110, and the SIM card 2 may be a secondary SIM card of the terminal 110. Alternatively, the SIM card 2 of the terminal 110 may be a primary card of the terminal 110, and the SIM card 1 may be a secondary SIM card of the terminal 110.

After a user B uses a terminal 120 to initiate a voice paging request to the SIM card 1 of the terminal 110, the user A may use the terminal 110 to perform, by using the SIM card 1 of the terminal 110, a voice call with the user B holding the terminal 120. As shown in FIG. 2, in a process in which the user A uses the terminal 110 to perform, by using the SIM card 1 of the terminal 110, a voice call with the user B holding the terminal 120, a user C may use a terminal 130 to initiate a voice paging request to the SIM card 2 of the terminal 110, to request to perform, by using the SIM card 2 of the terminal 110, a voice call with the user A holding the terminal 110.

The communication method for implementing dual card dual standby dual pass provided in the embodiments of the present invention may be applied to the foregoing application scenario. An incoming call request of the terminal 130 is connected to the terminal 110, that is, the terminal 110 gives an incoming call notification of the SIM card 2, without imposing relatively great impact on voice call quality of the user A and the user B, so that the user can select "decline an incoming call of the SIM card 2, and continue with a voice call of the SIM card 1", or select "hang up a voice call of the SIM card 1, and accept a voice call of the SIM card 2", or select "hold a voice call of the SIM card 1, and accept a voice call of the SIM card 2".

For example, the incoming call notification in the embodiments of the present invention may include one or more of the following notification manners: The terminal rings, a user interface of the terminal displays an incoming call from the user C, the terminal vibrates, a camera flash of the terminal flashes, and so on.

For example, each of the two SIM cards of the terminal supporting DR-RSDS provided in the embodiments of the present invention may be a SIM card supporting any one of standards such as a Global System for Mobile communications (Global System for Mobile Communication, GSM) standard, a Universal Mobile Telecommunications System (Universal Mobile Telecommunications System, UMTS) standard, a Time Division-Synchronous Code Division Multiple Access (Time Division-Synchronous Code Division Multiple Access, TD-SCDMA) standard, a Long Term Evolution (Long Term Evolution, LTE) standard, and a Code Division Multiple Access (Code Division Multiple Access, CDMA) standard.

For example, both the SIM card 1 and the SIM card 2 of the terminal 110 shown in FIG. 1 or FIG. 2 may be SIM cards supporting the LTE standard. Voice communication performed by the terminal 110 by using the SIM card 1 with the terminal 120 may be a (Voice over LTE, VoLTE) service. Voice communication performed by the terminal by using the SIM card 2 with the terminal 130 may be a (Voice over LTE, VoLTE) service.

Alternatively, the SIM card 1 of the terminal 110 shown in FIG. 1 or FIG. 2 may be a SIM card supporting the LTE standard, and voice communication performed by the terminal 110 by using the SIM card 1 with the terminal 120 may be a VoLTE service. The SIM card 2 of the terminal 110 shown in FIG. 1 or FIG. 2 may be a SIM card supporting the GSM standard, and voice communication performed by the terminal 110 by using the SIM card 2 with the terminal 130 may be a circuit switched (Circuit Switched, CS) domain service.

Alternatively, both the SIM card 1 and the SIM card 2 of the terminal 110 shown in FIG. 1 or FIG. 2 may be SIM cards supporting the GSM standard, and both voice communication performed by the terminal 110 by using the SIM card 1 with the terminal 120 and voice communication performed by the terminal 110 by using the SIM card 2 with the terminal 130 may be CS domain services.

A data service of the terminal 110 may be on the SIM card 1, or may be on the SIM card 2; or data service transmission of the terminal 110 may be performed on both the SIM card 1 and the SIM card 2 of the terminal 110.

Figure 3:
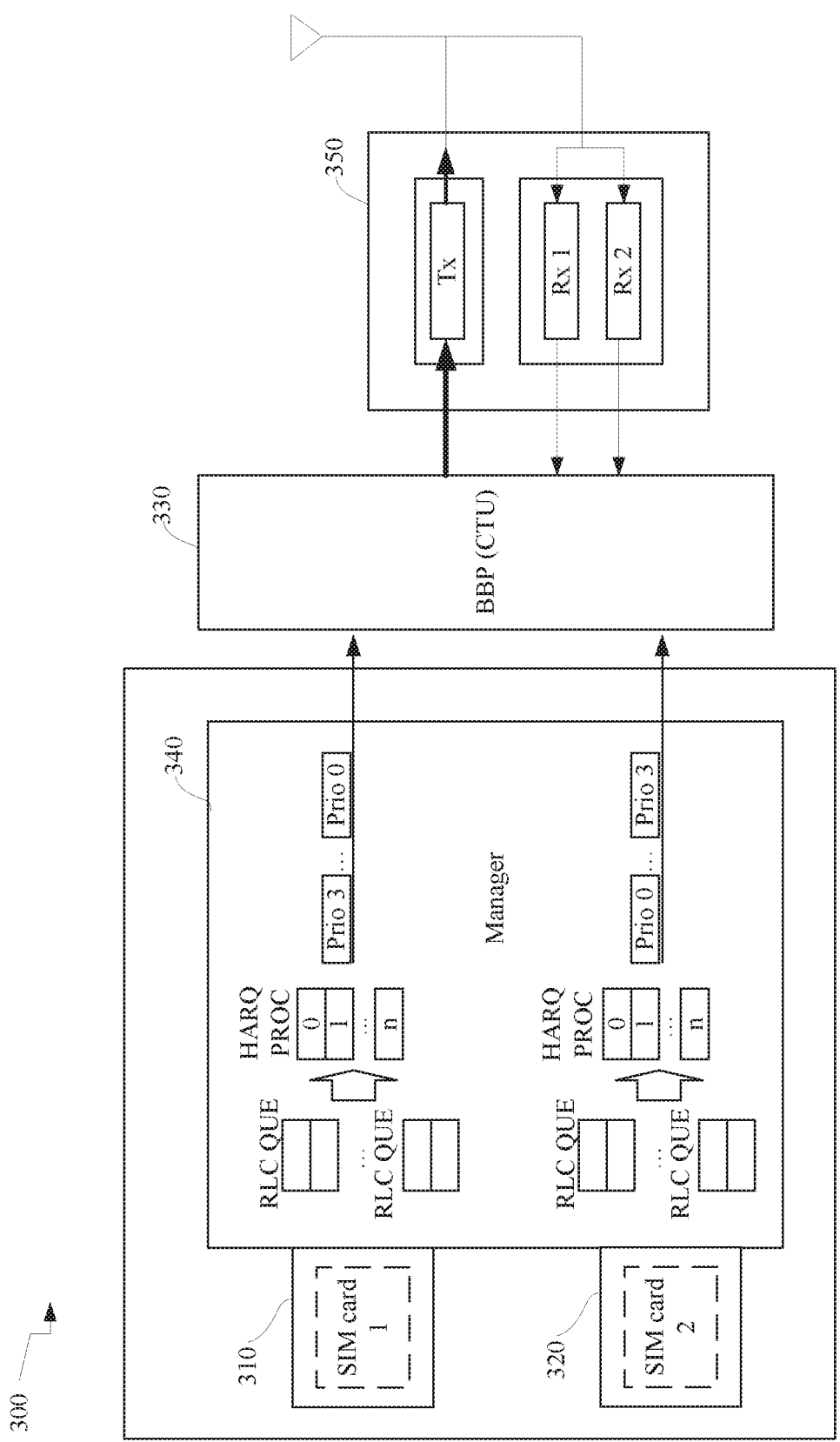
FIG. 3 is a schematic structural diagram of a terminal supporting DR-DSDS in an LTE network according to an embodiment of the present invention.

FIG. 3 is a schematic structural diagram of a terminal supporting DR-DSDS in an LTE network according to an embodiment of the present invention. As shown in FIG. 3, the terminal 300 may include: a first SIM card interface 310, a second SIM card interface 320, a manager 340 coupled to the first SIM card interface 310 and the second SIM card interface 320, a BBP 330 (namely, a processor) coupled to the manager 340, and a transceiver 350 connected to the processor 330.

As shown in FIG. 3, the transceiver 350 includes a radio frequency Rx 1 channel, a radio frequency Rx 2 channel, and a radio frequency Tx channel. The first SIM card interface 310 is configured to install a SIM card 1, and communicate with the SIM card 1, and the second SIM card interface 320 is configured to install a SIM card 2, and communicate with the SIM card 2.

The BBP 330 includes a common time unit (Common Time Unit, CTU). The CTU includes an arbiter configured to determine a transmit priority of an uplink data packet.

In an example, in the LTE network, the terminal 300 may send an uplink data packet to a network device by using the hybrid automatic repeat request (Hybrid Automatic Repeat request, HARQ) protocol. In this way, even if an uplink data packet, sent by the manager 340 to the BBP 330, of the SIM card (for example, the SIM card 2) is not transmitted in time, the uplink data packet can be retransmitted according to the HARQ protocol.

As shown in FIG. 3, the manager 340 may send an uplink data packet (prio) in a Radio Link Control (Radio Link Control, RLC) queue of the SIM card 1 and the SIM card 2 by using the HARQ protocol. The BBP 330 may receive various data packets sent by the manager 340, such as an uplink voice packet sent by the SIM card 1, and an uplink signaling packet sent by the SIM card 2. The BBP 330 occupies, based on transmit priorities of uplink data packets on the radio frequency Tx channel, the radio frequency Tx channel to send an uplink data packet to the network device.

For example, the terminal supporting DR-RSDS in this embodiment of the present invention may be a communications device on which at least two SIM cards can be installed, and any one of the at least two SIM cards can be used to perform voice communication with another communications terminal. For example, the terminal may be a dual card dual standby mobile phone, or may be a smart band, a smartwatch, or a tablet computer on which two SIM cards can be installed, or the like. No special limitation is imposed on a specific form of the terminal in this embodiment of the present invention.

Figure 4:
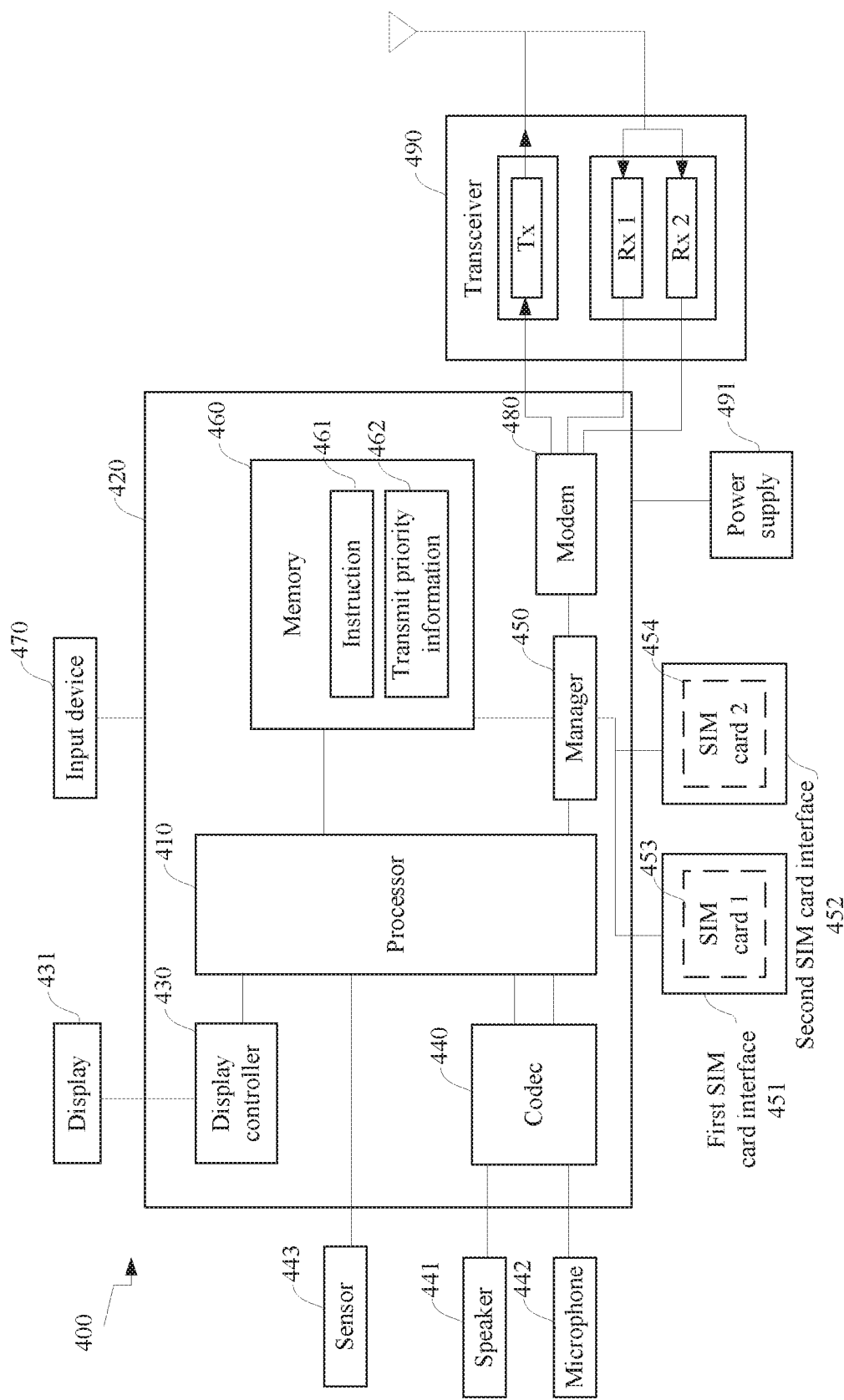
FIG. 4 is a schematic diagram of a hardware structure of a mobile phone according to an embodiment of the present invention.

In the following embodiment, a mobile phone is used as an example to illustrate how a terminal supporting DR-RSDS implements the specific technical solutions in the embodiments. As shown in FIG. 4, the terminal in this embodiment may be a mobile phone 400. The following uses the mobile phone 400 as an example to describe this embodiment in detail.

It should be understood that the mobile phone 400 shown in the figure is merely an example of the terminal supporting DR-RSDS, and the mobile phone 400 may have more or fewer components than those shown in the figure, or have a combination of two or more components, or have a different component configuration. The various components shown in FIG. 4 may be implemented in hardware including one or more signal processing circuits and/or application-specific integrated circuits, software, or a combination thereof.

As shown in FIG. 4, the mobile 400 includes: a processor 410, a System-On-a-Chip device 420, a display controller 430, a codec (CODEC) 440, a manager 450, a memory 460, an input device 470, a modem 480, a transceiver 490, a power supply 491, and the like.

A person skilled in the art may understand that the mobile phone structure shown in FIG. 4 does not constitute a limitation on the mobile phone, and the mobile phone structure may include more or fewer components than those shown in the figure, or have a combination of some components, or have a different component arrangement.

As shown in FIG. 4, the mobile phone 400 may further include a first SIM card interface 451 and a second SIM card interface 452. The first SIM card interface 451 is configured to communicate with a SIM card 1 453, and the second SIM card interface 452 is configured to communicate with a SIM card 2 454. For example, the first SIM card interface 451 and the second SIM card interface 452 may be SIM card connectors. The SIM card connector includes a body having space for accommodating a SIM card, and a plurality of connection slots configured to receive conducting terminals of the received SIM card. Electrical signaling communication with a SIM card may be performed by using the conducting terminal and the slot. An example interface may include serial or parallel (for example, six pins or eight pins) connections. In addition, a plurality of SIM card sizes (for example, a standard SIM, a micro-SIM, or a nano-SIM) may be provided. In another embodiment, when a plurality of subscriptions are associated with a universal identity module (for example, a universal SIM), the mobile phone 400 may not include a plurality of SIM card interfaces. The manager 450 is configured to manage the SIM card 1 453 and the SIM card 2 454.

As shown in FIG. 4, the mobile phone 400 may further include a speaker 441 and a microphone 442 that are coupled to the codec codec 440. FIG. 4 further indicates that a controller 740 may be coupled to the processor 410, and coupled to the modem 480 that communicates with the transceiver 490. The transceiver 490 is connected to one or more antennas. FIG. 4 merely shows an example of one antenna.

In a specific embodiment, the transceiver 490 is connected to a plurality of antennas, the modem 480 supports diversity, and one of the plurality of antennas is a primary antenna and another antenna is a secondary antenna.

The transceiver 490 may be an RF circuit, and the RF circuit may be configured to receive or send a signal in an information receiving/sending process or a call process. The RF circuit may receive downlink information of a base station and then send the downlink information to the processor 410 for processing; and send related uplink data to the base station. Generally, the RF circuit includes but is not limited to devices such as the antenna, at least one amplifier, a transceiver, a coupler, a low noise amplifier, and a duplexer. In addition, the RF circuit may further communicate with a network and another mobile device through wireless communication. Any communications standard or protocol may be used for the wireless communication, and includes but is not limited to a Global System for Mobile communications, a general packet radio service, Code Division Multiple Access, Wideband Code Division Multiple Access, Long Term Evolution, an email, a short message service, and the like. In this embodiment of the present invention, the transceiver 490 shown in FIG. 4 may include two radio frequency Rx channels and one radio frequency Tx channel (the radio frequency Tx channel, a radio frequency Rx 1 channel, and a radio frequency Rx 2 channel that are shown in FIG. 4).

The memory 460 can be configured to store a software program and data. The processor 410 performs various functions and data processing of the mobile phone 400 by running the software program and the data that are stored in the memory 460. For example, as shown in FIG. 4, the memory 460 stores an instruction 461 and transmit priority information 462, and the instruction 461 may be executed by the processor 410. For example, the instruction 461 may include an instruction that can be executed by the processor 410 to receive, at a primary signal input end of the modem 480, communication data related to the SIM card 1 453. The "communication data related to the SIM card 1 453" may be routed to the primary signal input end (which is not shown in FIG. 4) of the modem 480 through a primary RF path of the transceiver 490, namely, Rx 1. The instruction 461 includes an instruction that can be executed by the processor 410 to receive, at a secondary signal input end of the modem 480, communication data related to the SIM card 2 454. The "communication data related to the SIM card 2 454" may be routed to the secondary signal input end (which is not shown in FIG. 4) of the modem 480 through a secondary RF path of the transceiver 490, namely, Rx 2.

The memory 460 may mainly include a program storage area and a data storage area. The program storage area may store an operating system, an application required by at least one function (such as a sound play function or an image play function), and the like. The data storage area may store data (such as audio data or a phone book) that is created based on use of the mobile phone 400, and the like. In addition, the memory 460 may include a high-speed random access memory, and may further include a nonvolatile memory, for example, at least one magnetic disk storage device, a flash memory, or another volatile solid-state storage device. In the following embodiments, the memory 460 stores an operating system enabling the mobile phone 400 to run, for example, the iOS® operating system developed by the Apple Inc., the Android® open-source operating system developed by the Google LLC, or the Windows® operating system developed by the Microsoft Corporation.

The input device 470 (for example, a touchscreen) may be configured to receive entered numerical or character information, and generate signal inputs related to user settings and function control of the mobile phone 400. Specifically, the input device 470 may include a touch panel disposed on the front of the mobile phone 400, and the touch panel may collect a touch operation (for example, an operation performed on or near the touch panel by a user by using any proper object or accessory such as a finger or a stylus) on or near the touch panel, and drive a corresponding connection apparatus based on a preset program. Optionally, the touch panel may include two parts: a touch detection apparatus and a touch controller. The touch detection apparatus detects a touch direction and position of the user, detects a signal arising from the touch operation, and transmits the signal to the touch controller. The touch controller receives touch information from the touch detection apparatus, converts the touch information into touch coordinates, and sends the touch coordinates to the processor 410. In addition, the touch controller can receive and execute an instruction sent by the processor 410. In addition, the touch panel may be implemented in a plurality of types such as a resistor type, a capacitor type, an infrared type, and a surface acoustic wave type.

A display 431 (namely, a display screen) can be configured to display information entered by the user or information provided to the user, and a graphical user interface (Graphical User Interface, GUI) of various menus of the mobile phone 400. The display 431 may include a display panel disposed on the front of the mobile phone 400. The display panel may be configured in a form of a liquid crystal display, a light emitting diode, or the like.

After detecting a touch operation on or near the touch panel, the touch panel transmits information about the touch operation to the processor 410 to determine a touch event. Subsequently, the processor 410 provides a corresponding visual output on the display panel based on a type of the touch event. In FIG. 4, the touch panel and the display panel are two independent components to implement input and output functions of the mobile phone 400. However, in some embodiments, the touch panel and the display panel may be integrated to implement the input and output functions of the mobile phone 400. An integrated touch panel and display panel can be briefly referred to as a touch display.

In some other embodiments, a pressure sensor may be further disposed on the touch panel, so that when the user performs a touch operation on the touch panel, the touch panel can further detect pressure of the touch operation, and the mobile phone 400 can detect the touch operation more accurately.

The mobile phone 400 may further include at least one sensor 443, such as a light sensor, a motion sensor, or another sensor. Specifically, the light sensor may include an ambient light sensor and a proximity sensor. The ambient light sensor may adjust luminance of the display panel based on intensity of ambient light. The proximity sensor is disposed on the front of the mobile phone 400. When the mobile phone 400 approaches an ear, the mobile phone 400 turns off a power supply of the display panel based on detection of the proximity sensor, so that the mobile phone 400 can further reduce battery power consumption. As a type of motion sensor, an accelerometer sensor can detect values of acceleration in directions (usually three axes), and can detect a value and a direction of gravity when the mobile phone 400 is still. The acceleration sensor may be used for an application for identifying a mobile phone posture (for example, screen switching between a landscape mode and a portrait mode, a related game, and magnetometer posture calibration), a function related to vibration identification (such as a pedometer, and a stroke), and the like. Other sensors such as a gyroscope, a barometer, a hygrometer, a thermometer, or an infrared sensor may be further disposed on the mobile phone 400. Details are not described herein.

The codec 440, the speaker 441, and the microphone 442 can provide an audio interface between the user and the mobile phone 400. The codec 440 may transmit, to the speaker 441, an electrical signal that is converted from received audio data, and the speaker 441 converses the electrical signal into a sound signal and outputs the sound signal. In addition, the microphone 442 converts a collected sound signal into an electrical signal, and the codec 440 receives the electrical signal and converts the electrical signal into audio data, and then outputs the audio data to the RF circuit 410, to send the audio data to, for example, another mobile phone, or output the audio data to the memory 460 for further processing.

The processor 410 is a control center of the mobile phone 400, connects various parts of the entire mobile terminal through various interfaces and lines, and performs various functions and data processing of the mobile phone 400 by running or executing the software program stored in the memory 460 and invoking the data stored in the memory 460, to perform overall monitoring on the mobile phone. In some embodiments, the processor 410 may include one or more processing units. The processor 410 may be further integrated with an application processor and a modem processor. The application processor mainly processes an operating system, a user interface, an application, and the like. The modem processor mainly processes wireless communication. It can be understood that, alternatively, the modem processor may not be integrated into the processor 410.

The mobile phone 400 may further include a Bluetooth module and a Wi-Fi module. The Bluetooth module is configured to exchange information with another device by using a short-range communications protocol such as Bluetooth. For example, the mobile phone 400 may set up a Bluetooth connection, by using the Bluetooth module, to another wearable electrical device (for example, a smartwatch) also having a Bluetooth module, to exchange information. Wi-Fi belongs to a short-range wireless communications technology, and the mobile phone 400 can use the Wi-Fi module to help the user receive and send an email, browse a web page, access streaming media, and so on. The Wi-Fi module provides the user with wireless broadband Internet access.

The mobile phone 400 further includes the power supply 491 (such as a battery) that supplies power to the parts. The power supply may be logically connected to the processor 410 through a power supply management system, to implement, through the power management system, functions such as charging management, discharging management and power consumption management. It can be understood that, in the following embodiments, the power supply 491 may be configured to supply power to the display panel and the touch panel. The methods in the following embodiments all can be implemented in the mobile phone 400 having the foregoing hardware structure.

The technical terms in the embodiments of the present invention are explained and described herein in this embodiment of the present invention:

When the SIM card 1 (referred to as "a call card" below) of the terminal performs voice communication, and the SIM card 2 (referred to as "an access card" below) is in a standby state, a data packet transmitted on the radio frequency Tx channel of the terminal may include: a signaling packet of the call card, a voice packet of the call card, a scheduling request (Scheduling Request, SR) packet of the call card, an acknowledgement (Acknowledgement, ACK) packet of the call card, a null packet of the call card, a channel quality indicator (Channel Quality Indicator, CQI) packet of the call card, a sounding reference signal (Reference Symbol SRS, SRS) packet of the call card, a service data packet of the call card, or the like.

For example, the signaling packet of the call card may be a data packet that needs to be sent to a network device in a voice communication process of the call card and that is used to support the voice communication and carries protocol signaling. The voice packet of the call card is a data packet that carries voice data, and is sent by the terminal to the network device when the call card is in a call state. The ACK packet of the call card is a data packet that carries an acknowledgement message, and is replied to the network device after the terminal receives signaling sent by the network device. The service data packet of the call card is a network access data service packet of the call card. For example, the service data packet of the call card may be a video streaming media data packet downloaded by using data traffic of the call card when the user uses the terminal to watch a video.

When the SIM card 1 (referred to as "the call card" below) of the terminal is in the call state, and the terminal receives a voice paging (paging) request for the SIM card 2 (referred to as "the access card" below), and responds to the voice paging request, the data packet transmitted on the radio frequency Tx channel of the terminal may include: a signaling packet of the access card, a null packet of the access card, a CQI packet of the access card, an SRS packet of the access card, and the like.

For example, the signaling packet of the access card may include: a data packet that carries protocol signaling and is sent by the terminal to the network device in response to the paging request for the access card; or RRC signaling sent to the network device when the access card sets up an RRC connection to the network device. Alternatively, the signaling packet of the access card may be SIP signaling sent to the network device after the access card sets up an RRC connection to the network device.

In some embodiments of the present invention, the null packet, the CQI packet, and the SRS packet of the call card are collectively referred to as low-priority packets of the call card, and the null packet, the CQI packet, and the SRS packet of the access card may be collectively referred to as low-priority packets of the access card; and the low-priority packets of the call card and the low-priority packets of the access card are collectively referred to as low-priority packets of the two cards. The null packet of the call card or the access card may be a data packet that carries no service data, for example, a heartbeat packet.

In some embodiments of the present invention, the signaling packet, the voice packet, the ACK packet, the network access data service packet, and the SR packet of the call card are collectively referred to as high-priority packets of the call card, and the signaling packet, an ACK packet, a network access data service packet, and an SR packet of the access card are collectively referred to as high-priority packets of the access card; and the high-priority packets of the call card and the high-priority packets of the access card are collectively referred to as high-priority packets of the two cards.

It should be noted that, the call card in this embodiment of the present invention is a SIM card in a voice call process, the access card is a SIM card that receives a paging request when the call card is in the voice call process.

In this embodiment of the present invention, when the SIM card 1 (namely, "the call card") of the terminal performs voice communication, the terminal is in a first communications connection, and the first communications connection is a voice call related to the SIM card 1. The paging request for the SIM card 2 is a paging request for setting up a second communications connection, and the second communications connection is related to the SIM card 2. The paging request for the SIM card 2 may be a voice paging request, or may be a paging request of another service. For example, the paging request for the SIM card 2 may be a paging request of a short message service.

Figure 5:
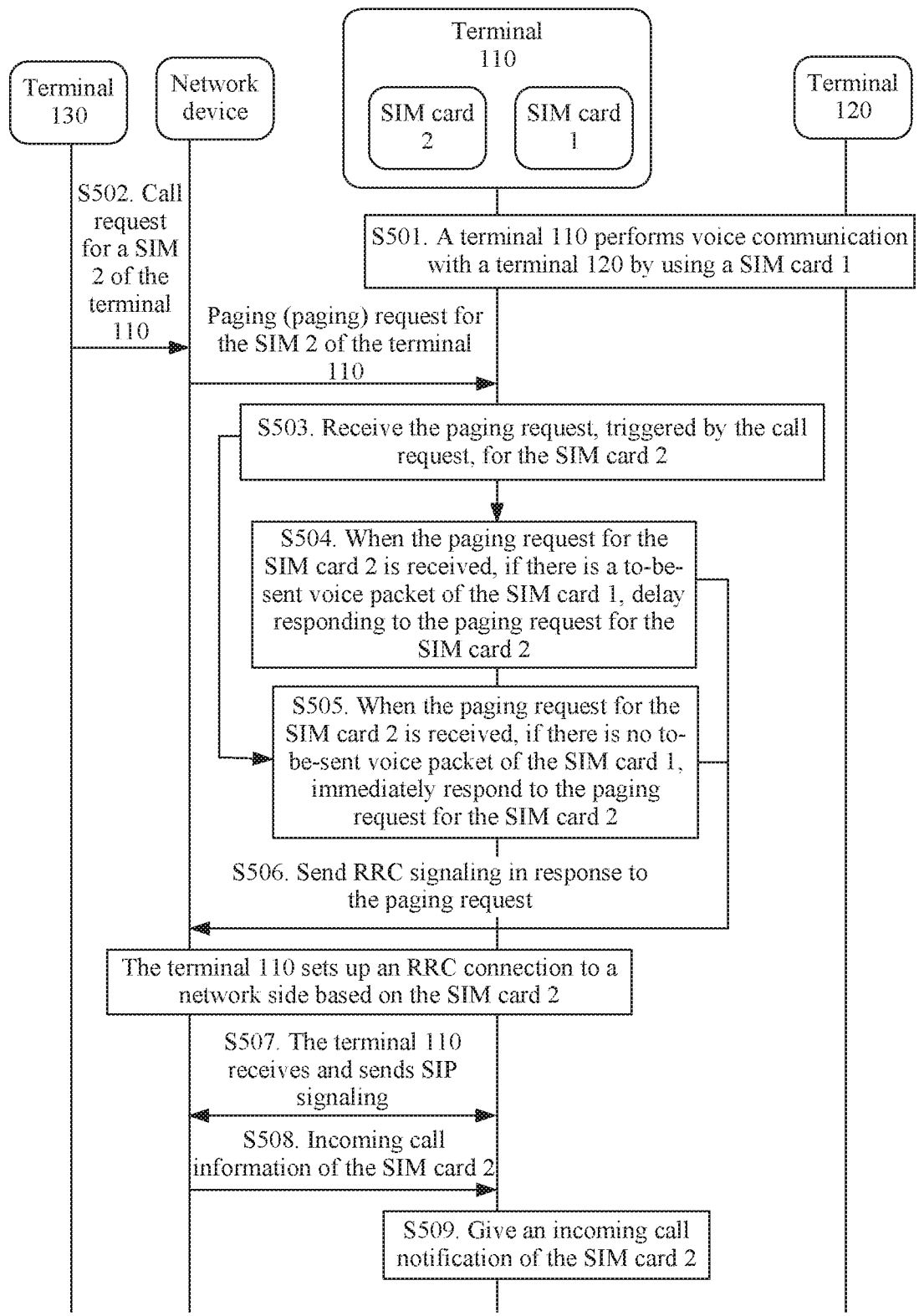
FIG. 5 is a flowchart 1 of a communication method for implementing dual card dual standby dual pass according to an embodiment of the present invention.

For example, the application scenario shown in FIG. 2 is used as an example herein in this application, to describe, in detail, a communication method for implementing dual card dual standby dual pass provided in an embodiment of the present invention. As shown in FIG. 5, the communication method for implementing dual card dual standby dual pass provided in this embodiment of the present invention is as follows.

S501. A terminal 110 performs voice communication with a terminal 120 by using a SIM card 1.

It can be understood that, in a process in which the terminal 110 performs voice communication with the terminal 120 by using the SIM card 1 (in other words, the terminal 110 is in a first communications connection), the SIM card 1 of the terminal 110 is in a call state, and the terminal 110 sends a voice packet of the first communications connection to a network device. Therefore, the SIM card 1 of the terminal 110 occupies a Tx radio frequency resource (namely, a radio frequency Tx channel) of the terminal 110 by using a processor.

S502. A terminal 130 initiates a call request to a SIM card 2 of the terminal 110.

As shown in FIG. 2, the terminal 130 may send, to a base station 131 providing a cell in which the terminal 130 is located, the call request for calling the SIM card 2 of the terminal 110. After receiving the call request, the base station 131 may request a core network device to page a called terminal (namely, the SIM card 2 of the terminal 110). The core network device instructs a base station 112 to send a paging (paging) request, to page the SIM card 2 of the terminal 110. The core network device may be a mobility management entity (Mobility Management Entity, MME).

S503. The terminal 110 receives a paging (paging) request, triggered by the call request, for the SIM card 2.

The call request for the SIM card 2 is specifically a paging request for setting up a second communications connection, and the second communications connection is related to the SIM card 2.

Voice communication performed by the terminal 110 with the terminal 120 by using the SIM card 1 occupies a radio frequency Rx 1 channel of the terminal 110. The terminal 110 may receive the paging request for the SIM card 2 through a radio frequency Rx 2 channel.

Generally, after receiving the paging request, the terminal may send RRC signaling to the network device in response to the paging request, to set up an RRC connection to the network device, and perform a service corresponding to the paging request. However, in a scenario in which "when the SIM card 1 of the terminal 110 is in the call state, the terminal 110 receives the paging request for the SIM card 2", if the terminal 110 occupies the radio frequency Tx channel to send the RRC signaling to the network device in response to the paging request, sending of a to-be-sent voice packet of the SIM card 1 of the terminal 110 is delayed because the RRC signaling occupies the radio frequency Tx channel, affecting voice communication quality of a call card (the SIM card 1).

However, in a process in which the terminal 110 performs a voice service of the SIM card 1, the terminal does not always occupy the radio frequency Tx channel to send the voice packet of the SIM card 1. In other words, when the SIM card 1 is in the call state, the terminal 110 does not transmit the voice packet of the SIM card 1 on the radio frequency Tx channel in some idle time periods. For example, there is a time (briefly referred to as an idle time period) in each subframe, and in the idle time period, the terminal 110 does not transmit the voice packet of the SIM card 1 on the radio frequency Tx channel.

For example, a time division duplex (time division duplex Time Division Duplexing, TDD) LIE network is used as an example herein in this embodiment of the present invention. Table 1 shows an example of an uplink-downlink slot configuration table in the TDD-LTE network.

TABLE 1

| UL-DL configuration | Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| UL-DL (0) | 5 ms | D | S | U | U | U | D | S | U | U | U |
| UL-DL (1) | 5 ms | D | S | U | U | D | D | S | U | U | D |
| UL-DL (2) | 5 ms | D | S | U | D | D | D | S | U | D | D |
| UL-DL (3) | 10 ms | D | S | U | U | U | D | D | D | D | D |
| UL-DL (4) | 10 ms | D | S | U | U | D | D | D | D | D | D |
| UL-DL (5) | 10 ms | D | S | U | D | D | D | D | D | D | D |
| UL-DL (6) | 5 ms | D | S | U | U | U | D | S | U | U | D |

As shown in Table 1, the TDD-LTE network may include seven uplink-downlink slot configurations (Uplink-Downlink Configuration, UL-DL Configuration). In the seven UL-DL configurations shown in Table 1, an uplink-to-downlink subframe switch-point periodicity (Switch-point periodicity) of UL-DL (0). UL-DL (1), UL-DL (2), and UL-DL (6) is 5 ms, and an uplink-to-downlink subframe switch-point periodicity in UL-DL (3), UL-DL (4) and UL-DL (5) is 10 ms. "U" in Table 1 is used to indicate a slot for transmitting uplink data (such as an uplink voice packet), and "D" is used to indicate a slot for transmitting downlink data.

It can be learned from the seven uplink-downlink slot configurations shown in Table 1, that the uplink data. (such as an uplink voice packet) is transmitted only in some slots (namely, uplink slots "U") in one subframe, and the uplink data (such as an uplink voice packet) is not transmitted in other slots. For example, in UL-DL (2), only slot 2 and slot 7 are used to transmit the uplink data (such as an uplink voice packet), and other slots are not used to transmit the uplink data.

It can be learned that there is a time (briefly referred to as an idle time period) in each subframe, and in the idle time period, the SIM card 1 does not transmit the uplink voice packet on the radio frequency Tx channel. Therefore, in the idle time period, even if the SIM card 2 of the terminal 110 uses the radio frequency Tx channel of the terminal 110 to interact with the network device in response to the paging request, and sets up a radio resource control (Radio Resource Control, RRC) connection, quality of voice communication between the SIM card 1 of the terminal 110 and the terminal 120 is not affected.

Therefore, to avoid impact on voice communication quality of the call card (the SIM card 1) caused by responding to the paging request by the terminal 110, in this embodiment of the present invention, the terminal 110 may respond to the paging request when not sending the voice packet of the SIM card 1.

S504. When the terminal 110 receives the paging (paging) request for the SIM card 2, if the terminal 110 has a to-be-sent voice packet of the SIM card 1, the terminal 110 delays responding to the paging request for the SIM card 2.

That the terminal 110 has a to-be-sent voice packet of the SIM card 1 is specifically: the terminal 110 is in the first communications connection, and the terminal 110 has a voice packet of the first communications connection.

For example, a log log of the terminal 110 may record information about data packets sent and received by the SIM card 1 and the SIM card 2. For example, the log log records a type, a SIM card name, a byte count, and the like of all uplink data packets related to the SIM card 1.

Figure 6:
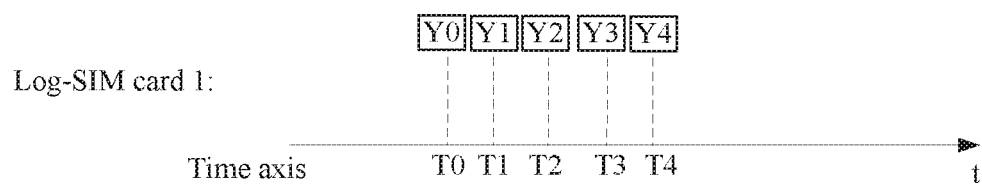
FIG. 6 is a schematic diagram 1 of an example of a log according to an embodiment of the present invention.

FIG. 6 shows an example of information, recorded in a log log, about a data packet sent by a SIM card according to an embodiment of the present invention. As shown in FIG. 6, it is assumed that the SIM card 1 is in the call state (in other words, the terminal is in the first communications connection), and voice packets of the first communications connection may include a voice packet Y0, a voice packet Y1, a voice packet Y2, a voice packet Y3, and a voice packet Y4. The voice packet Y0, the voice packet Y1, the voice packet Y2, the voice packet Y3, and the voice packet Y4 are estimated to be sequentially sent at a T0 moment, a T1 moment, a T2 moment, a T3 moment, and a T4 moment.

Figure 7A:
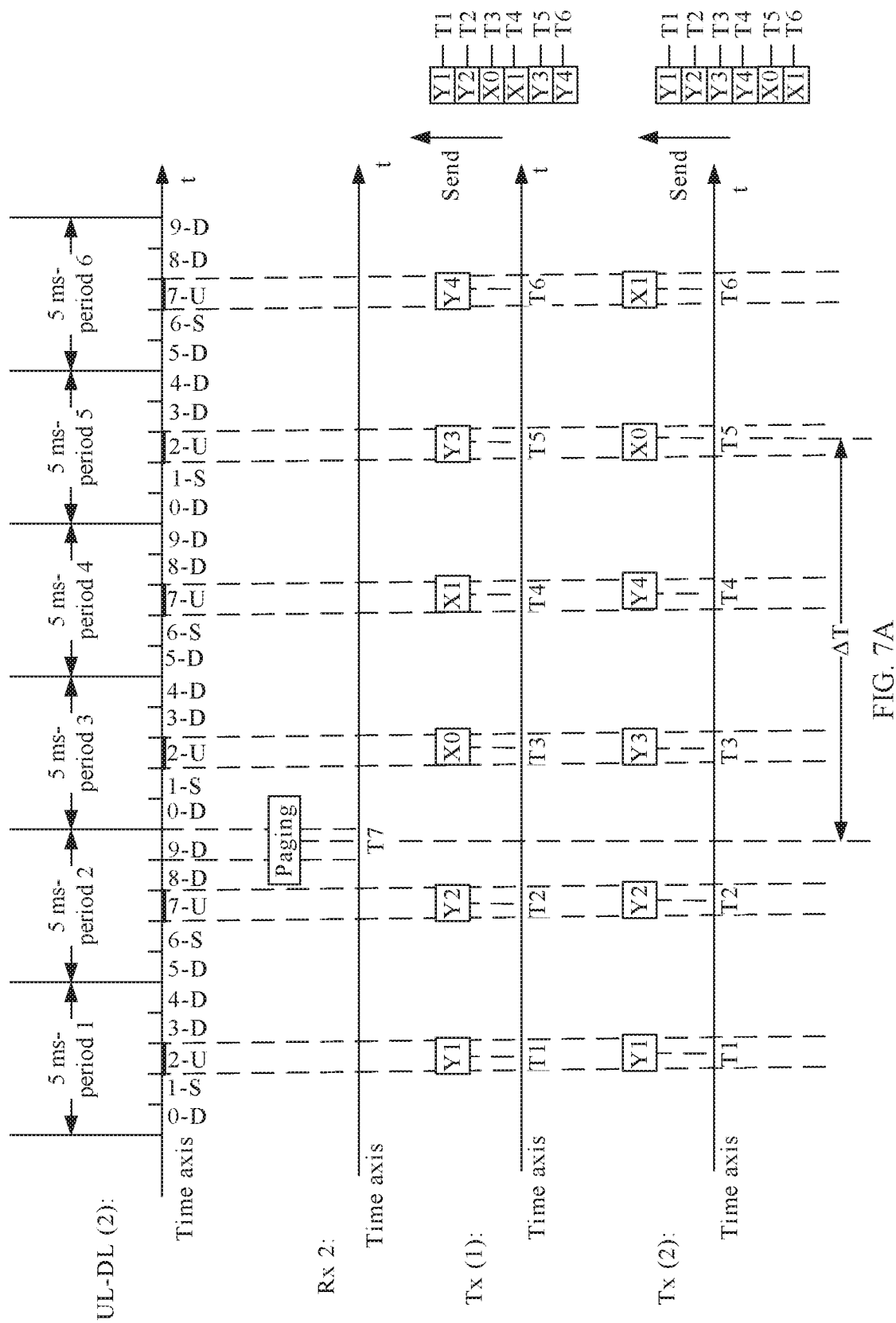
FIG. 7A is a schematic diagram 2 of an example of a log according to an embodiment of the present invention.

In some embodiments, with reference to Table 1, it is assumed that the terminal uses the UL-DL (2) slot configuration shown in Table 1 to perform voice communication of the SIM card 1 and the SIM card 2. As shown in FIG. 7A, in a downlink slot "9-D" (namely, a T7 moment) of a period 2, the terminal receives the paging request for the SIM card 2 (namely, the paging request for setting up the second communications connection) on the radio frequency Rx 2 channel.

It should be noted that when the SIM card 1 is in the call state, if the terminal 110 receives the paging request for the SIM card 2, as shown in FIG. 7A, the terminal 110 may send a signaling packet X0 and a signaling packet X1 (such as RRC signaling packets) in response to the paging request.

Generally, regardless of whether a voice packet of the SIM card 1 is sent on the radio frequency Tx channel, after receiving the paging request, the terminal 110 may send the signaling packet X0 and the signaling packet X1 on the radio frequency Tx channel in immediate response to the paging request. For example, as shown in "Tx (1)" in FIG. 7A, after receiving the paging request for the SIM card 2 at the T7 moment, the terminal may send the signaling packet X0 in a next uplink slot (namely, a slot "2-U" of a period 3, a T3 moment) and send the signaling packet X1 in a next uplink slot (namely, a slot "7-U" of a period 4, a T4 moment) in immediate response to the paging request. Subsequently, the terminal 110 may send the voice packet Y3 in a slot "2-U" (a T5 moment) of a period 5, and send the voice packet Y4 in a slot "7-U" (a T6 moment) of a period 6. In other words, the terminal may occupy the radio frequency Tx channel to sequentially send the voice packet Y0, the voice packet Y1, the voice packet Y2, the signaling packet X0, the signaling packet X1, the voice packet Y3, and the voice packet Y4 at a T0 moment, a T1 moment, a T2 moment, the T3 moment, the T4 moment, the T5 moment, and the T6 moment.

However, when the SIM card 1 is in the call state, if the terminal 110 receives the paging request for the SIM card 2 and the terminal 110 occupies the radio frequency Tx channel to send the signaling packet X0 and the signaling packet X1 to the network device in immediate response to the paging request, sending of the voice packet of the SIM card 1 is delayed, and voice communication quality of the SIM card 1 is affected.

To ensure voice communication quality of the SIM card 1, in this embodiment of the present invention, the terminal 110 may delay responding to the paging request when sending the voice packet of the SIM card 1 (in other words, the terminal 110 has the to-be-sent voice packet of the first communications connection). For example, as shown in "Tx (2)" in FIG. 7A, after receiving the paging request for the SIM card 2 at the T7 moment, the terminal may delay responding to the paging request. As shown in "Tx (2)" in FIG. 7A, the terminal may send the voice packet Y3 in the next uplink slot (namely, the slot "2-U" of the period 3, the T3 moment), and send the voice packet Y4 in the next uplink slot (namely, the slot "7-U" of the period 4, the T4 moment). Subsequently, the terminal 110 may send the signaling packet X0 in the slot "2-U" (namely, the T5 moment, which is delayed ΔT compared with the T7 moment) of the period 5, and send the signaling packet X1 in the slot "7-U" (the T6 moment) of the period 6. In other words, the terminal may occupy the radio frequency Tx channel to sequentially send the voice packet Y0, the voice packet Y1, the voice packet Y2, the voice packet Y3, the voice packet Y4, the signaling packet X0, and the signaling packet X1 at the T0 moment, the T1 moment, the T2 moment, the T3 moment, the T4 moment, the T5 moment, and the T6 moment.

In some other embodiments, it is assumed that the terminal uses the UL-DL (2) slot configuration shown in Table 1 to perform voice communication of the SIM card 1, and uses the UL-DL (1) slot configuration shown in Table 1 to perform voice communication of the SIM card 2.

Figure 7B:
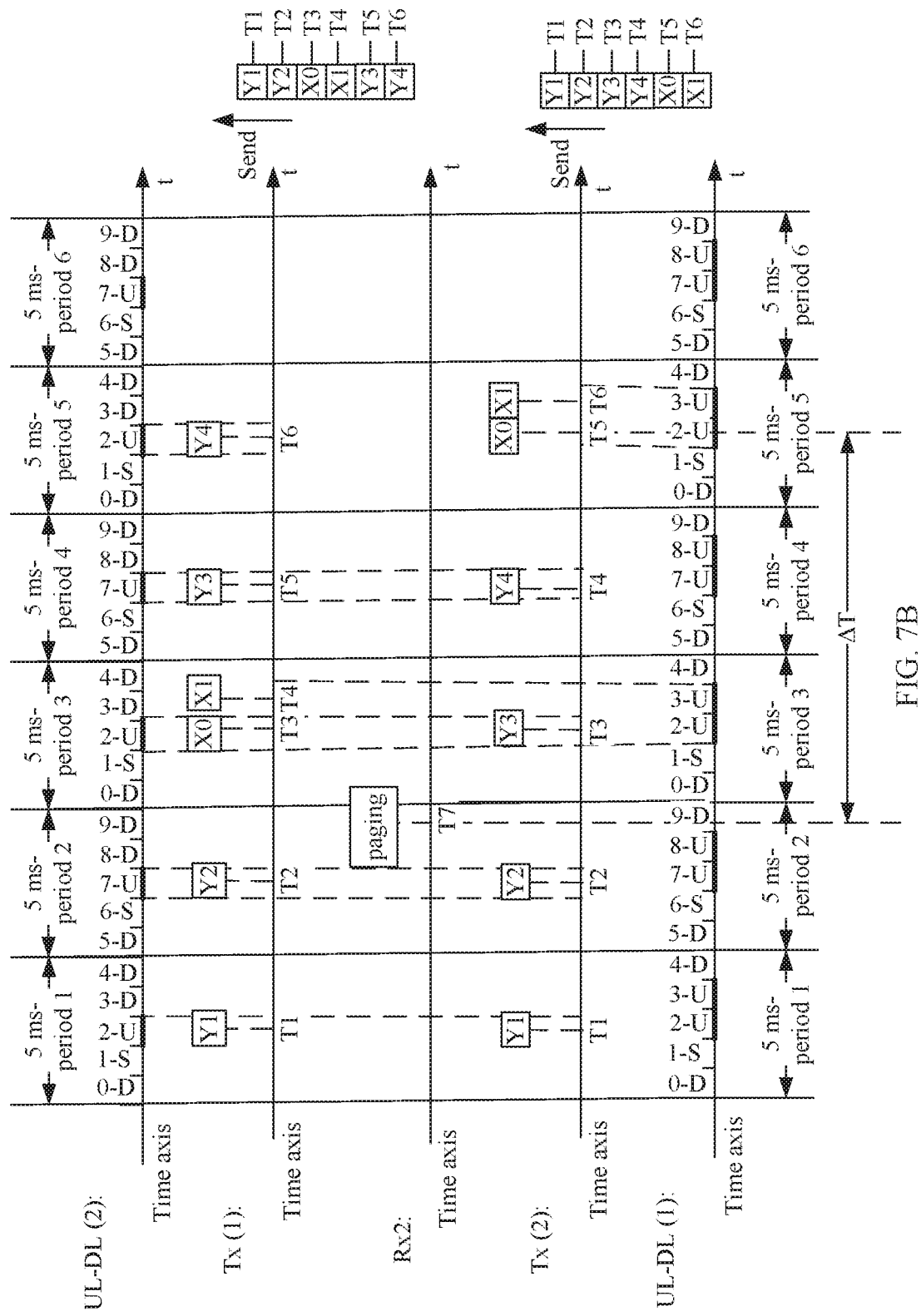
FIG. 7B is a schematic diagram 3 of an example of a log according to an embodiment of the present invention.

Generally, regardless of whether a voice packet of the SIM card 1 is sent on the radio frequency Tx channel, after receiving the paging request, the terminal 110 may send the signaling packet X0 and the signaling packet X1 on the radio frequency Tx channel in immediate response to the paging request. For example, as shown in FIG. 7B, in a downlink slot "9-D" (namely, a T7 moment) of a period 2 of UL-DL (1), the terminal receives the paging request for the SIM card 2 on the radio frequency Rx 2 channel. As shown in "Tx (1)" in FIG. 7B, after receiving the paging request for the SIM card 2 at the T7 moment, the terminal may send the signaling packet X0 in a slot "2-U" (namely, a T3 moment) of a period 3 of UL-DL (1) and send the signaling packet X1 in a slot "3-U" (namely, a T4 moment) of the period 3 of UL-DL (1) in immediate response to the paging request. Subsequently, the terminal 110 may send the voice packet Y3 in a slot "7-U" (a T5 moment) of a period 4 of UL-DL (2), and send the voice packet Y4 in a slot "2-U" (namely, a T6 moment) of a period 5 of UL-DL (2).

However, when the SIM card 1 is in the call state, if the terminal 110 receives the paging request for the SIM card 2 and the terminal 110 occupies the radio frequency Tx channel to send the signaling packet X0 and the signaling packet X1 to the network device in immediate response to the paging request, sending of the voice packet of the SIM card 1 is delayed, and voice communication quality of the SIM card 1 is affected.

To ensure voice communication quality of the SIM card 1, in this embodiment of the present invention, the terminal 110 may delay responding to the paging request when sending the voice packet of the SIM card 1 (in other words, the terminal 110 has the to-be-sent voice packet of the first communications connection). For example, as shown in "Tx (2)" in FIG. 7B, after receiving the paging request for the SIM card 2 at the T7 moment, the terminal may delay responding to the paging request, and send the voice packet Y3 in the slot "2-U" of the period 3 of UL-DL (2), and send the voice packet Y4 in the slot "7-U" (namely, a T4 moment) of the period 4 of UL-DL (2). Subsequently, the terminal 110 may send the signaling packet X0 in a slot "7-U" (namely, a T5 moment, which is delayed ΔT compared with the T7 moment) of a period 5 of UL-DL (1), and send the signaling packet X1 in the slot "3-U" (namely, a T6 moment) of the period 5 of UL-DL (1).

S505. When the terminal 110 receives the paging (paging) request for the SIM card 2, if the terminal 110 has no to-be-sent voice packet of the SIM card 1, the terminal 110 immediately responds to the paging request.

Figure 8A:
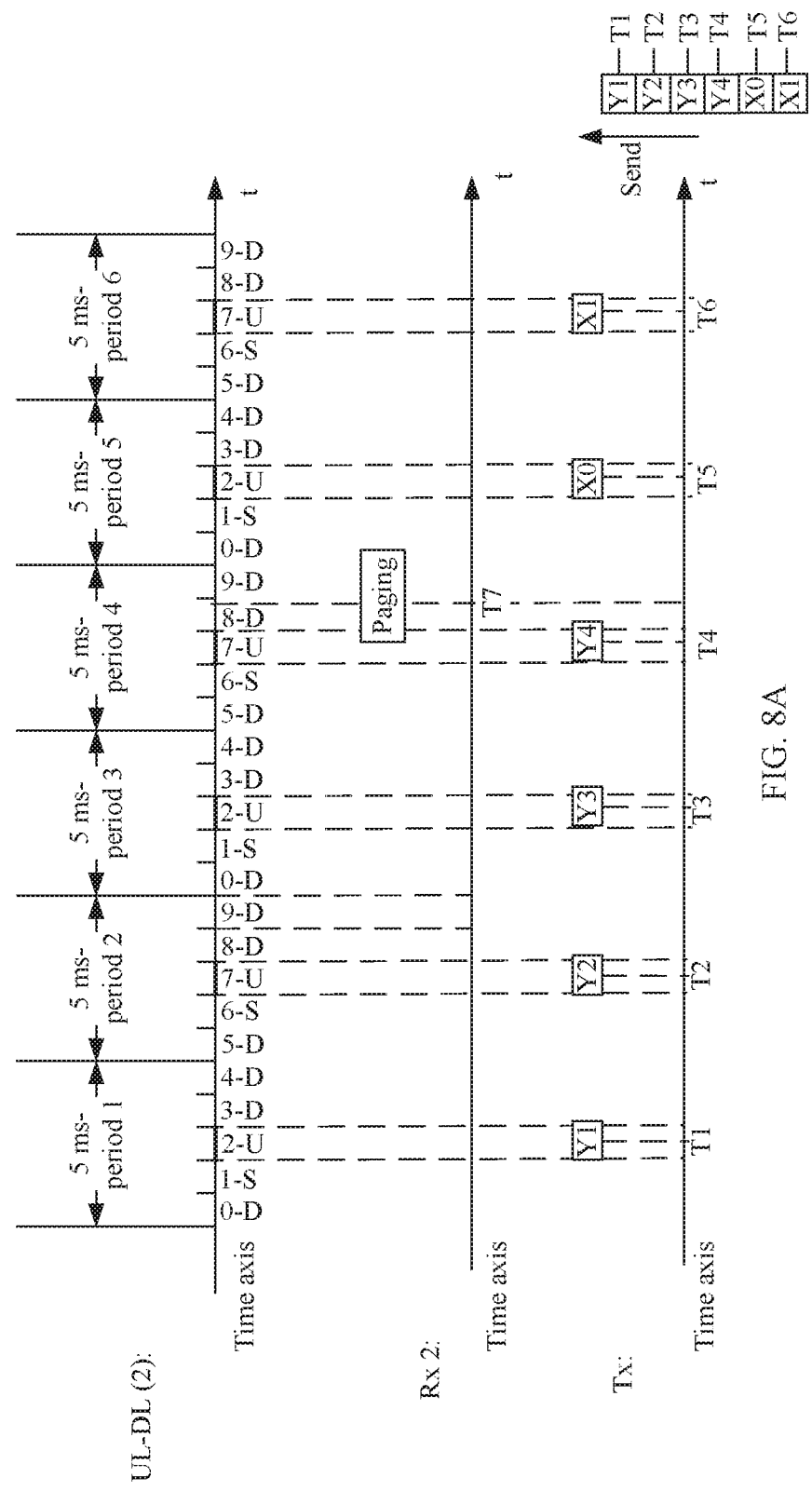
FIG. 8A is a schematic diagram 4 of an example of a log according to an embodiment of the present invention.

For example, in some embodiments, with reference to Table 1, it is assumed that the terminal uses the UL-DL (2) slot configuration shown in Table 1 to perform voice communication of the SIM card 1 and the SIM card 2. As shown in FIG. 8A, in a downlink slot "9-D" of a period 2 (namely, a T7 moment), the terminal receives the paging request for the SIM card 2 (namely, the paging request for setting up the second communications connection) on the radio frequency Rx 2 channel. In this case, the terminal 110 does not send the voice packet of the SIM card 1 (in other words, the terminal 110 has no to-be-sent voice packet of the first communications connection). Therefore, after receiving the paging request for the SIM card 2, the terminal 110 may send a signaling packet X0 and a signaling packet X1 on the radio frequency Tx channel in immediate response to the paging request. For example, as shown in FIG. 8A, after receiving the paging request for the SIM card 2 at the T7 moment, the terminal may send the signaling packet X0 in a next uplink slot (namely, a slot "2-U" of a period 5, a T5 moment) in immediate response to the paging request, and send the signaling packet X1 in a next uplink slot (namely, a slot "7-U" of a period 6, a T6 moment).

Figure 8B:
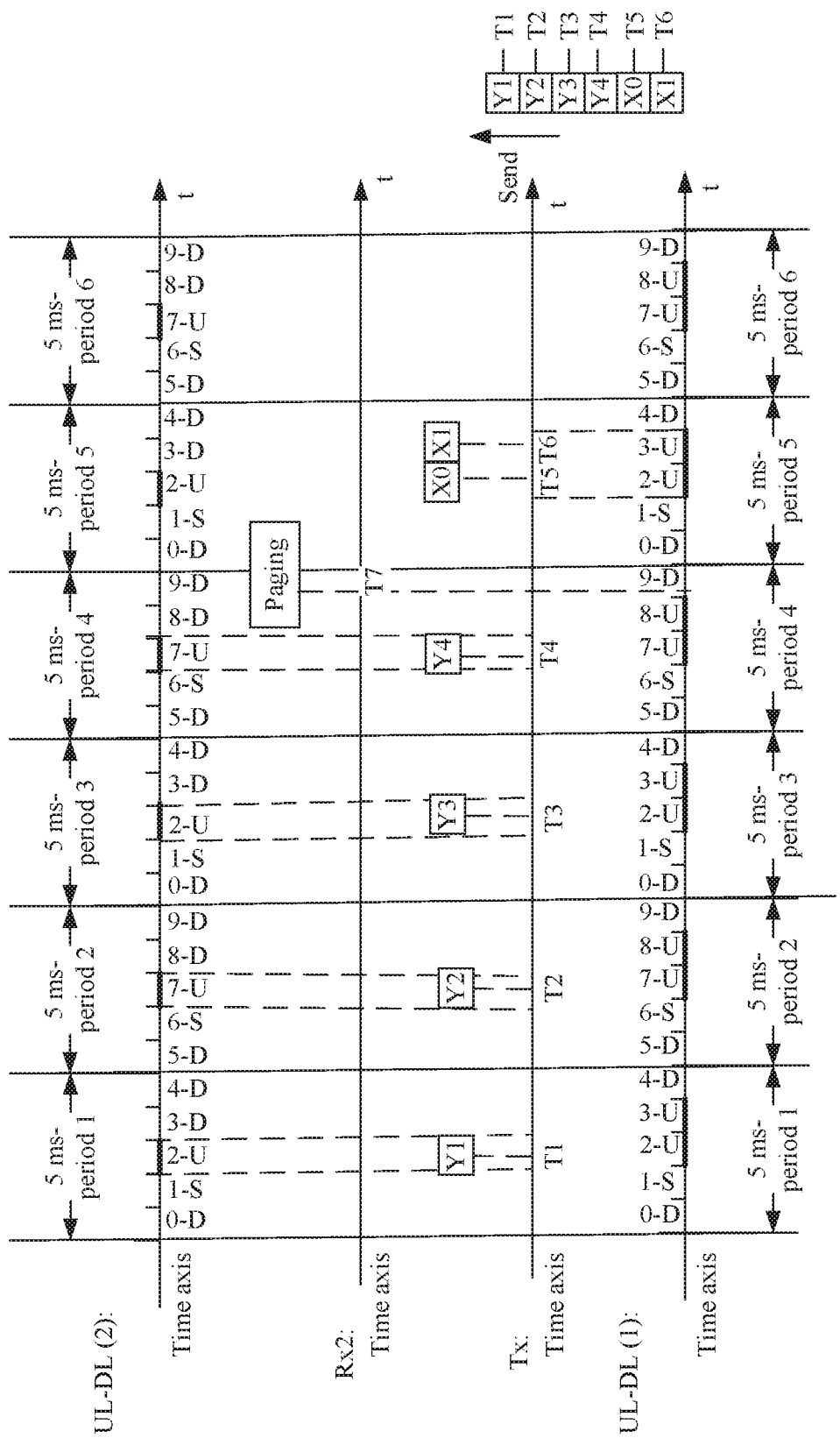
FIG. 8B is a schematic diagram 5 of an example of a log according to an embodiment of the present invention.

In some other embodiments, it is assumed that the terminal uses the slot configuration of UL-DL (2) shown in Table 1 to perform voice communication of the SIM card 1, and uses the slot configuration of UL-DL (1) shown in Table 1 to perform voice communication of the SIM card 2. As shown in FIG. 8B, after receiving the paging request for the SIM card 2 at the T7 moment, the terminal may send the signaling packet X0 at a slot "2-U" of a period 5 of UL-DL (1) (namely, a T5 moment) in immediate response to the paging request, and send the signaling packet X1 in a slot "3-U" of the period 5 of UL-DL (1) (namely, a T6 moment).

The terminal 110 may perform S506 and a subsequent method procedure in response to the paging request.

S506. The terminal 110 sends RRC signaling to a network device in response to the paging request, and sets up an RRC connection to the network device based on the SIM card 2.

S507. The terminal 110 exchanges SIP signaling with the network device.

It can be understood that, in this embodiment of the present invention, that the terminal 110 delays responding to the paging request when sending the voice packet of the SIM card 1 may specifically include: the terminal 110 delays sending the RRC signaling and the SIP signaling of the SIM card 2 when sending the voice packet of the SIM card 1.

S508. The terminal 110 receives incoming call information, sent by the network device, of the SIM card 2.

After the terminal 110 obtains the incoming call information from the network device, the method in some embodiments of the present invention may further include S509:

S509. The terminal 110 gives an incoming call notification of the SIM card 2.

For example, that the terminal 110 gives an incoming call notification includes: the terminal 110 gives an incoming call notification in one or more of the following notification manners: The terminal 110 rings, a user interface of the terminal 110 displays an incoming call from a user C, the terminal vibrates, a camera flash of the terminal flashes, and so on.

As prompted by the incoming call notification, a user may choose to decline an incoming call request for the SIM card 2, and continue with a voice call of the SIM card 1. Alternatively, the user may choose to hang up the voice call of the SIM card 1, and accept a voice call of the SIM card 2.

Figures 9A, 9B:
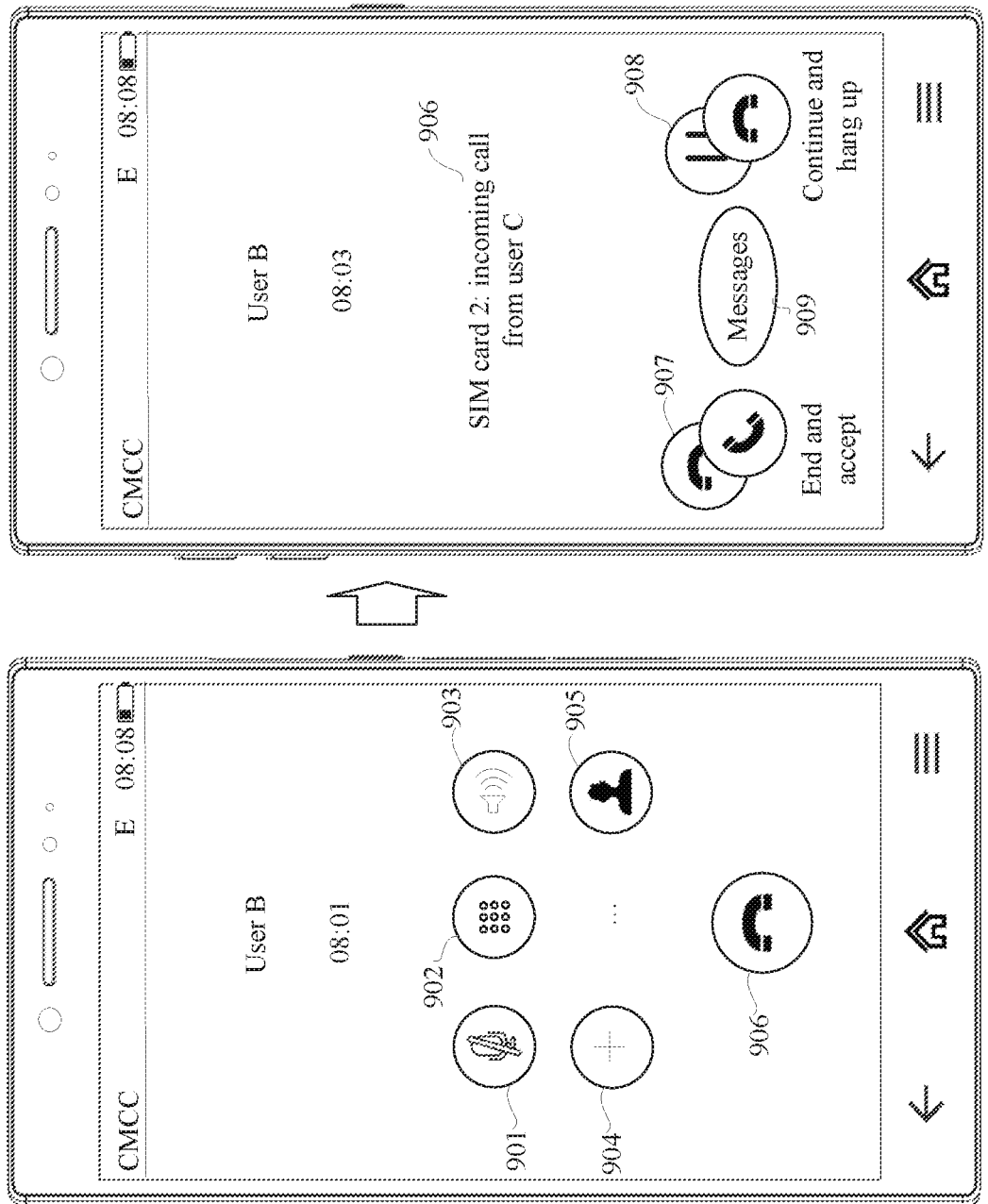
FIG. 9A and FIG. 9B are a schematic diagram 1 of a GUI, according to an embodiment of the present invention, displayed when a terminal performs a method in an embodiment of the present invention.

For example, FIG. 9A and FIG. 9B are a schematic diagram of an example of a terminal call screen according to an embodiment of the present invention. In a process in which the terminal 110 performs a voice call with the terminal 120 (a user B) by using the SIM card 1, assuming that contact information of the user B is stored in contacts of the terminal 110, the terminal 110 may display a graphical user interface (Graphical User Interface, GUI) shown in FIG. 9A. The GUI shown in FIG. 9A may include: icons such as incoming call user information (for example, "user B"), call time information, "for example, 08:01", a mute icon 901, a dial pad icon 902, a speaker icon 903, an add call icon 904, a contacts icon 905, and a hang up icon 906. For functions of the icons shown in FIG. 9A, refer to descriptions about functions of corresponding icons in the prior art. Details are not described herein in this embodiment of the present invention.

In a process in which the SIM card 1 of the terminal 110 performs a voice call with the terminal 120, if the terminal 110 receives an incoming call from the user C for the SIM card 2, after obtaining the incoming call information of the SIM card 2 (for example, a phone number of the user C), the terminal 110 can display a graphical user interface (Graphical User Interface, GUI) shown in FIG. 9B. The GUI shown in FIG. 9B may include: icons such as incoming call notification information of the SIM card 2 (for example, "SIM card 2: incoming call from user C") 906, an end and accept icon 907, a continue and hang up icon 908, and a messages icon 909. The icon 907 is used to end an original call (namely, the call of the SIM card 1 with the user B) and accept a new call (namely, the call of the SIM card 2 with the user C). The icon 908 is used to continue with the original call (namely, the call of the SIM card 1 with the user B) and hang up the new call (namely, the call of the SIM card 2 with the user C). The messages icon 909 is used to enter a message editing window, to send a message such as "I'll contact you later!", or "I'm in a meeting. I'll call you later!" to the terminal 130 (namely, the user C). In some other embodiments, after obtaining the incoming call information of the SIM card 2 (for example, the phone number of the user C), the terminal 110 can display only the incoming call notification information of the SIM card 2 (for example, "SIM card incoming call from user C") 906. In some other embodiments, the messages icon 909 can be displayed after the user chooses to hang up the original call or the new call.

According to the communication method for implementing dual card dual standby dual pass provided in this embodiment of the present invention, when the SIM card 1 of the terminal 110 is in the call state, if the terminal 110 receives the paging request for the SIM card 2, the terminal 110 may delay responding to the paging request when sending the voice packet of the SIM card 1 (in other words, there is a voice packet of the SIM card 1 to be sent on the radio frequency Tx resource). To be specific, the terminal occupies the radio frequency Tx resource to send the RRC signaling in response to the paging request, and sets up the RRC connection to the network device, only when the terminal 110 is not sending a voice packet of the SIM card 1 (in other words, there is no voice packet of the SIM card 1 to be transmitted on the radio frequency Tx resource). In this way, the terminal 110 may give an incoming call notification of the SIM card 2 in response to the paging request for the SIM card 2 without affecting voice call quality of the SIM card 1.

In conclusion, according to this solution, the terminal 110 can implement dual card dual standby dual pass of the terminal without affecting voice call quality of the call card, to improve user experience.

Figure 10:
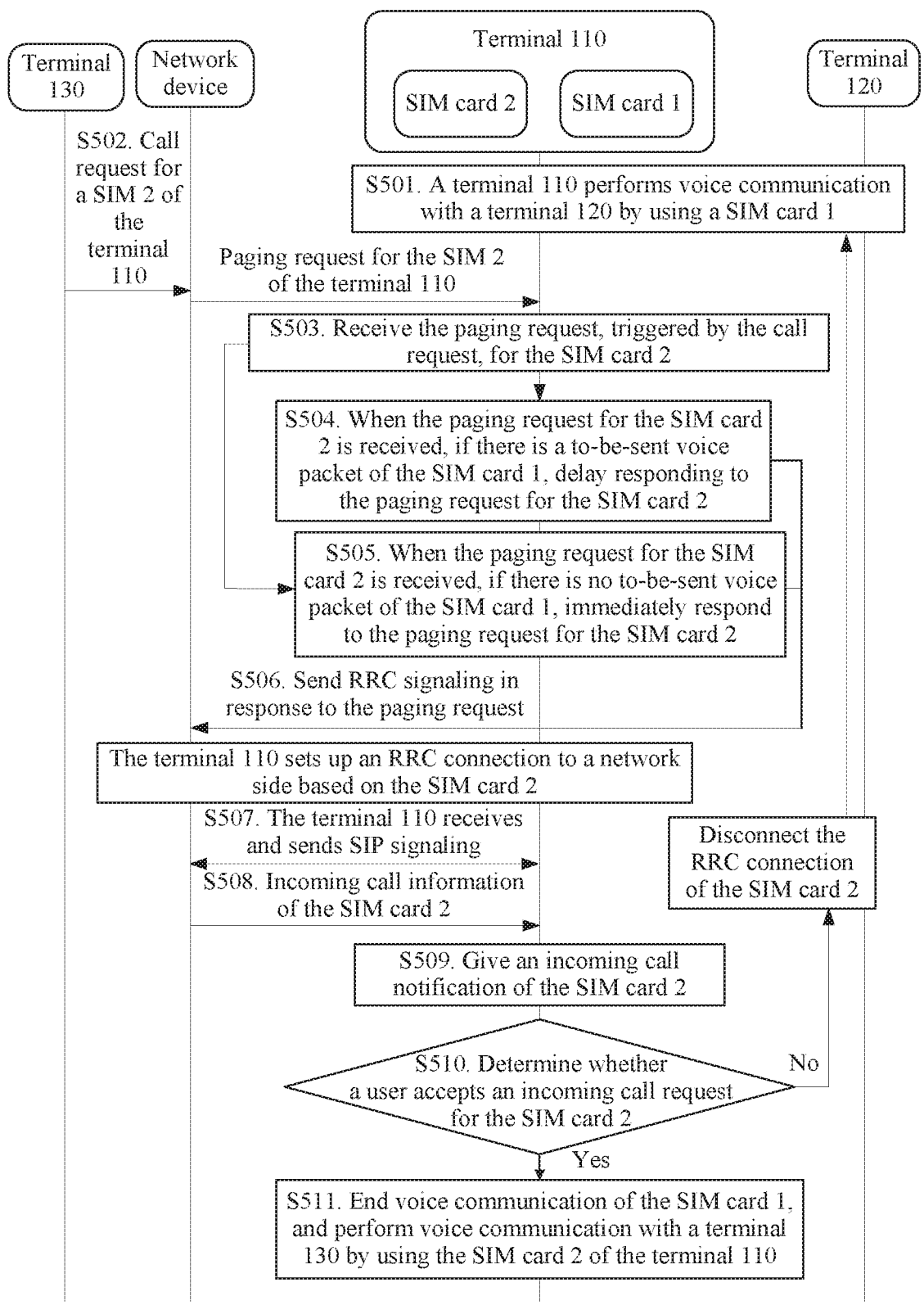
FIG. 10 is a flowchart 2 of a communication method for implementing dual card dual standby dual pass according to an embodiment of the present invention.

In some embodiments, after displaying the GUI shown in FIG. 9A and FIG. 9B, the terminal 110 can determine, based on selection of the icon in the GUI shown in FIG. 9A and FIG. 9B, whether the user accepts an incoming call request for the SIM card 2. As shown in FIG. 10, after S509, the method in this embodiment of the present invention may further include S510:

S510. The terminal 110 determines Whether a user accepts an incoming call request for the SIM card 2.

If the user chooses to decline the incoming call request for the SIM card 2, and continues with the voice call of the SIM card 1, the terminal 110 may disconnect an RRC connection to the SIM card 2. If the user chooses to hang up the voice call of the SIM card 1, and accept the voice call of the SIM card 2, the terminal 110 may continue with S511 and a subsequent method procedure.

S511. The terminal 110 ends voice communication of the SIM card 1, and performs voice communication with the terminal 130 by using the SIM card 2 of the terminal 110.

In a process in which the terminal 110 performs voice communication with the terminal 130 by using the SIM card 2, the SIM card 2 of the terminal 110 occupies the Tx radio frequency resource (namely, the radio frequency Tx channel) of the terminal 110.

Figure 11C:
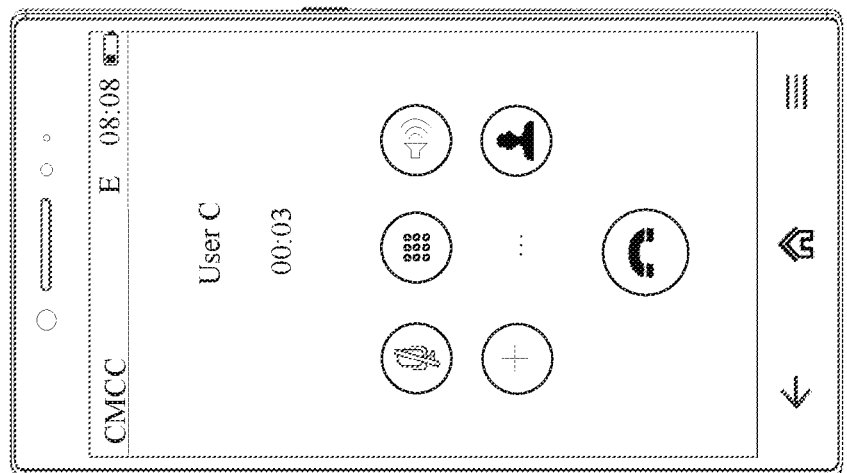
FIG. 11A, FIG. 11B, and FIG. 11C are a schematic diagram 2 of a GUI, according to an embodiment of the present invention, displayed when a terminal performs a method in an embodiment of the present invention.
Figure 11B:
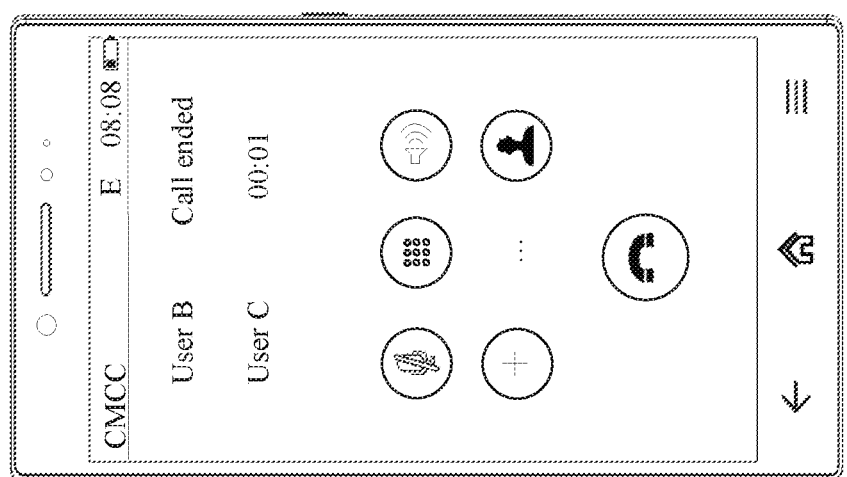
Figure 11A:
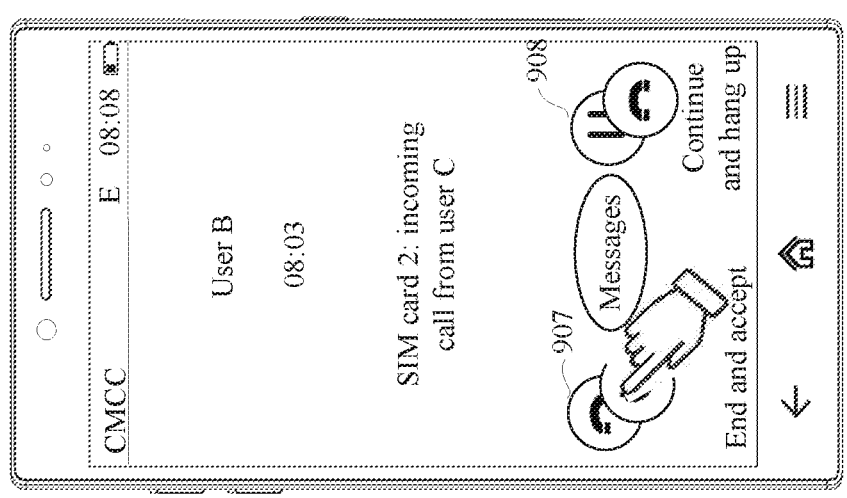

As shown in FIG. 11A, when a finger of the user touches or approaches an icon 907 on a display panel shown in FIG. 11A, it indicates that the user wants to end an original call (namely, the call of the SIM card 1 with the user B) and accept a new call (namely, the call of the SIM card 2 with the user C). A touch panel of the terminal 110 detects the touch event on or near the touch panel, and transmits the touch event to a processor 410, to determine an instruction corresponding to the touch event. Then the processor 410 instructs, according to the instruction, the display panel to display a GUI shown in FIG. 11B, so that the user can perform voice communication with the user C. As shown in FIG. 11B and FIG. 11C, the terminal 110 may display a GUI shown in FIG. 11C after displaying the GUI shown in FIG. 11B for a period of time (for example, three seconds).

In some embodiments, the terminal 110 may directly display the GUI shown in FIG. 11C without displaying the GUI shown in FIG. 11B.

As shown in FIG. 12A, when a finger of the user touches or approaches an icon 908 on a display panel shown in FIG. 12A, it indicates that the user wants to continue with the original call (namely, the call of the SIM card 1 with the user B) and hang up the new call (namely, the call of the SIM card 2 with the user C). The touch panel of the terminal 110 detects the touch event on or near the touch panel, and transmits the touch event to the processor 410, to determine an instruction corresponding to the touch event. Then the processor 410 instructs, according to die instruction, the display panel to display a GUI shown in FIG. 12B, so that the user can continue with voice communication with the user B. As shown in FIG. 12B and FIG. 12C, the terminal 110 may display a GUI shown in FIG. 12C after displaying the GUI shown in FIG. 12B for a period of time (for example, two seconds).

In some embodiments, the terminal 110 may directly display the GUI shown in FIG. 12C without displaying the GUI shown in FIG. 129.

Optionally, as prompted by the incoming call notification, the user may alternatively choose to hold the voice call of the SIM card 1 (the voice call of the SIM card 1 is hold), and accept the voice call of the SIM card 2.

For example, the terminal 110 can display an option "Hold the original call and accept the new call" in an incoming call notification interface. When the user chooses to hold the original call and accept the new call, the terminal 110 can hold the original call (the voice call between the SIM card 1 and the terminal 120), and accept the new call (the voice call between the SIM card 2 and the terminal 130). To be specific, the SIM card 2 is controlled to temporarily occupy the radio frequency Tx resource, to resume answering the original call after ending the new call or holding the new call. Most uplink data packets of the SIM card corresponding to the held (that is, hold hold) voice call are null packets.

For example, with reference to an example of a terminal call interface shown in FIG. 11A, in a process in which the SIM card 1 of the terminal 110 performs a voice call with the terminal 120, if the SIM card 2 receives an incoming call of the user C, after the terminal 110 obtains incoming call information of the SIM card 2 (for example, the phone number of the user C), the terminal can display a GUI shown in FIG. 13A if the phone number of the incoming call of the SIM card 2 and information about the user C are stored in contacts of the terminal 110. In addition to the icon 906, the icon 907, the icon 908, and the icon 909 shown in FIG. 9B, the GUI shown in FIG. 13A may further include a hold and accept icon 910.

Figure 15A:
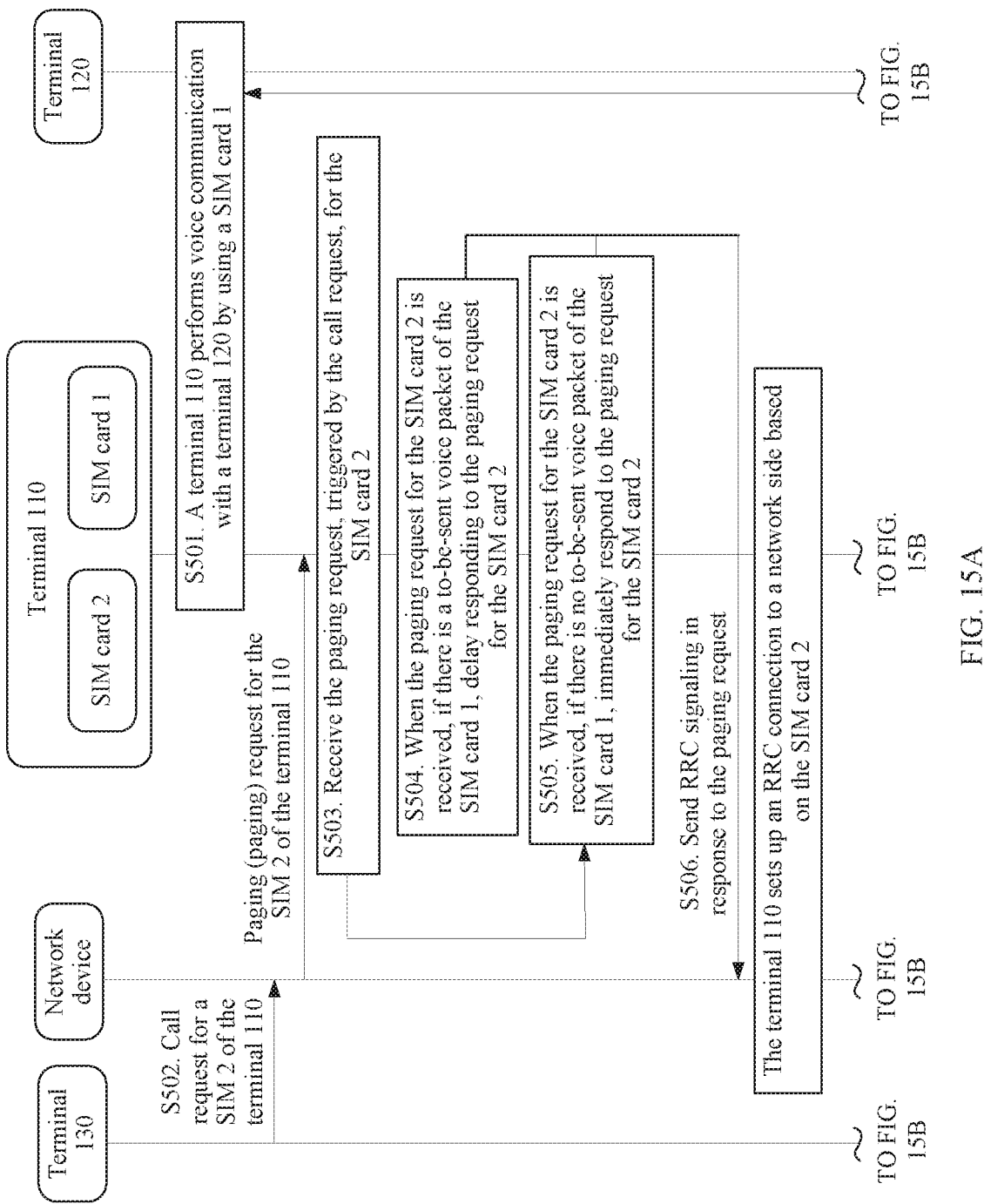
FIG. 15A and FIG. 15B are a flowchart 3 of a communication method for implementing dual card dual standby dual pass according to an embodiment of the present invention.
Figure 15B:
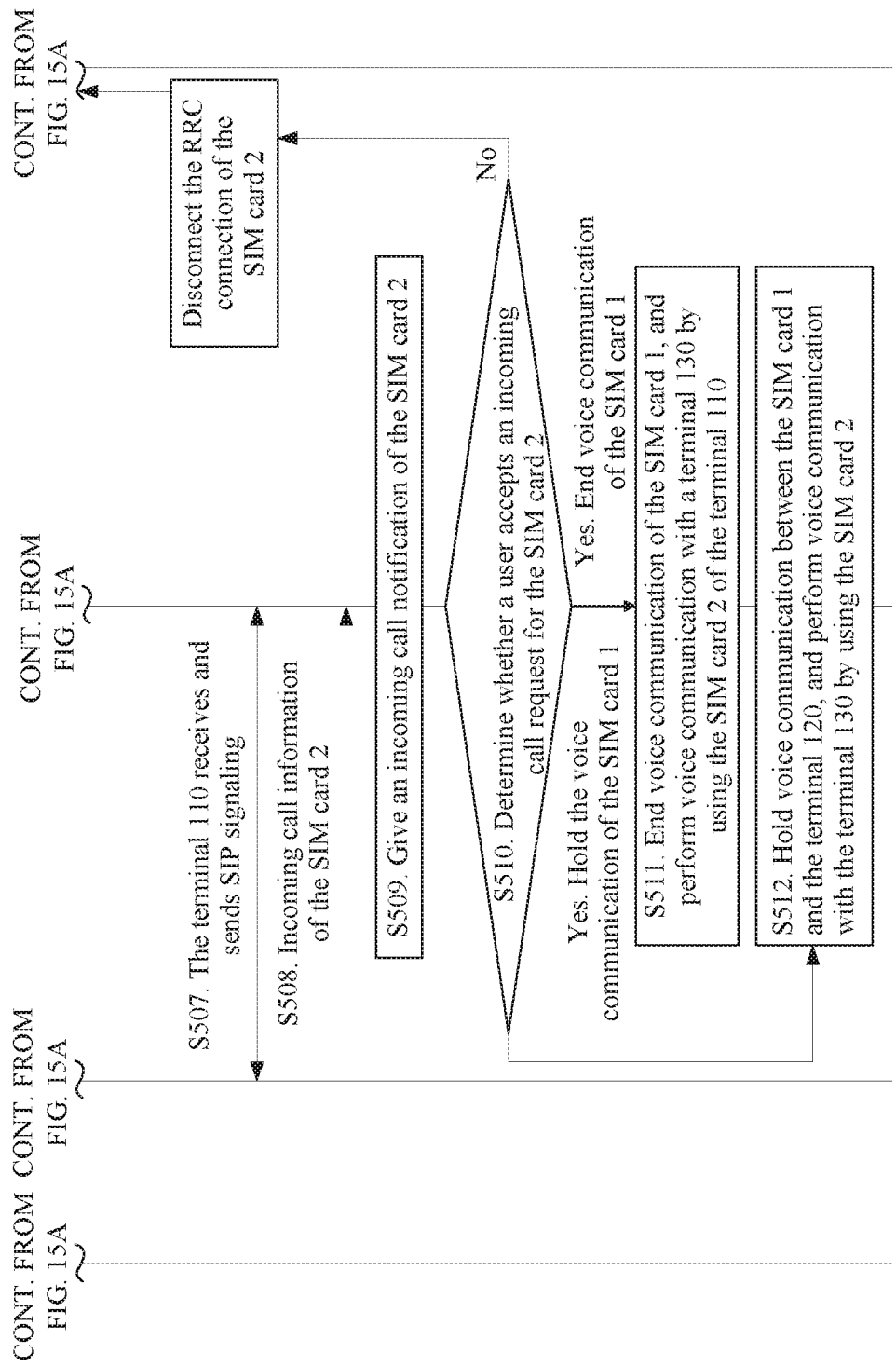

As shown in FIG. 15A and FIG. 15B, after S510, if the user chooses to hold the voice call of the SIM card 1 and accept the voice call of the SIM card 2, S512 may be further performed.

S512. The terminal 110 holds voice communication between the SIM card 1 and the terminal 120, and performs voice communication with the terminal 130 by using the SIM card 2.

When a voice call request for the SIM card 2 (namely, the incoming call request of the user C) is more important, the user A needs to accept the incoming call request of the user C, and the user A does not want to hang up the original call, the user A can select the hold and accept icon 910, to control the terminal 110 to hold the original call (the voice call between the SIM card 1 and the terminal 120) and accept the new call (the voice call between the SIM card 2 and the terminal 130). To be specific, the SIM card 2 is controlled to temporarily occupy the radio frequency Tx resource, to resume answering the original call after ending the new call or holding the new call.

As shown in FIG. 139, when a finger of the user touches or approaches an icon 510 on a display panel shown in FIG. 13B, it indicates that the user wants to hold the original call (namely, the call of the SIM card 1 with the user B) and accept the new call (namely, the call of the SIM card 2 with the user C). The touch panel of the terminal 110 detects the touch event on or near the touch panel, and transmits the touch event to the processor 410, to determine an instruction corresponding to the touch event. Then the processor 410 instructs, according to the instruction, the display panel to display a GUI shown in FIG. 13C, so that the user can hold the original call and perform voice communication with the user C.

Figure 14A:
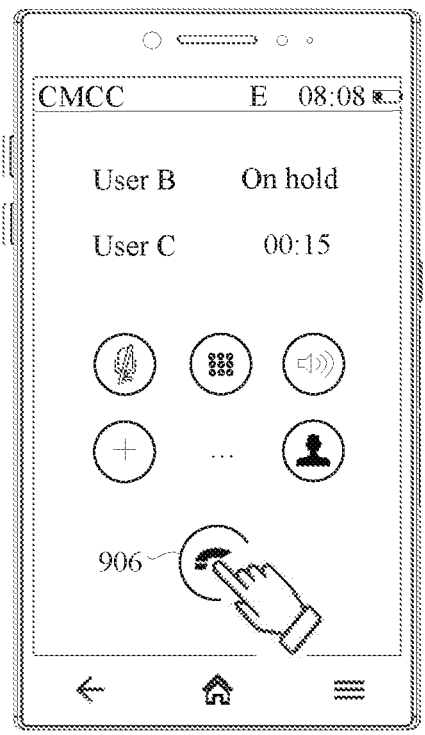
FIG. 14A, FIG. 14B, FIG. 14C, and FIG. 14D are a schematic diagram 5 of a GUI, according to an embodiment of the present invention, displayed when a terminal performs a method in an embodiment of the present invention.
Figure 14B:
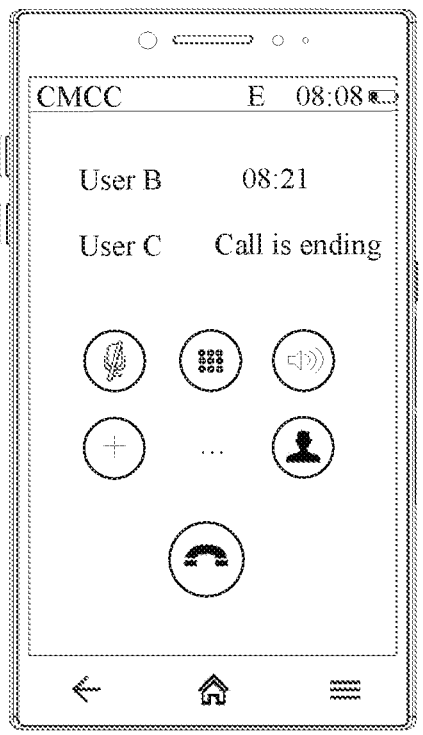
Figure 14D:
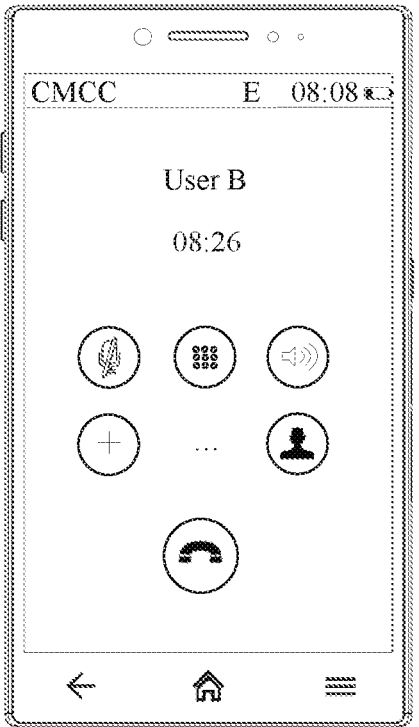
Figure 14C:
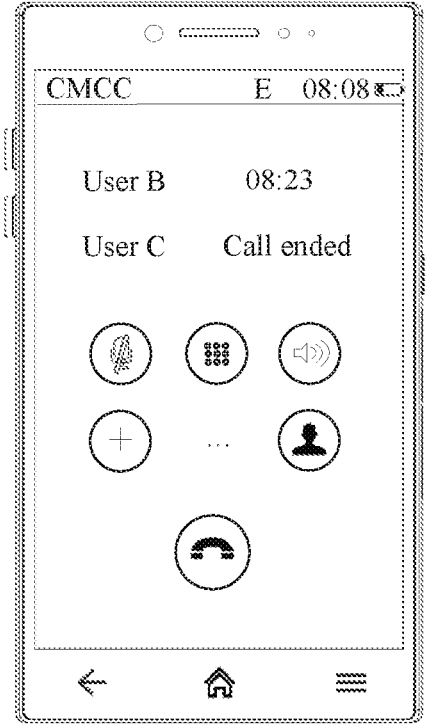

As shown in FIG. 14A, when a finger of the user touches or approaches a hang up icon 506 on a display panel shown in FIG. 14A, it indicates that the user wants to end the new call (namely, the call of the SIM card 2 with the user C) and continue with the original call (namely, the call of the SIM card 1 with the user 9). The touch panel of the terminal 110 detects the touch event on or near the touch panel, and transmits the touch event to the processor 410, to determine an instruction corresponding to the touch event. Then the processor 410 instructs, according to the instruction, the display panel to display a GUI shown in FIG. 14B, so that the user can continue with voice communication with the user B. As shown in FIG. 14B and FIG. 14C, the terminal 110 may display a GUI shown in FIG. 14C after displaying the GUI shown in FIG. 13B for a period of time (for example, two seconds). As shown in FIG. 14C and FIG. 14D, the terminal 110 may display a GUI shown in FIG. 14D after displaying the GUI shown in FIG. 14C for a period of time (for example, three seconds).

In some embodiments, the terminal 110 may directly display the GUI shown in FIG. 14C or the GUI shown in FIG. 14D without displaying the GUI shown in FIG. 14B.

Optionally, the terminal 110 further stores a transmit priority rule of a data packet (an uplink data packet) of the first communications connection and a data packet (an uplink data packet) of the second communications connection, and a terminal state corresponding to the transmit priority rule. The transmit priority rule is used to indicate, in a corresponding terminal state, transmit priorities of a data packet of the first communications connection and a data packet of the second communications connection on the radio frequency transmit resource of the terminal.

In this embodiment of the present invention, the terminal 110 can send, according to a rule of transmit priorities of occupying the radio frequency Tx channel by the SIM card 1 and the SIM card 2 when the terminal 110 is in different terminal states, an uplink data packet of the SIM card 1 or the SIM card 2 on the radio frequency Tx channel. When the terminal 110 is in different states, the rule of transmit priorities of occupying the radio frequency Tx channel by the SIM card 1 and the SIM card 2 may be prestored in the terminal 110, The terminal 110 can determine, based on a current terminal state of the terminal 110, the rule of transmit priorities of occupying the radio frequency Tx channel by the SIM card 1 and the SIM card 2.

In some embodiments, the paging request initiated by the terminal 130 to the SIM card 2 of the terminal 110 may be a paging request of a VoLTE service in an LTE network. In these embodiments, voice communication between the terminal 120 and the SIM card 1 of the terminal 110 may be a VoLTE service or a CS domain service.

In the LTE network, after receiving a paging request, the terminal cannot determine whether the paging request is used to request to perform a VoLTE voice service, or is used to request to perform a common data service (such as a network access data service) If the terminal receives, after receiving the paging request and setting up the RRC connection to the network device, an INVITE message sent by the network device, the terminal can determine that the paging request corresponding to the INVITE message is used to request to perform a VoLTE service. If the terminal receives no INVITE message after setting up the RRC connection to the network device, the terminal can determine that the paging request is used to request to perform a common data service.

It can be understood that, if the paging request received by the terminal is used to request to perform a common data service, after the terminal receives the paging request, a voice call of the call card is frequently affected if the terminal directly sets that a transmit priority of a signaling packet of the access card (namely, the SIM card 2) on the radio frequency Tx channel is higher than a transmit priority of a voice packet of the call card on the radio frequency Tx channel.

Figure 16A:
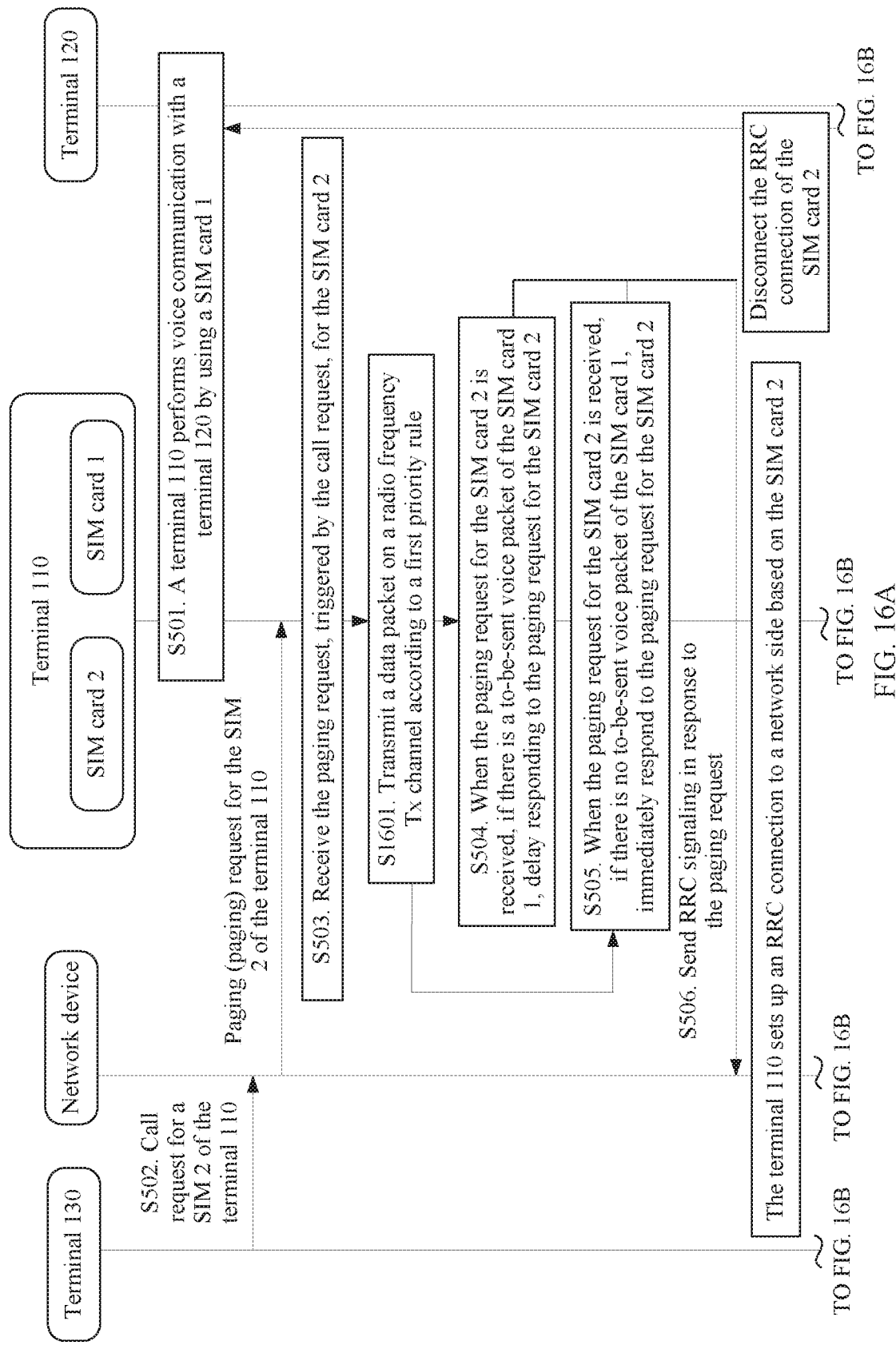
FIG. 16A and FIG. 16B are a flowchart 4 of a communication method for implementing dual card dual standby dual pass according to an embodiment of the present invention.
Figure 16B:
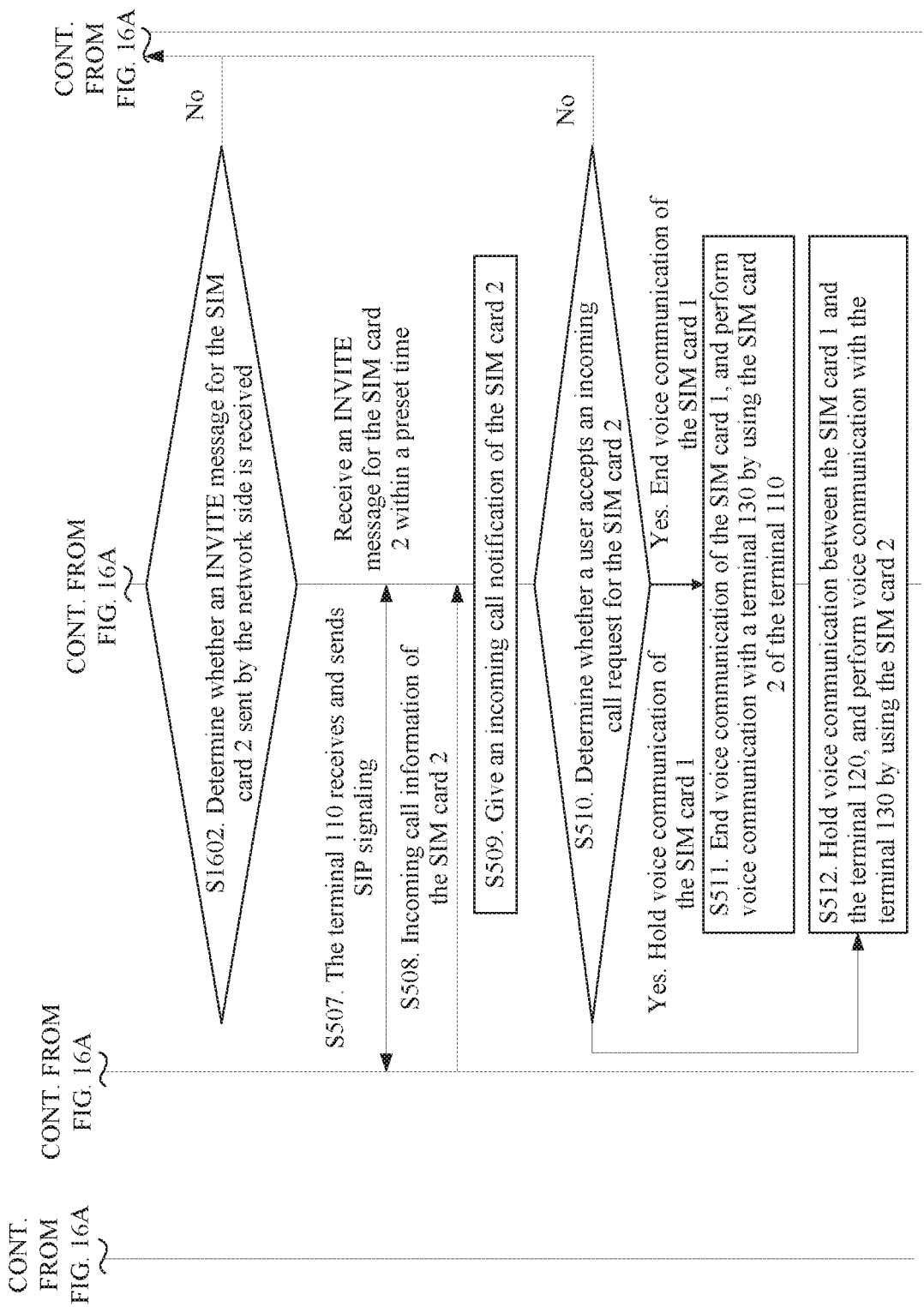

To ensure that voice communication quality of the call card (namely, the SIM card 1) is not affected greatly, after S503 and before S504 and S505, the method in this embodiment of the present invention may further include S1601. For example, as shown in FIG. 16A and FIG. 16B, after S503 shown in FIG. 15A and FIG. 15B and before S504 and S505, the method in this embodiment of the present invention may further include S1601:

S1601. The terminal 110 transmits a data packet on a radio frequency Tx channel according to a first priority rule.

The first priority rule may be a transmit priority rule that is of uplink data packets of the SIM card 1 and the SIM card 2 on the radio frequency Tx channel and that is used by the terminal 110 after the terminal 110 receives the paging request for the SIM card 2 when the SIM card 1 of the terminal 110 is in the call state.

For example, the first priority rule may be set as follows: A transmit priority of a voice packet of the first communications connection on the radio frequency Tx channel is higher than a transmit priority of a first signaling packet on the radio frequency Tx channel. The first signaling packet includes a signaling packet sent in response to the paging request for setting up the second communications connection.

Further, to ensure that voice communication quality of the call card (namely, the SIM card 1) is not affected greatly, and increase a possibility that the signaling packet of the access card occupies the radio frequency Tx channel, the first priority rule may be further set as follows:

1. A transmit priority, of some important uplink data packets (such as an uplink voice packet) related to voice communication of the call card, on the radio frequency Tx channel is higher than a transmit priority of the signaling packet of the access card (namely, the SIM card 2) on the radio frequency Tx channel.

In other words, transmit priorities of all uplink data packets of the first communications connection on the radio frequency transmit resource are higher than the transmit priority of the first signaling packet on the radio frequency transmit resource.

2. A transmit priority, of another uplink data packet (such as an uplink ACK packet, or an uplink network access data service packet) related to voice communication of the call card, on the radio frequency Tx channel is lower than the transmit priority of the signaling packet of the access card (namely, the SIM card 2) on the radio frequency Tx channel.

In other words, the transmit priority of the first signaling packet on the radio frequency transmit resource is higher than a transmit priority of an uplink data packet of another service of a first SIM card on the radio frequency transmit resource. The uplink data packet of the another service is another uplink data packet that is different from all the uplink data packets of the first communications connection and that is in uplink data packets of all services of the first SIM card.

For example, delayed transmission of the uplink network access data service packet of the call card has no impact on voice communication quality of the call card. Delayed transmission of the uplink ACK packet of the call card has no great impact on voice communication quality of the call card either. However, delayed transmission of the signaling packet of the call card, the uplink voice packet of the call card, and an SR packet of the call card has relatively great impact on voice communication quality of the call card. Therefore, the first priority rule may be set as follows:

(1) Transmit priorities of the signaling packet of the call card (namely, the SIM card 1), the uplink voice packet of the call card, and the SR packet of the call card on the radio frequency Tx channel are higher than the transmit priority of the signaling packet of the access card (namely, the SIM card 2) on the radio frequency Tx channel.

(2) The transmit priority of the signaling packet of the access card (namely, the SIM card 2) on the radio frequency Tx channel is higher than transmit priorities of the ACK packet of the call card (namely, the SIM card 1) and the network access data service packet of the call card on the radio frequency Tx channel.

For example, FIG. 2 shows an example of the first priority rule provided in this embodiment of the present invention.

TABLE 2

First priority rule table

| Priority | Packet transmitted on a radio frequency Tx channel |
|---|---|
| High ↑ | Signaling packet, uplink voice packet, and SR packet of a call card |
| | Signaling packet of an access card |
| | ACK packet of a call card |
| | Network access data service packet of a call card |
| Low | |

It can be understood that, normal transmission of the signaling packet, the uplink voice packet, and the SR packet of the call card can ensure that voice communication quality of the call card is not affected, and delayed sending of the ACK packet of the call card and the network access data service packet of the call card has no relatively great impact on voice communication quality of the call card. Therefore, to avoid impact that is caused by occupation of the radio frequency Tx channel by the ACK packet of the call card and the network access data service packet of the call card and imposed on the sending, by the access card (namely, the SIM card 2), the signaling packet to the network device in response to the paging request, in the first priority rule, the transmit priority of the signaling packet of the access card (namely, the SIM card 2) on the radio frequency Tx channel may be higher than the transmit priorities of the ACK packet and the network access data service packet of the call card (namely, the SIM card 1) on the radio frequency Tx channel.

It should be noted that Table 2 is merely an example of the first priority rule in this embodiment of the present invention. The first priority rule in this embodiment of the present invention includes but is not limited to the first priority rule described above and the first priority rule shown in table 2.

For example, FIG. 3 shows another example of the first priority rule provided in this embodiment of the present invention.

TABLE 3

First priority rule table

| Priority | Packet transmitted on a radio frequency Tx channel |
|---|---|
| High ↑ <br><br><br><br> Low | Signaling packet, uplink voice packet, and SR packet of a call card <br> Signaling packet of an access card <br> ACK packet of a call card <br> Low-priority packets of two cards <br> Network access data service packet of a call card |

Low-priority packets of the two cards may include a null packet, a CQI packet, and an SRS packet of the call card, and a null packet, a CQI packet, and an SRS packet of the access card. Even delayed transmission of the low-priority packets of the two cards does not affect voice communication of the call card. Therefore, to mitigate impact of the low-priority packets of the two cards on the signaling packet of the access card, the terminal 110 may set that the transmit priority of the signaling packet of the access card (for example, the SIM card 1) on the radio frequency Tx channel is higher than transmit priorities of the low-priority packets of the two cards on the radio frequency Tx channel.

The terminal 110 preferentially transmits, based on priorities that are of data packets of the two cards and that are indicated by the first priority rule, a data packet having a relatively high priority on the radio frequency Tx channel.

It can be understood that, to ensure voice communication quality of the call card, in the first priority rule, the signaling packet, the uplink voice packet, and the SR packet of the call card have a highest priority. However, in a process of performing a voice service, the SIM card 1 of the terminal 110 does not always occupy the radio frequency Tx channel to send the uplink voice packet. The terminal 110 may respond to the call request for the access card in an idle time period within which the voice packet of the SIM card 1 is not sent on the radio frequency Tx channel. As shown in FIG. 16A and FIG. 16B, after S1601, S504 or S505 may be continued.

After S506, that is, after the SIM card 2 of the terminal 110 sets up the RRC connection to the network device, if the paging request is used to request to perform a VoLTE voice service, the network device may send an INVITE (Invite) message (namely, an INVITE message for the second communications connection) to the terminal 110. If the paging request is used to request to perform a common network access data service, the network device does not send an INVITE message to the SIM card 2 of the terminal 110. Specifically, as shown in FIG. 16A and FIG. 16B, after S506 is performed to set up the RRC signaling to the network device, the method in this embodiment of the present invention may further include S1602:

S1602. The terminal 110 determines whether an INVITE message sent by the network device for the SIM card 2 is received.

If the terminal 110 receives the INVITE message for the SIM card 2 within a preset time (for example, 2 s), it indicates that the paging request is used to request to perform a VoLTE voice service. The terminal 110 can continue to exchange SIP signaling with the network device to obtain the incoming call information of the SIM card 2, and give an incoming call notification (that is, perform S507 to S509). If the terminal 110 receives no INVITE message for the SIM card 2 within a preset time (for example, it indicates that the paging request is used to request to perform a common network access data service for the SINI card 2, the terminal 110 can disconnect the RRC connection and continue with S501 and a subsequent method procedure.

Figure 17A:
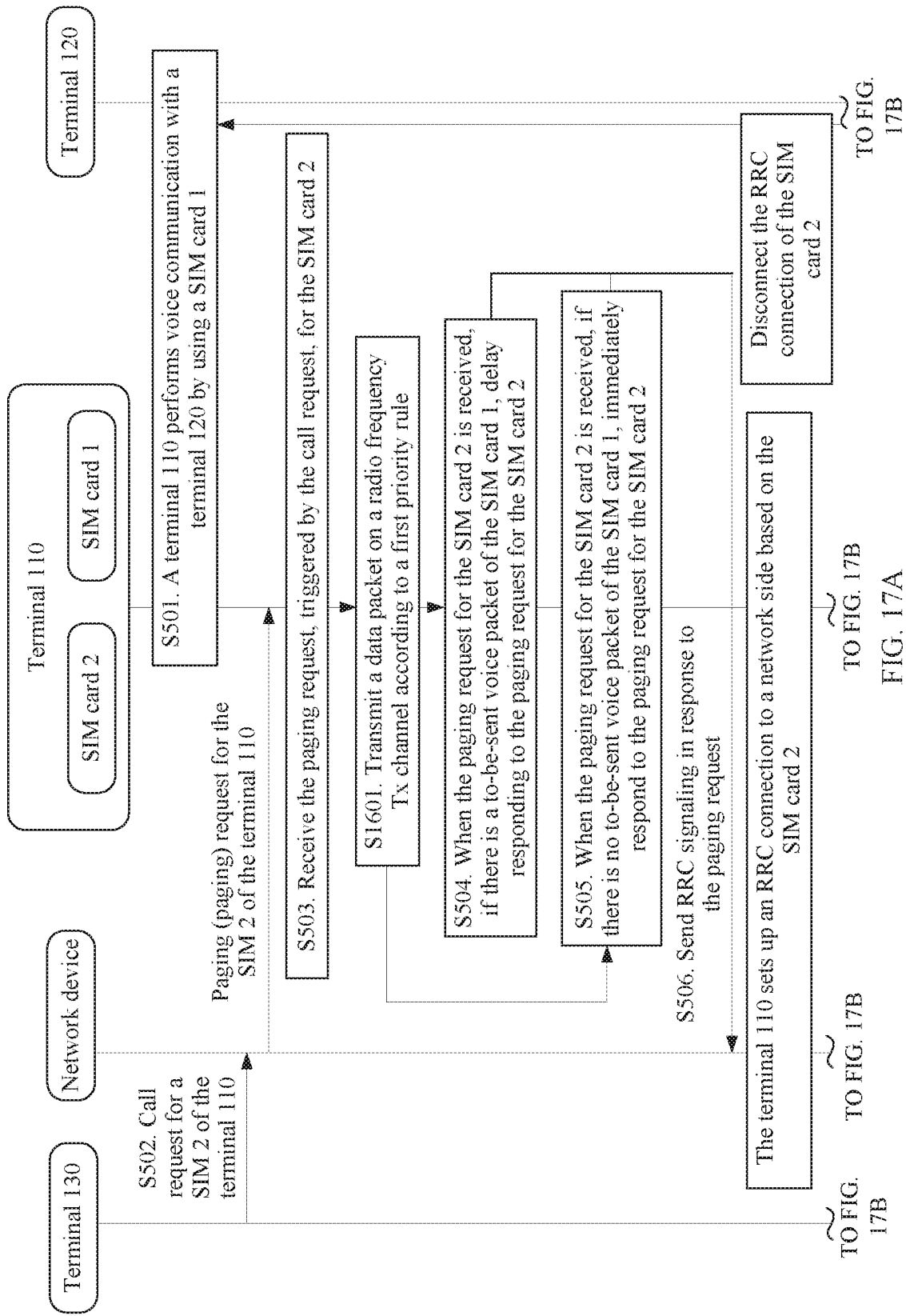
FIG. 17A and FIG. 17B are a flowchart 5 of a communication method for implementing dual card dual standby dual pass according to an embodiment of the present invention.
Figure 17B:
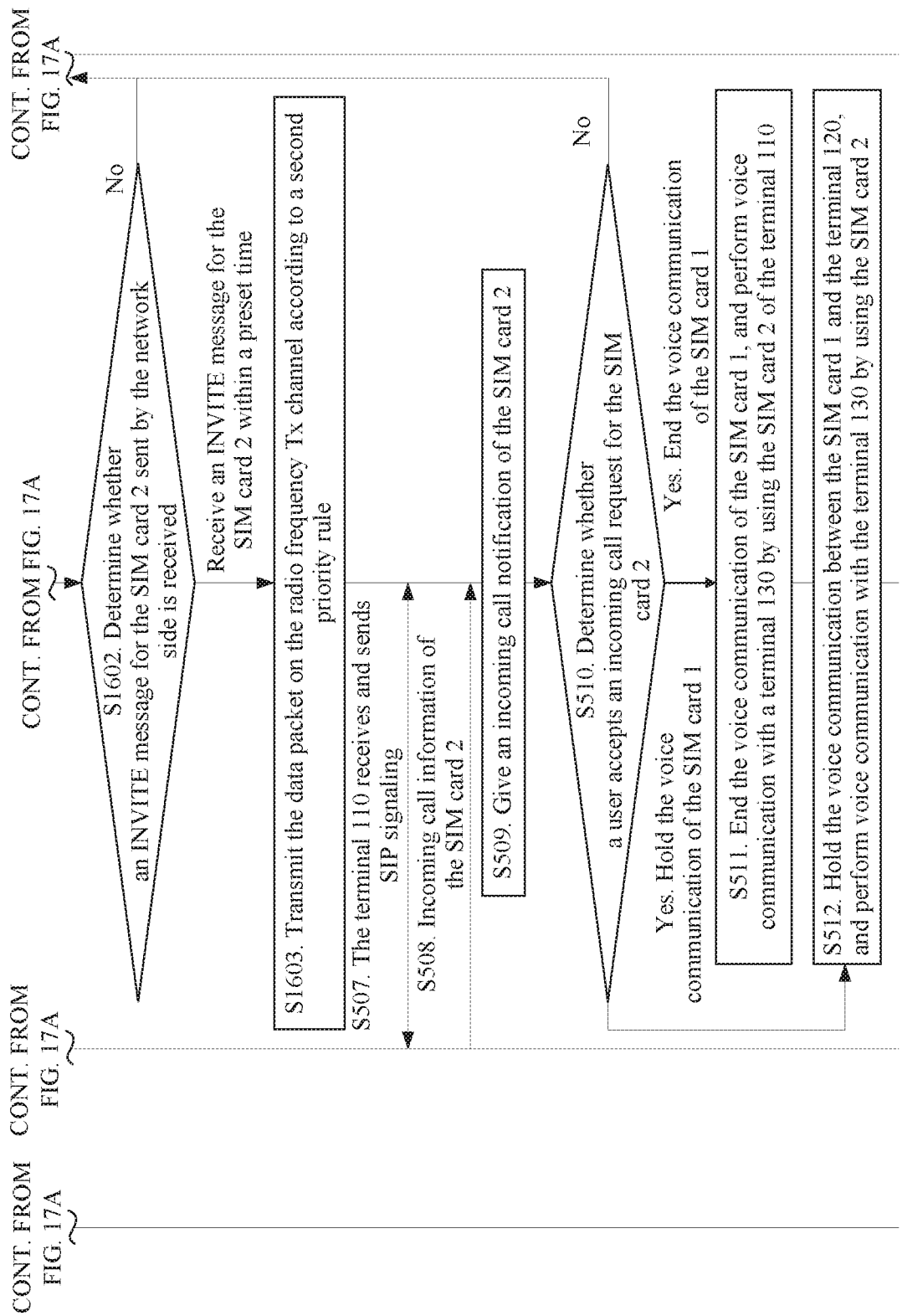

In some embodiments, after receiving the INVITE message, the terminal 110 can determine that the paging request for the SIM card 2 is used to request to perform a VoLTE voice service. In this case, to ensure that the SIM card 2 can use the radio frequency Rx 2 channel and the radio frequency Tx channel to receive and send the SIP signaling and interact with the network device, to obtain the incoming call information of the SIM card 2, and give an incoming call notification, the terminal 110 may set that a priority of an uplink data packet of the access card is higher than a priority of an uplink data packet of the call card. Specifically, as shown in FIG. 17A and FIG. 17B, before S507 to S509 and after S1602, if the terminal 110 receives an INVITE message for the SIM card 2 within a preset time (for example, 2 s), the method in this embodiment of the present invention may further include S1603:

S1603. The terminal 110 transmits a data packet on the radio frequency Tx channel according to a second priority rule.

For example, the second priority rule may be as follows: A transmit priority of an uplink data packet of the second communications connection (namely, the uplink data packet of the access card) on the radio frequency Tx channel is higher than an uplink data packet of the first communications connection (namely, the uplink data packet of the call card) on the radio frequency Tx channel. The uplink data packet of the second communications connection includes the SIP signaling.

For example, the uplink data packet of the access card may include an uplink signaling packet of the access card, uplink data packets of the call card may include all uplink data packets of the call card, such as an uplink signaling packet, an uplink CQI packet, and an uplink SRS packet of the call card, so that in a process in which the access card responds to ring of a call, the call card preempts the radio frequency Tx channel, causing the access card to fail to ring.

For example, FIG. 4 shows an example of a second priority rule provided in this embodiment of the present invention.

TABLE 4

Second priority rule table

| Priority | Packet transmitted on a radio frequency Tx channel |
|---|---|
| High ↑ <br><br> Low | Uplink data packet of an access card <br> Uplink data packet of a call card |

After the terminal 110 transmits a data packet on the radio frequency Tx channel according to the second priority rule, the access card (namely, the SIM card 2) may occupy the radio frequency Tx channel, and use the radio frequency Rx 2 channel and the radio frequency Tx channel to receive and send the SW signaling and interact with the network device, to obtain the incoming call information of the SIM card 2, and give an incoming call notification.

It should be noted that, "the access card occupies the radio frequency Tx channel" in this embodiment of the present invention means that the terminal 110 transmits an uplink data packet of the access card on the radio frequency Tx channel, and "the call card occupies the radio frequency Tx channel" means that the terminal 110 transmits an uplink data packet of the call card on the radio frequency Tx channel.

It can be understood that, after the terminal 110 gives an incoming call notification, the user may choose, according to the incoming call notification, to hang up the voice call of the SIM card 1, and accept the voice call of the SIM card 2. The user may alternatively choose to decline the incoming call request for the SIM card 2 and continue with the voice call of the SIM card 1. The user may alternatively choose to hold the voice call of SIM card 1 and accept the voice call of SIM card 2. Therefore, in a period of time from a time when the terminal obtains the incoming call information from the network device (that is, performs S508) or the SIM card 2 sends the SIP signaling for obtaining the incoming call information to the network device (that is, performs S507) to a time when the user determines whether to accept the incoming call request for the SIM card 2 (that is, performs S510), in order to preferentially ensure voice communication quality of the SIM card 1, the method in some embodiments of the present invention may further include S1801:

S1801. The terminal 110 transmits a data packet on the radio frequency Tx channel according to the first priority rule.

In some other embodiments, the paging request initiated by the terminal 130 to the SIM card 2 of the terminal 110 may be a paging request of a CS domain service. In these embodiments, voice communication between the terminal 120 and the SIM card 1 of the terminal 110 may be a VoLTE service or a CS domain service.

Figure 19A:
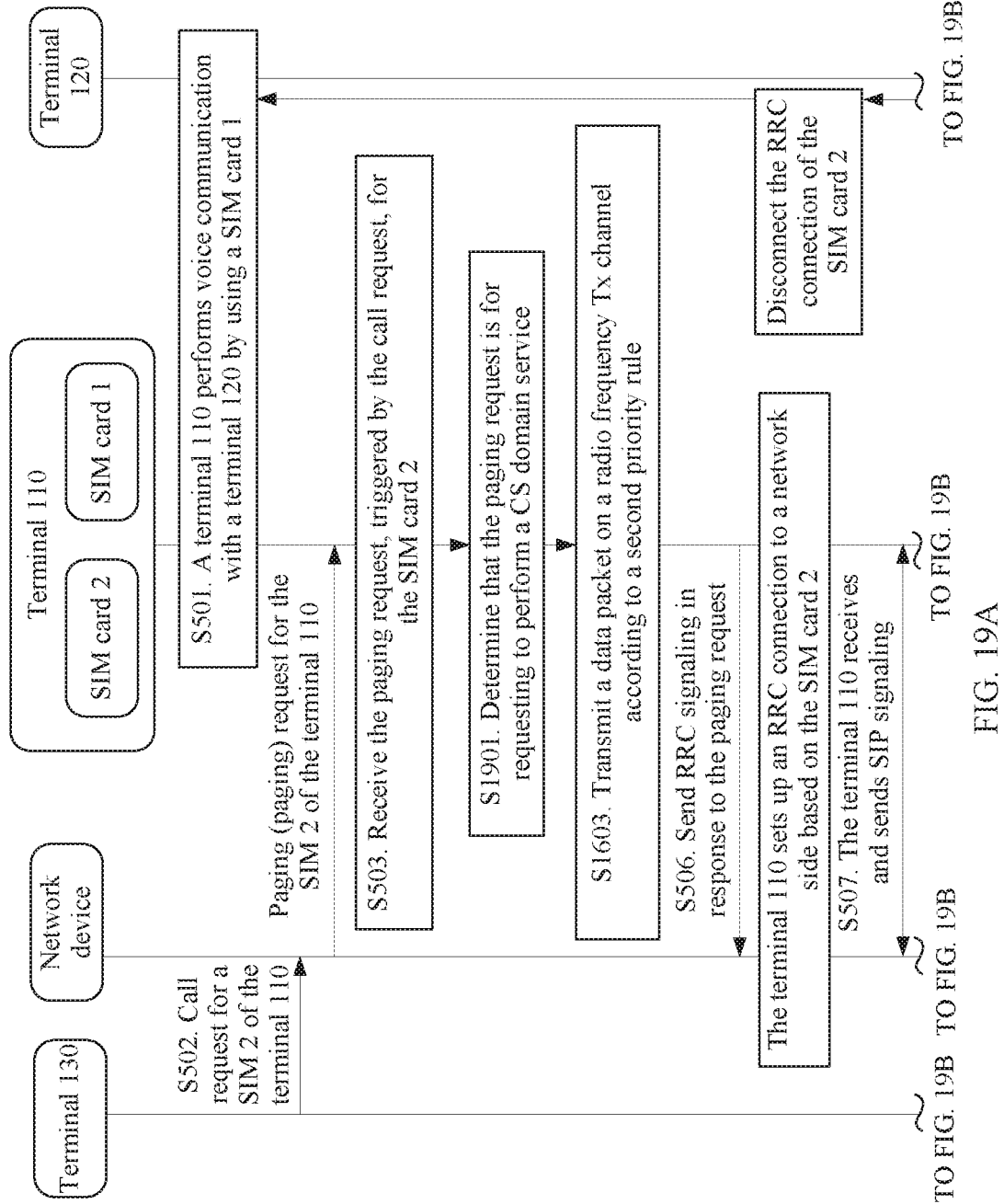
FIG. 19A and FIG. 19B are a flowchart 7 of a communication method for implementing dual card dual standby dual pass according to an embodiment of the present invention.
Figure 19B:
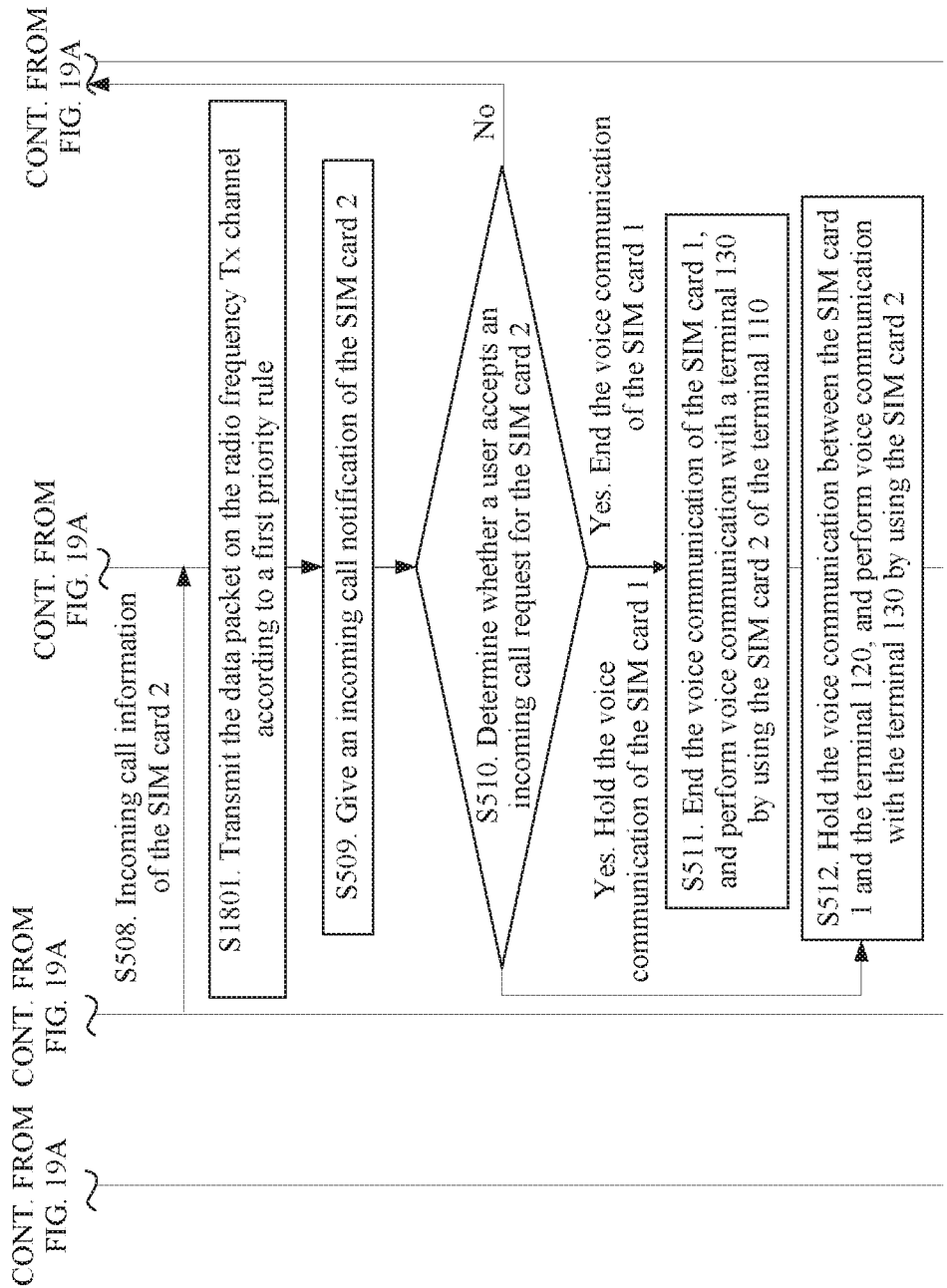

Different from that of the VoLTE service, the paging request of the CS domain service may directly indicate that the paging request is used to request to perform a CS domain service, and the terminal does not need to wait for receiving an INVITE message to determine whether the paging request is used to request to perform a CS domain service or a common data service. Therefore, after the terminal 110 receives the paging request (that is, after S503), if the terminal 110 determines that the paging request is used to request to perform a CS domain service, the terminal 110 can directly perform S1603. As shown in FIG. 19A and FIG. 19B, after S503, the method in this embodiment of the present invention may further include S1901.

S1901. The terminal 110 determines that the paging request is used to request to perform a CS domain service.

If the terminal 110 determines that the paging request is used to request to perform a CS domain service, to ensure that the SIM card 2 can use the radio frequency Rx 2 channel and the radio frequency Tx channel to receive and send the SIP signaling and interact with the network device, to obtain the incoming call information of the SIM card 2, and give an incoming call notification, the terminal 110 may set that a priority of an uplink data packet of the access card is higher than a priority of an uplink data packet of the call card. In other words, after S1901, S1603 may be performed. For detailed descriptions about S1603, refer to related content in this embodiment of the present invention. Details are not described herein again in this embodiment of the present invention.

After the terminal 110 transmits a data packet on the radio frequency Tx channel according to the second priority rule, the access card (namely, the SIM card 2) may occupy the radio frequency Tx channel to send the RRC signaling to the network device through the radio frequency Tx channel (that is, perform S506), to set up the RRC connection to the network device. In other words, after S1901, S506 and a subsequent procedure can be directly performed.

It should be noted that, when the paging request is used to request to perform a CS domain service, the method in this embodiment of the present invention does not include S1602. In other words, as shown in FIG. 19A and FIG. 199, after S506, S507 to S510 can be directly performed.

In addition, when the paging request is used to request to perform a CS domain service, S1801 is optional. In a period of time from a time when the terminal obtains the incoming call information from the network device (that is, performs S508) or the SIM card 2 sends the SIP signaling for obtaining the incoming call information to the network device (that is, performs S507) to a time when the user determines whether to accept the incoming call request for the SIM card 2 (that is, performs S510), execution of S1801 can preferentially ensure voice communication quality of the SIM card 1.

Figure 18A:
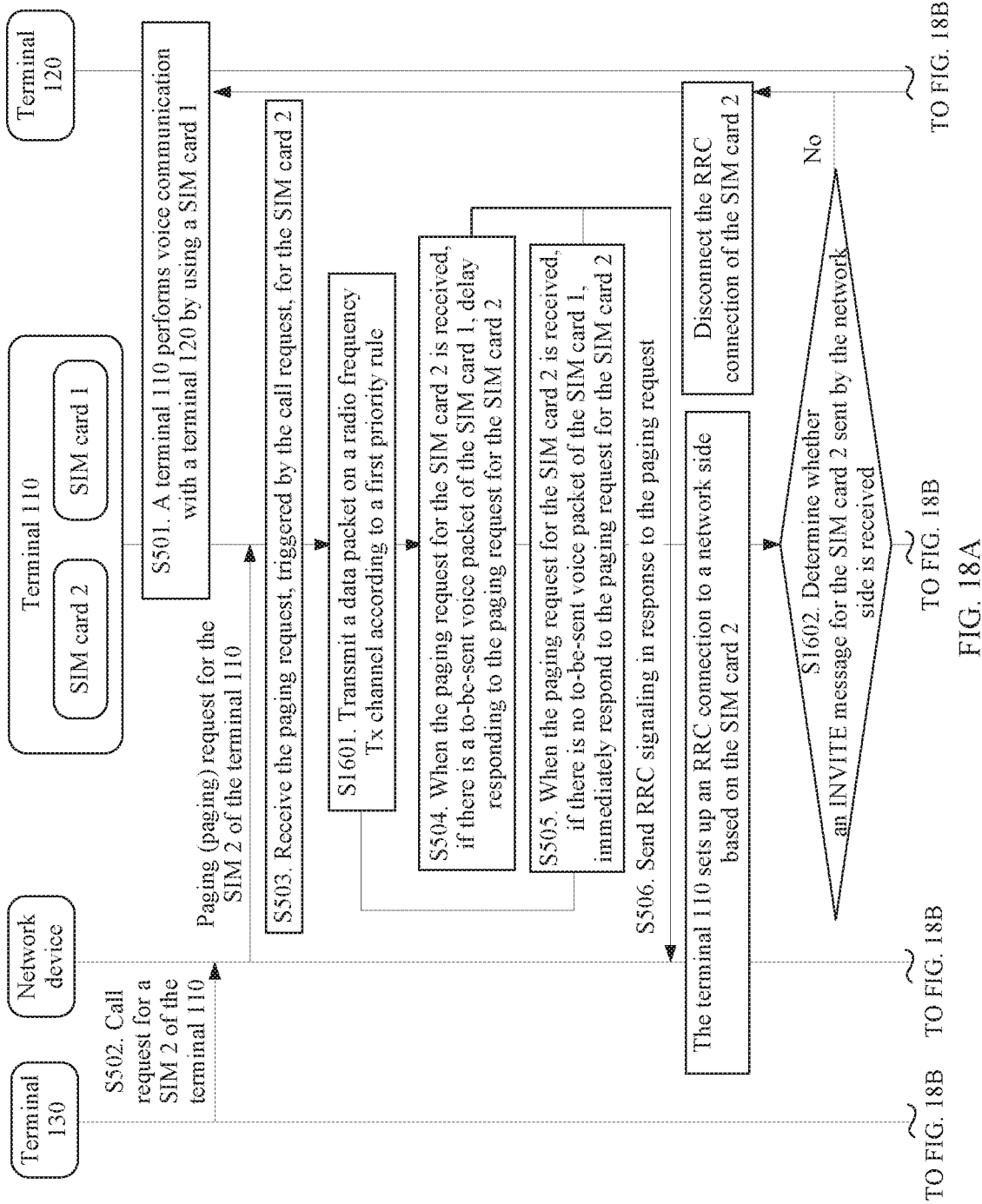
FIG. 18A and FIG. 18B are a flowchart 6 of a communication method for implementing dual card dual standby dual pass according to an embodiment of the present invention.
Figure 18B:
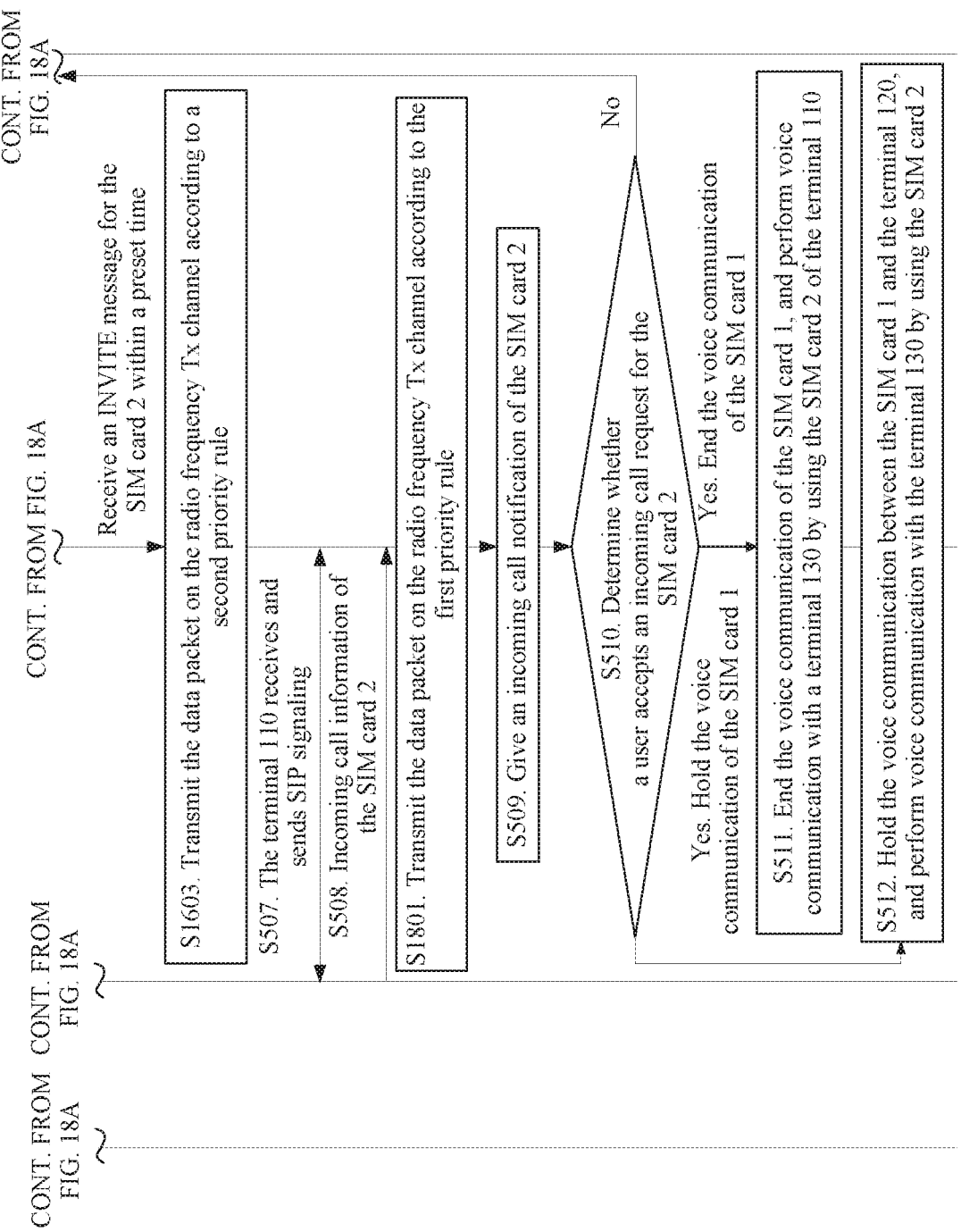
Figure 20A:
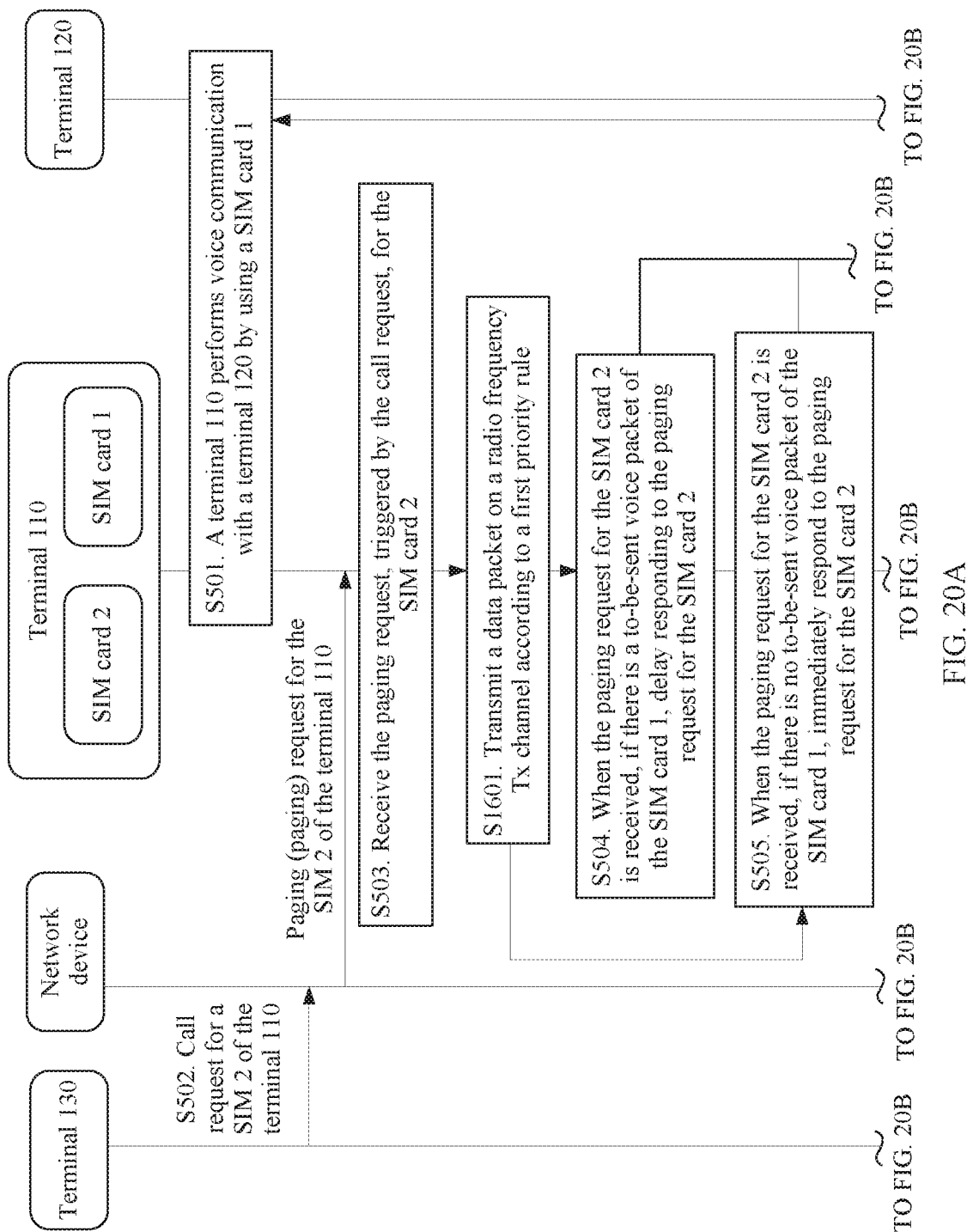
FIG. 20A, FIG. 20B and FIG. 20C are a flowchart 8 of a communication method for implementing dual card dual standby dual pass according to an embodiment of the present invention.
Figure 20B:
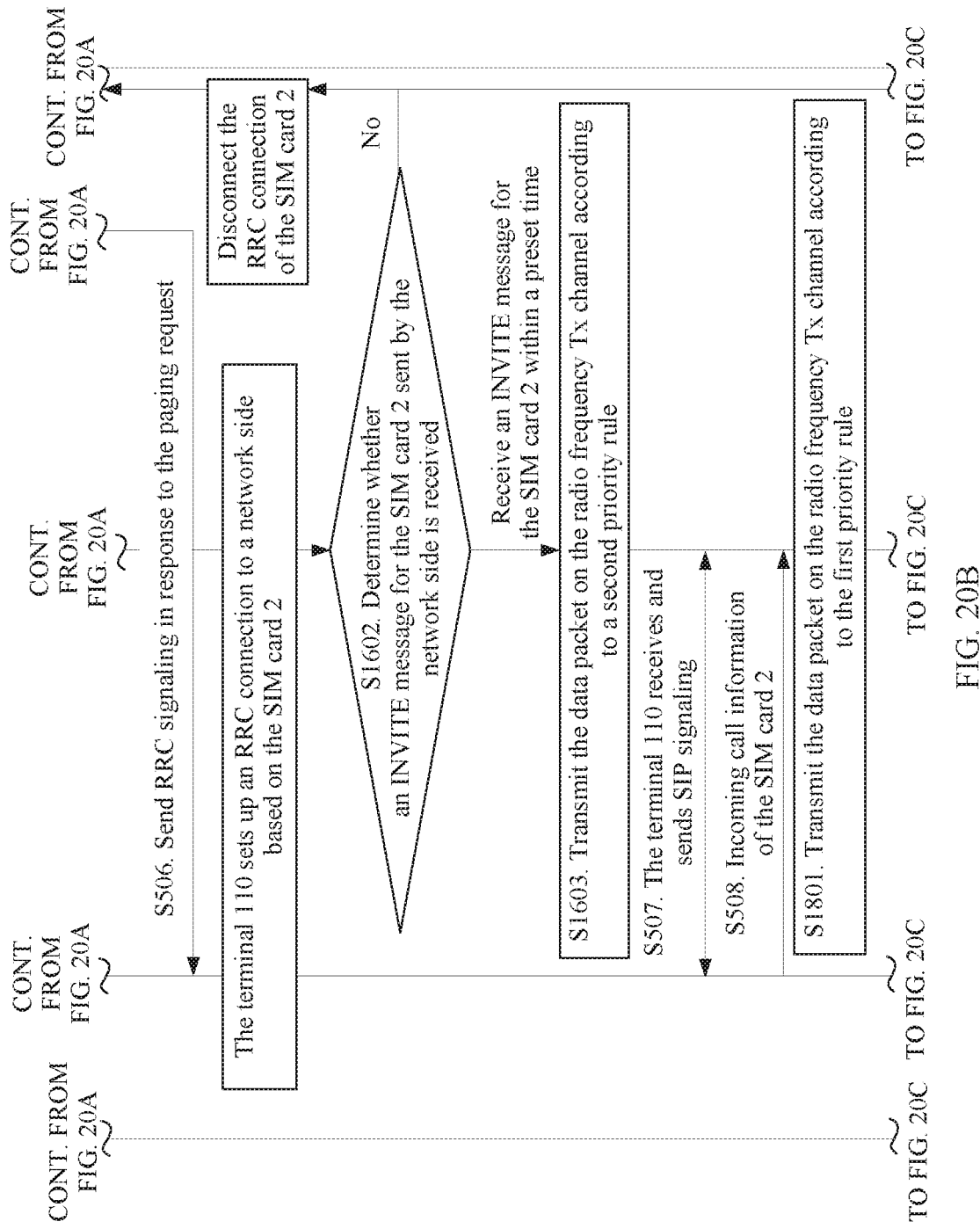
Figure 20C:
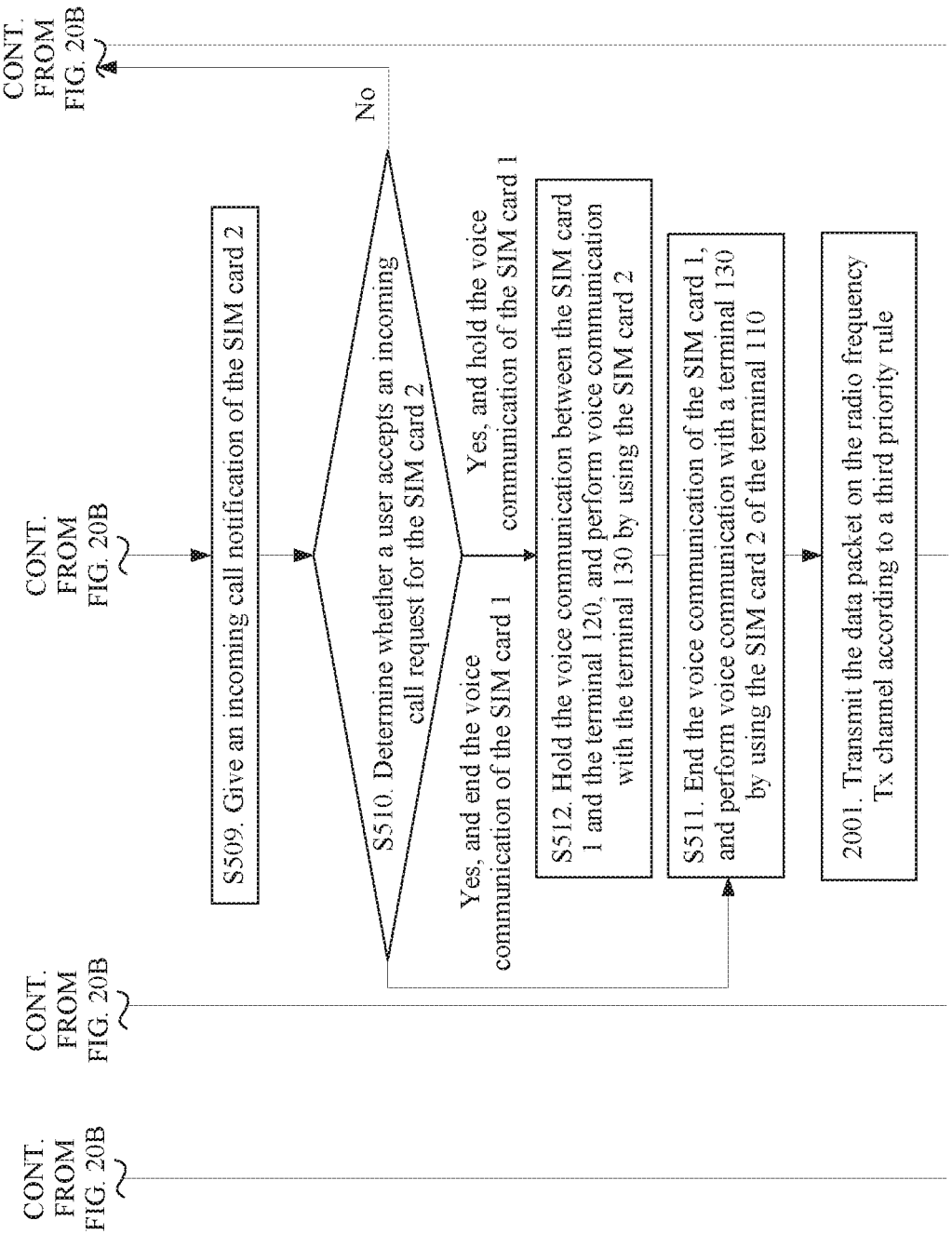
Figure 21A:
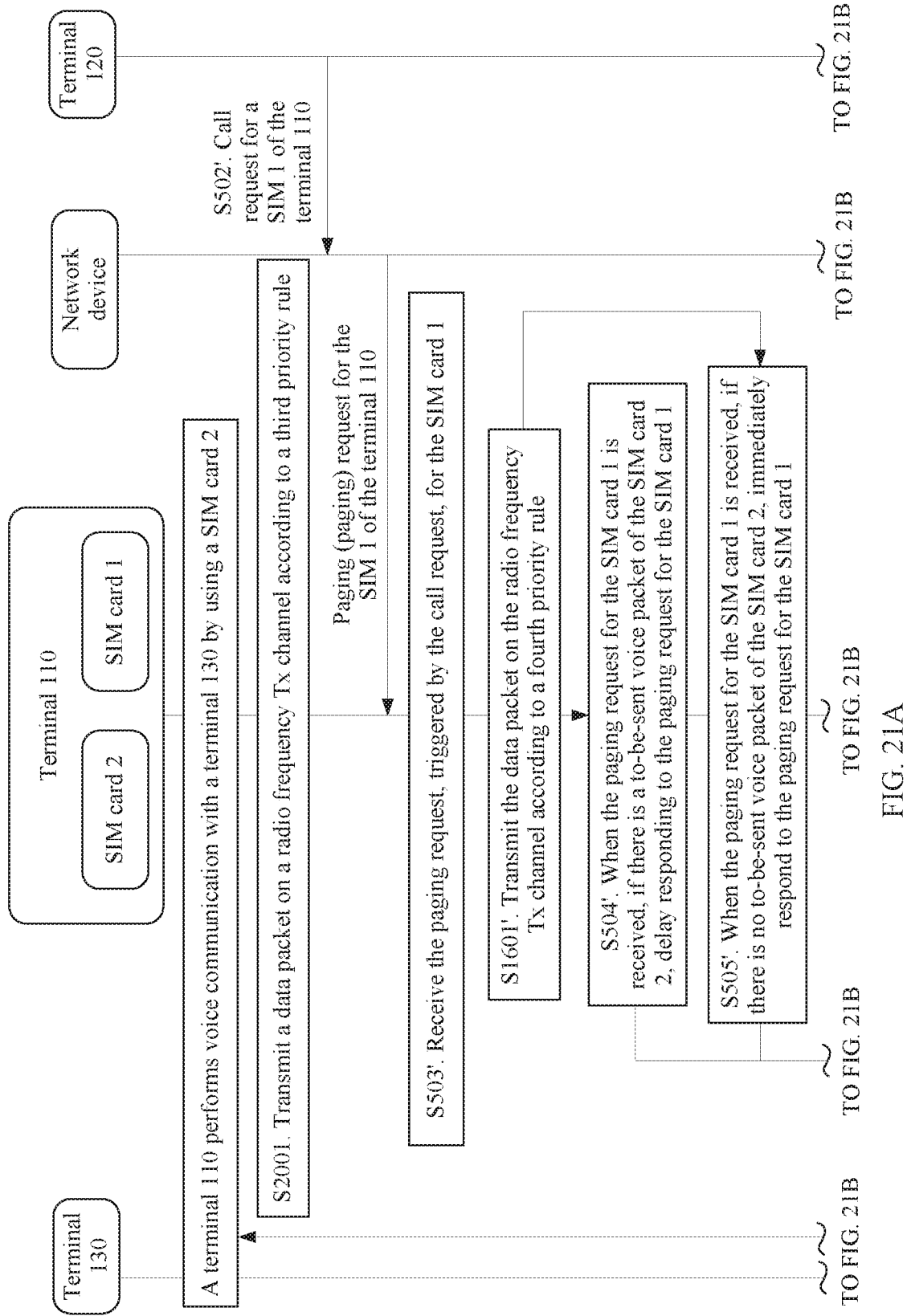
Figure 21B:
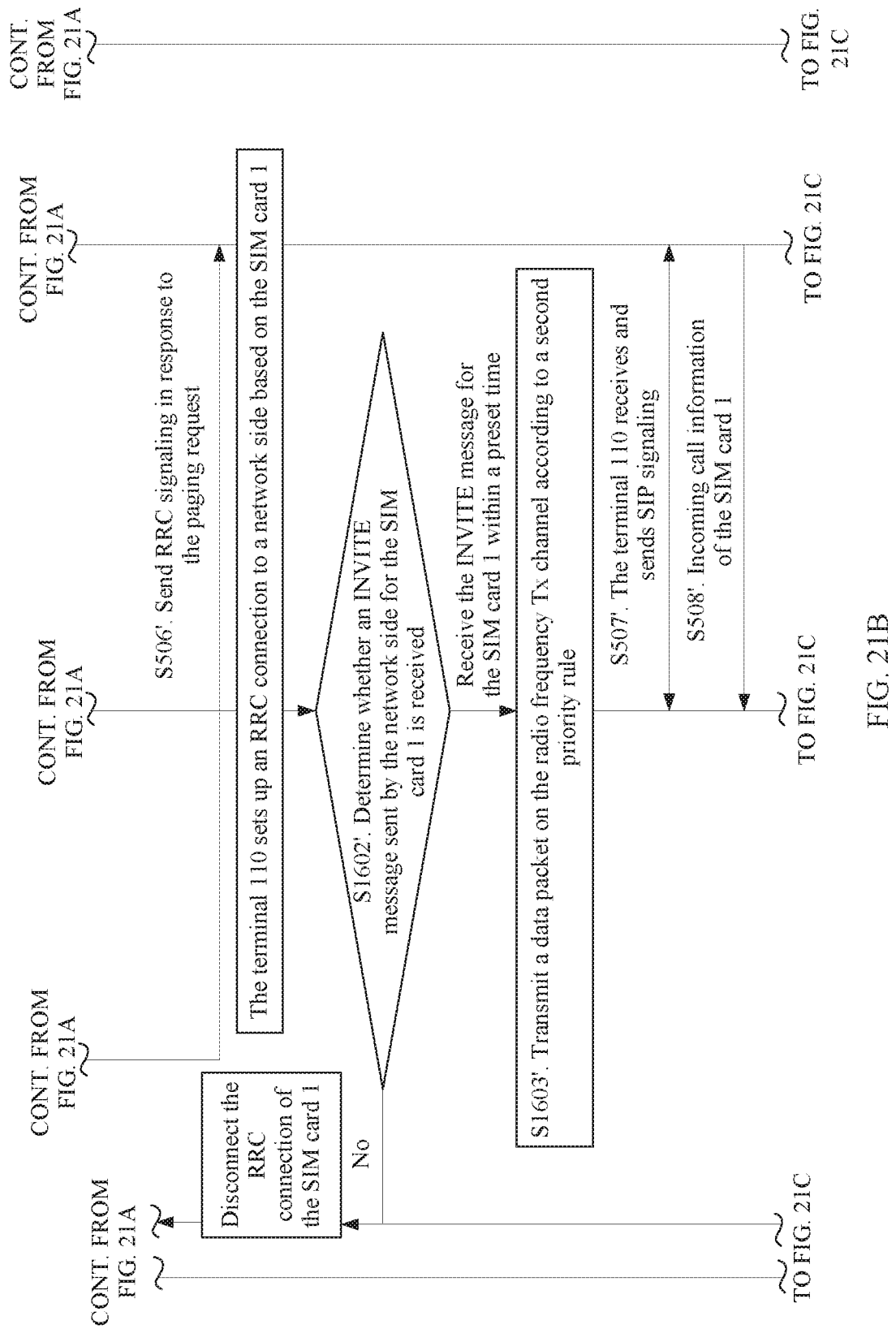
Figure 22A:
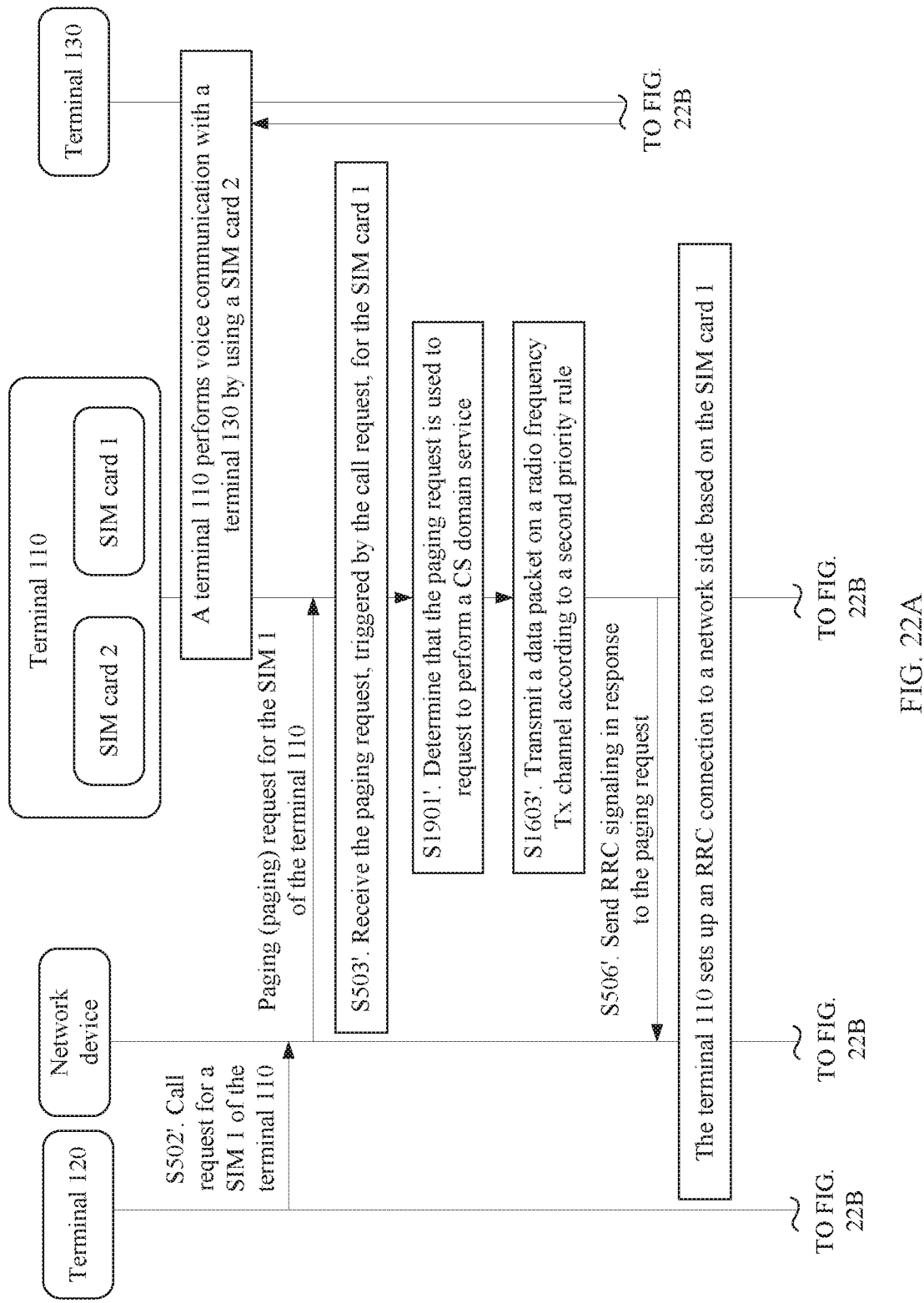
FIG. 22A and FIG. 22B are a flowchart 10 of a communication method for implementing dual card dual standby dual pass according to an embodiment of the present invention.
Figure 22B:
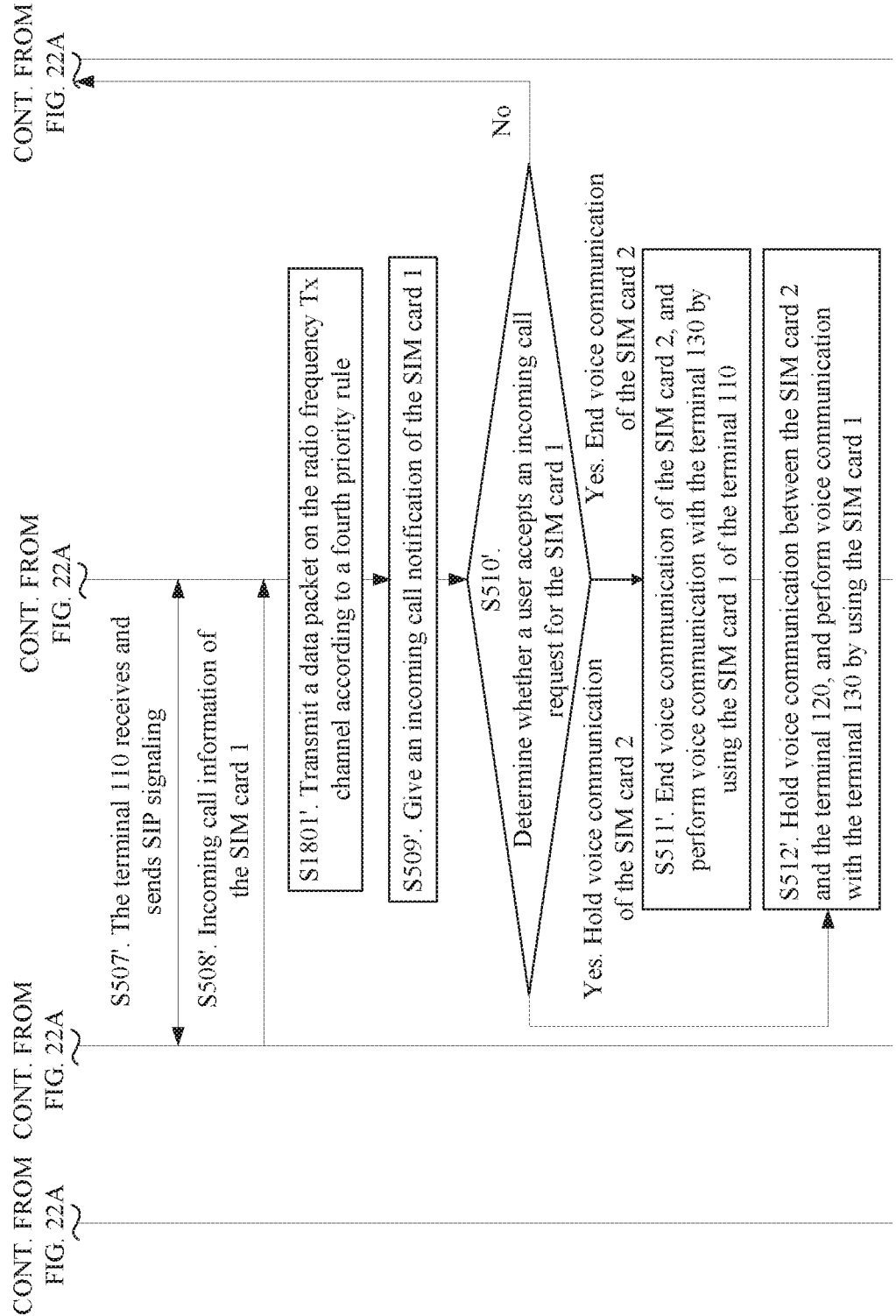

In some embodiments, in a process in which the terminal 110 performs voice communication with the terminal 130 by using the SIM card 2 after ending voice communication with the terminal 120 (namely, S511), although the SIM card 1 of the terminal 110 ends voice communication, there is a network access data service on the SIM card 1. To ensure that the network access data service of the SIM card 1 is normally performed without imposing relatively great impact on voice communication quality of the call card (namely, the SIM card 2), the terminal 110 can transmit a data packet on the radio frequency Tx channel according to a third priority rule. After S511, the method in this embodiment of the present invention may further include S2001. For example, as shown in FIG. 20A, FIG. 20B, and FIG. 20C, after S511 shown in FIG. 18A and FIG. 18B, the method in this embodiment of the present invention may further include S2001:

S2001. The terminal 110 transmits a data packet on the radio frequency Tx channel according to a third priority rule.

For example, the third priority rule may be:

1. A transmit priority of a high-priority packet of the call card (for example, the SIM card 2) on the radio frequency Tx channel is higher than a transmit priority of a network access data service packet of the access card (for example, the SIM card 1) on the radio frequency Tx channel.

2. The transmit priority of the network access data service packet of the access card (for example, the SIM card 1) on the radio frequency Tx channel is higher than the transmit priorities of the low-priority packets of the two cards on the radio frequency Tx channel.

For example, FIG. 5 shows an example of a third priority rule provided in this embodiment of the present invention.

TABLE 5

Third priority rule table

| Priority | Packet transmitted on a radio frequency Tx channel |
|---|---|
| High | High-priority packet of a call card |
| ↑ | Network access data service packet of an access card |
| | Low-priority packets of two cards |
| Low | |

High-priority packets of the call card may include a signaling packet, an uplink voice packet, an ACK packet, and an SR packet of the call card. Normal transmission of the signaling packet, the uplink voice packet, the ACK packet, and the SR packet of the call card can ensure that a voice service of the call card is not affected. Therefore, a transmit priority of the high-priority packet of the call card on the radio frequency Tx channel is the highest, so that voice communication of the call card is not affected.

In addition, the low-priority packets of the two cards may include a null packet, a CQI packet, and an SRS packet of the call card, and a null packet, a CQI packet, and an SRS packet of the access card. Even delayed transmission of null packets, CQI packets, and SRS packets of the call card and the call card does not affect voice communication of the call card. To mitigate impact of the low-priority packets of the two cards on the network access data service packet of the access card, the terminal 110 may set that the transmit priority of the network access data service packet of the access card (for example, the SIM card 1) on the radio frequency Tx channel is higher than the transmit priorities of the low-priority packets of the two cards on the radio frequency Tx channel.

Further, in a process in which the terminal 110 performs voice communication with the terminal 130 by using the SIM card 2 of the terminal 110, there may be a paging request initiated by another terminal (for example, the terminal 120) to the SIM card 1 of the terminal 110. For a processing method after the SIM card 1 of the terminal 110 receives the paging request, refer to S502' to S512', S1601' to S1603', S1801', and S1901'. In other words, in the process in which the terminal 110 performs voice communication with the terminal 130 by using the SIM card 2, the foregoing S502 to S512 may be replaced with S502' to S512', S1601 to S1603 may be replaced with S1601' to S1603', S1801 may be replaced with S1801', and S1901 can be replaced with S1901'.

For example, as shown in FIG. 21A, FIG. 20B, and FIG. 21C or FIG. 22A and FIG. 22B, in a process in which the terminal 110 performs voice communication with the terminal 130 by using the SIM card 2 of the terminal 110, the method in this embodiment of the present invention may include all or some steps of the following:

S502'. The terminal 120 initiates a call request to the SIM card 1 of the terminal 110.

S503'. The terminal 110 receives a paging request, triggered by the call request, for the SIM card 1.

After S503', the method in this embodiment of the present invention may further include S504' and S505':

S504'. When the terminal 110 receives the paging request for the SIM card 1, if there is a to-be-sent voice packet of the SIM card 2, the terminal 110 delays responding to the paging request for the SIM card 1.

S505'. When the terminal 110 receives the paging request for the SIM card 1, if there is no to-be-sent voice packet of the SIM card 2, the terminal 110 immediately responds to the paging request for the SIM card 1.

The terminal 110 may perform S506' and a subsequent method procedure in response to the paging request.

S506'. The terminal 110 sends RRC signaling to the network device in response to the paging request, and sets up an RRC connection to the network device based on the SIM card 1.

S507'. The terminal 110 exchanges SIP signaling with the network device.

S508'. The terminal 110 receives incoming call information, sent by the network device, of the SIM card 1.

S509'. The terminal 110 gives an incoming call notification of the SIM card 1.

S510'. The terminal 110 determines whether a user accepts an incoming call request for the SIM card 1.

If the user chooses to decline the incoming call request for the SIM card 1, and continues with a voice call of the SIM card 2, the terminal 110 can disconnect the RRC connection to the SIM card 1. If the user chooses to hang up the voice call of the SIM card 2, and accepts a voice call of the SIM card 1, the terminal 110 can continue with S511'. If the user chooses to hold the voice call of the SIM card 1 and accept the voice call of the SIM card 2, S512' can be further performed.

S511'. The terminal 110 ends voice communication of the SIM card 2, and performs voice communication with the terminal 130 by using the SIM card 1 of the terminal 110.

S512'. The terminal 110 holds voice communication between the SIM card 2 and the terminal 120, and performs voice communication with the terminal 130 by using the SIM card 1.

S1601'. The terminal 110 transmits a data packet on the radio frequency Tx channel according to a fourth priority rule.

Although the SIM card 1 of the terminal 110 ends voice communication, there may be a network access data service transmitted on the SIM card 1. To mitigate impact of the low-priority packets of the two cards on the network access data service packet of the access card, in the fourth priority rule, the transmit priority of the network access data service packet of the access card (for example, the SIM card 2) on the radio frequency Tx channel is higher than the transmit priorities of the low-priority packets of the two cards on the radio frequency Tx channel.

For example. Table 6 shows an example of the fourth priority rule provided in this embodiment of the present invention.

TABLE 6

Fourth priority rule table

| Priority | Packet transmitted on a radio frequency Tx channel |
|---|---|
| High | High-priority packet of a call card |
| ↑ | Signaling packet of an access card |
| | Network access data service packet of an access card |
| Low | |
| | Low-priority packets of two cards |

S1602'. The terminal 110 determines whether an INVITE message sent by the network device for the SIM card 1 is received.

Because there may be a data service on the SIM card 1, after S1602' is performed, if the SIM card 1 receives no INVITE message within a preset time, or after S510' is performed, if the user declines the incoming call request for the SIM card 1, the terminal 110 may not disconnect the RRC connection.

It should be noted that the foregoing tables (such as Table 4 to Table 8) in this embodiment of the present invention merely provide some examples of priority rules in this embodiment of the present invention, and the priority rules in this embodiment of the present invention include but are not limited to the priority rules described above. In addition, the priority rules of the terminal 110 in this embodiment of the present invention include but are not limited to priority rules such as the first priority rule, the second priority rule, the third priority rule, and the fourth priority rule in this embodiment of the present invention. Various different priority rules may be set in the terminal 110 for the terminal 110 to select and use, so that while ensuring voice communication quality of the call card, the access card can use the radio frequency Tx channel to send the SIP signaling and interact with the network device after receiving the paging request, to obtain the incoming call information, and give an incoming call notification by ringing.

S1603'. The terminal 110 transmits a data packet on the radio frequency Tx channel according to the second priority rule.

S1801'. The terminal 110 transmits a data packet on the radio frequency Tx channel according to the fourth priority rule.

S1901'. The terminal 110 determines that the paging request is used to request to perform a CS domain service.

According to the communication method for implementing dual card dual standby dual pass provided in this embodiment of the present invention, in a process in which the terminal 110 performs voice communication with the terminal 120 by using the SIM card 1, if the SIM card 2 of the terminal 110 receives the paging request sent by the terminal 130, the terminal 110 can control, based on transmit priorities of various data packets of the SIM card 1 and the SIM card 2 on the radio frequency Tx channel, the SIM card 1 or the SIM card 2 to occupy the radio frequency Tx resource, so that the SIM card 2 can respond, in an interval when the SIM card 1 occupies the radio frequency Tx resource to send a voice packet, to the received paging request to set up a connection to the network device, to obtain the incoming call information of the SIM card 2, and give a notification for the user by ringing. According to this solution, the terminal 110 can implement dual card dual standby dual pass of the terminal without affecting voice call quality of the call card, to improve user experience.

The solutions provided in this embodiment of this application are described above from the following perspective: The terminal sends uplink data packets of the first communications connection and the second communications connection on the radio frequency transmit resource. It can be understood that, in order to implement the foregoing functions, the terminal includes corresponding function modules for executing the functions. A person skilled in the art should be easily aware that, in combination with the example terminal and algorithm steps described in the embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

The terminal may be divided according to the foregoing method examples in the embodiments of this application. For example, modules or units may be divided to correspond to the functions, or two or more functions may be integrated into a processing module. The foregoing integrated module may be implemented in a form of hardware, or may be implemented in a form of a software module or unit. The division of modules or units in the embodiments of this application is an example, and is merely logical function division, and there may be another division manner in actual implementation.

Figure 23:
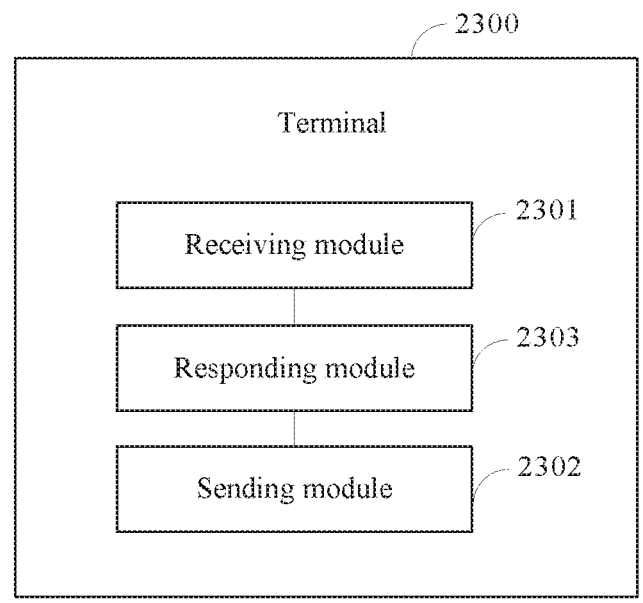
FIG. 23 is a schematic structural diagram 1 of a terminal according to an embodiment of the present invention.

FIG. 23 is a possible schematic structural diagram of a terminal related to the foregoing embodiments. The terminal 2300 includes a first SIM card interface and a second SIM card interface, where the first SIM card interface is configured to communicate with a first SIM card (namely, the foregoing SIM card 1), and the second SIM card interface is configured to communicate with a second SIM card (namely, the foregoing SIM card 2). As shown in FIG. 23, the terminal 2300 includes: a receiving module 2301, a sending module 2302, and a responding module 2303.

The receiving module 1301 is configured to support the operation of receiving the downlink data packet in "the terminal 110 performs voice communication with the terminal 120" in S501, the operation of receiving the SIP signaling in "the terminal 110 exchanges SIP signaling with the network device" in S503, S507 and S507', the operation of receiving the downlink data packet in "the terminal 110 performs voice communication" in S508, S511, S511', S512, and S512', and operations in S503' and S508' in the method embodiment, and/or other processes of the technologies described in this specification.

The sending module 2302 is configured to support the operation of sending the uplink data packet in "the terminal 110 performs voice communication with the terminal 120" in S501, the operation of sending the RRC signaling in S506 and S506', the operation of sending the SIP signaling in "the terminal 110 exchanges SIP signaling with the network device" in S507 and S507', the operation of sending the uplink data packet in "the terminal 110 performs voice communication" in S511, S511', S512, and S512', and operations in S1601, S1603, S1801, S2001, S506', S1601', S1603', and S1801' in the method embodiment, and/or other processes of the technologies described in this specification.

The responding module 2303 is configured to support S504, S505, S504', and S505' in the method embodiment, and/or other processes of the technologies described in this specification.

Figure 24:
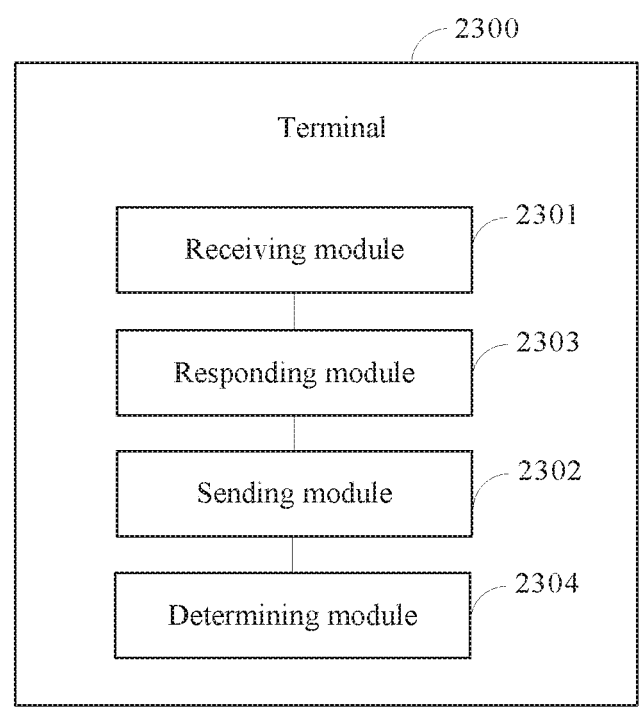
FIG. 24 is a schematic structural diagram 2 of a terminal according to an embodiment of the present invention.

Further, as shown in FIG. 24, the terminal 2300 may further include a determining module 2304. The determining module 2304 is configured to support S1602 and S1602' in the method embodiment, and/or other processes of the technologies described in this specification.

Further, the terminal 2300 may further include a storage module. The storage module is configured to store priority rules such as the first priority rule, the second priority rule, the third priority rule, and the fourth priority rule in the embodiments of the present invention.

Further, the terminal 2300 may further include a display module. The display module is configured to display an incoming call notification interface of the terminal 2300. For example, the display module is configured to display the GUI shown in any one of FIG. 9A, FIG. 9B, FIG. 11A, FIG. 11B, FIG. 11C, FIG. 12A, FIG. 12B, FIG. 12C, FIG. 13A, FIG. 13B, FIG. 13C, FIG. 14A, FIG. 14B, FIG. 14C, and FIG. 14D.

Further, the terminal 2300 may further include a judgment module. The judgment module is configured to support S510 and S510' in the method embodiment, and/or other processes of the technologies described in this specification.

Further, the terminal 2300 may further include a setup module. The setup module is configured to support the operation of "setting up an RRC connection" in S506 and S506' in the method embodiment.

Figure 25:
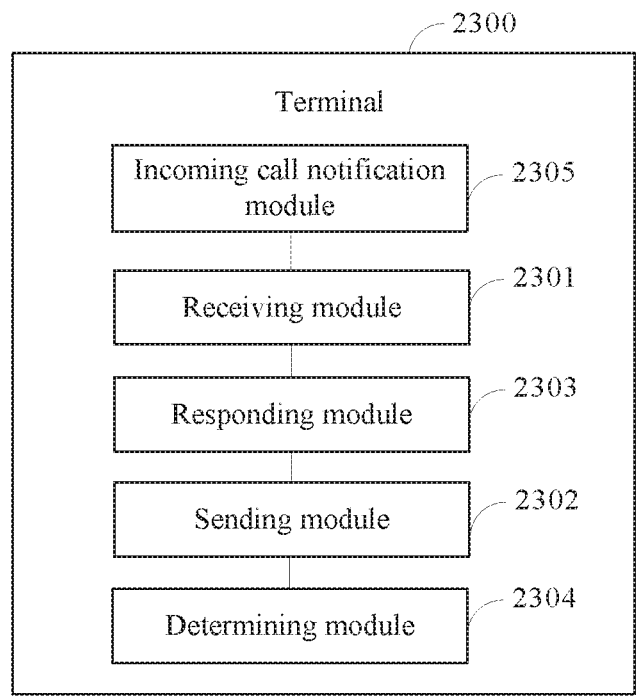
FIG. 25 is a schematic structural diagram 3 of a terminal according to an embodiment of the present invention.

Further, as shown in FIG. 25, the terminal 2300 may further include an incoming call notification module 2305. The incoming call notification module 2305 is configured to support S509 and S509' in the method embodiment, and/or other processes of the technologies described in this specification.

Further, the terminal 2300 may further include another determining module. The another determining module is configured to support S1901 and S1901' in the method embodiment, and/or other processes of the technologies described in this specification.

Certainly, the terminal 2300 includes but is not limited to the units and modules listed above. For example, the terminal 2300 may further include a control module supporting the operation of "ending voice communication with the SIM card 1" in S511. In addition, specific functions that can be implemented by the foregoing modules include but are not limited to the functions corresponding to the method steps described in the foregoing embodiment. For detailed descriptions about other units of the terminal 2300 and the units of the terminal 2300, refer to detailed descriptions about the corresponding method steps. Details are not described herein in this embodiment of this application.

When an integrated unit is used, the responding module 2303, the judgment module, the setup module, the incoming call notification module 2305, the determining module 2304, and the like may be integrated in one processing unit for implementation. The processing unit may be a processor or a controller, for example, may be a central processing unit (Central Processing Unit, CPU), a general purpose processor, a digital signal processor (Digital Signal Processor, DSP), an application-specific integrated circuit (Application-Specific Integrated Circuit, ASIC), a field programmable gate array (Field Programmable Gate Array, FPGA), or another programmable logical device, a transistor logic device, a hardware component, or any combination thereof. The processing unit can implement or perform various example logical blocks, modules, and circuits described with reference to content disclosed in this application. Alternatively, the processing unit may be a combination implementing a computing function, for example, a combination including one or more microprocessors, or a combination of a DSP and a microprocessor. The storage module 2304 may be a memory. The display module may be a display.

Figure 26:
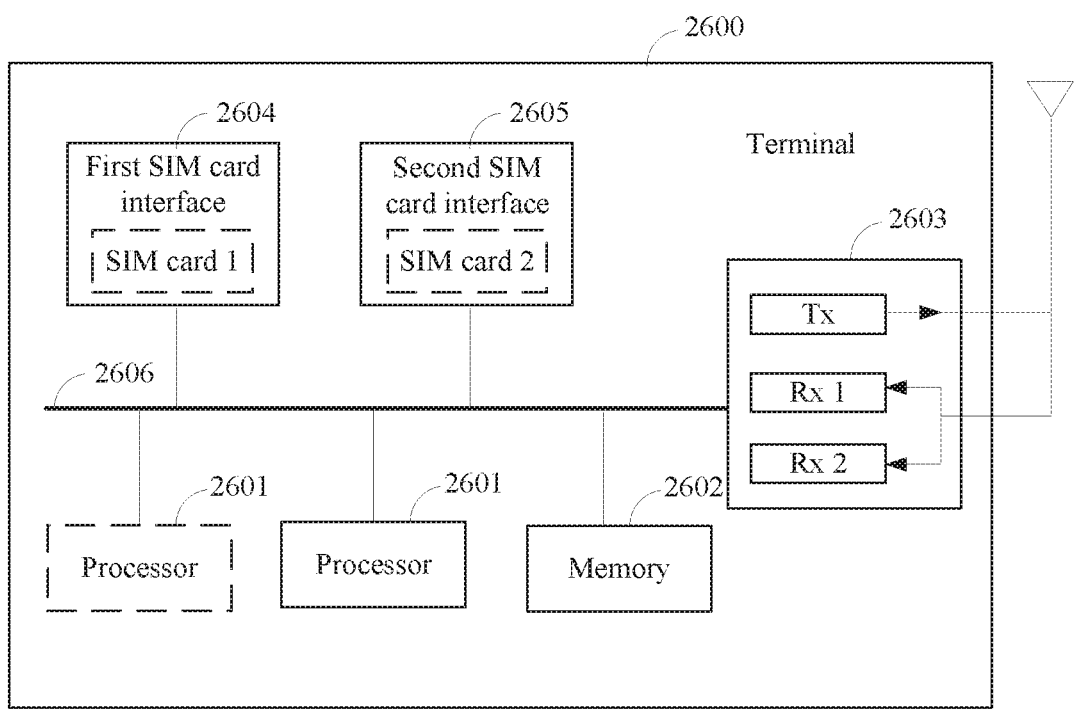
FIG. 26 is a schematic structural diagram 4 of a terminal according to an embodiment of the present invention.

When the processing unit is a processor, the storage module is a memory, and the sending module and the receiving module are a communications interface, the terminal 2300 in this embodiment of this application may be a terminal 2600 shown in FIG. 26. The terminal 2600 supports DR-RSDS, and the terminal 2600 includes: one or more processors 2601, a memory 2602, a communications interface 2603, a first SIM card interface 2604, and a second SIM card interface 2605.

The memory 2602, the communications interface 2603, the first SIM card interface 2604, and the second SIM card interface 2605 are coupled to one or more processors 2601. For example, as shown in FIG. 27, the memory 2602, the communications interface 2603, the first SIM card interface 2604, the second SIM card interface 2605, and the processor 2601 may be connected through a bus 2606.

The first SIM card interface 2604 is configured to communicate with the first SIM card, the second SIM card interface 2605 is configured to communicate with the second SIM card, and the communications interface 2603 includes two radio frequency receive channels (for example, a radio frequency Rx 1 channel and a radio frequency Rx 2 channel) and one radio frequency transmit channel (for example, a radio frequency Tx channel). The memory 2602 is configured to store computer program code, where the computer program code includes an instruction, and when the one or more processors 2601 execute the instruction, the terminal 2600 performs the communication method for implementing dual card dual standby dual pass shown in any one of FIG. 5, FIG. 10, and FIG. 15A and FIG. 15B to FIG. 22A and FIG. 22B.

The bus 2606 may be a Peripheral Component Interconnect (Peripheral Component Interconnect, PCI) bus, an Extended industry Standard Architecture (Extended Industry Standard Architecture, EISA) bus, or the like. The bus 2606 may be classified into an address bus, a data bus, a control bus, and the like. For ease of representation, only one thick line is used to represent the bus in FIG. 26, but this does not mean that there is only one bus or only one type of bus.

An embodiment of the present invention further provides a computer storage medium, where the computer storage medium stores computer program code, and when a processor 2601 of a terminal 2600 executes the computer program code, the terminal 2600 performs the related method steps in any one of FIG. 5, FIG. 10, and FIG. 15A and FIG. 15B to FIG. 22A and FIG. 22B, to implement the communication method for implementing dual card dual standby dual pass in the foregoing embodiments.

An embodiment of the present invention further provides a computer program product, and when the computer program product runs on a computer, the computer performs the related method steps in any one of FIG. 5. FIG. 10, and FIG. 15A and FIG. 159 to FIG. 22A and FIG. 22B, to implement the communication method for implementing dual card dual standby dual pass in the foregoing embodiments.

The terminal, computer storage medium, and computer program product provided in the embodiments of the present invention are all configured to perform the corresponding method provided above. Therefore, for beneficial effects that can be achieved thereby, refer to the beneficial effects in the corresponding method provided above. Details are not described herein again.

The foregoing descriptions about implementations allow a person skilled in the art to understand that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or part of the functions described above. For a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in another manner. For example, the described apparatus embodiment is merely an example. For example, the module or unit division is merely logical function division and may be another division in actual implementation. For example, a plurality of units or components may be combined or integrated into another system, or some features may be ignored or not performed. In addition, the displayed or discussed mutual couplings or direct couplings or communications connections may be implemented through some interfaces. The indirect couplings or communications connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to an actual requirement, to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) or a processor to perform all or some of the steps of the methods described in the embodiments of this application. The foregoing storage medium includes: any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A communication method for implementing dual card dual standby dual pass, implemented by a terminal supporting dual receive single transmit dual card dual standby single pass (DR-DSDS), wherein the communication method comprises:
   receiving a paging request for setting up a second communications connection when the terminal is in a first communications connection, wherein the first communications connection is a voice call related to a first subscriber identity module (SIM) card of the terminal and the second communications connection is related to a second SIM card of the terminal;
   delaying responding to the paging request when the terminal has a to-be-sent voice packet of the first communications connection; and
   responding to the paging request when the terminal does not have the to-be-sent voice packet.

2. The communication method of claim 1, wherein the method further comprises:
   determining whether the second communications connection is a voice call related to the second SIM card; and
   processing the first communications connection when the second communications connection is not the voice call related to the second SIM card.

3. The communication method of claim 2, wherein determining whether the second communications connection is the voice call related to the second SIM card comprises:
   sending, to a network device, radio resource control (RRC) signaling for setting up an RRC connection;
   sending session initiating protocol (SIP) signaling to the network device; and
   determining, based on whether the terminal can receive an INVITE message, whether the second communications connection is the voice call related to the second SIM card.

4. The communication method of claim 2, wherein determining whether the second communications connection is the voice call related to the second SIM card comprises determining, based on the paging request for setting up the second communications connection, whether the second communications connection is the voice call related to the second SIM card.

5. The communication method of claim 2, wherein the method further comprises providing an incoming call notification of the second communications connection when the second communications connection is the voice call related to the second SIM card.

6. The communication method of claim 5, wherein before providing the incoming call notification of the second communications connection, a transmit priority rule stored by the terminal indicates that a first priority for sending an uplink data packet of the second communications connection is higher than a second priority for sending an uplink data packet of the first communications connection.

7. The communication method of claim 5, wherein while providing the incoming call notification of the second communications connection, a transmit priority rule stored by the terminal indicates that a first priority for sending an uplink voice packet of the first communications connection is higher than a second priority for sending an uplink signaling packet of the second communications connection.

8. The communication method of claim 2, wherein after the terminal provides an incoming call notification of the second communications connection, and when the terminal ends the first communications connection and is in the second communications connection, a transmit priority rule stored by the terminal indicates that a first priority for sending an uplink voice packet of the second communications connection by the terminal is higher than a second priority for sending an uplink network access data packet of the first communications connection.

9. The communication method of claim 1, wherein the first SIM card is a primary SIM card of the terminal and the second SIM card is a secondary SIM card of the terminal.

10. A terminal comprising:
   one or more processors;
   a communications interface coupled to the one or more processors, wherein the communications interface comprises two radio frequency receive channels and one radio frequency transmit channel;
   a first subscriber identity module (SIM) card interface coupled to the one or more processors and configured to communicate with a first SIM card;
   a second SIM card interface coupled to the one or more processors and configured to communicate with a second SIM card; and
   a memory coupled to the one or more processors and storing one or more programs that, when executed by the one or more processors, cause the terminal to be configured to:
     receive a paging request for setting up a second communications connection when the terminal is in a first communications connection, wherein the first communications connection is a voice call related to the first SIM card, and wherein the second communications connection is related to the second SIM card;

delay responding to the paging request for setting up the second communications connection when the terminal has a to-be-sent voice packet of the first communications connection; and respond to the paging request for setting up the second communications connection when the terminal does not have the to-be-sent voice packet of the first communications connection.

11. The terminal of claim 10, wherein the one or more programs further cause the terminal to be configured to:

determine whether the second communications connection is a voice call related to the second SIM card; and process the first communications connection when the second communications connection is not the voice call related to the second SIM card.

12. The terminal of claim 10, wherein the one or more programs cause the terminal to determine whether the second communications connection is the voice call related to the second SIM card by causing the terminal to:

send, to a network device, radio resource control (RRC) signaling for setting up an RRC connection;

send session initiating protocol (SIP) signaling to the network device; and determine, based on whether the terminal can receive an INVITE message, whether the second communications connection is the voice call related to the second SIM card.

13. The terminal of claim 10, wherein the one or more programs cause the terminal to determine whether the second communications connection is the voice call related to the second SIM card by causing the terminal to determine, based on the paging request for setting up the second communications connection, whether the second communications connection is the voice call related to the second SIM card.

14. The terminal of claim 10, wherein the one or more programs further cause the terminal to provide an incoming call notification of the second communications connection when the second communications connection is the voice call related to the second SIM card.

15. The terminal of claim 14, wherein the memory further stores a transmit priority rule, and wherein before the terminal provides the incoming call notification of the second communications connection, the transmit priority rule indicates that a first priority for sending an uplink data packet of the second communications connection is higher than a second priority for sending an uplink data packet of the first communications connection.

16. The terminal of claim 14, wherein the memory further stores a transmit priority rule, and wherein while the terminal provides the incoming call notification of the second communications connection, the transmit priority rule indicates that a first priority for sending an uplink voice packet of the first communications connection is higher than a second priority for sending an uplink signaling packet of the second communications connection.

17. The terminal of claim 10, wherein the memory further stores a transmit priority rule, and wherein after the terminal provides an incoming call notification of the second communications connection, and when the terminal ends the first communications connection and is in the second communications connection, the transmit priority rule indicates that a first priority for sending an uplink voice packet of the second communications connection is higher than a second priority for sending an uplink network access data packet of the first communications connection.

18. The terminal of claim 10, wherein the first SIM card is a primary SIM card of the terminal and the second SIM card is a secondary SIM card of the terminal.

19. The terminal of claim 10, wherein the first SIM card is a secondary SIM card of the terminal and the second SIM card is a primary SIM card of the terminal.

20. An apparatus, comprising:

a processor; and a memory coupled to the processor and storing computer-executable instructions that, when executed by the processor, cause the processor to be configured to control a terminal comprising a first subscriber identity module (SIM) card and a second SIM card to:

delay responding to a paging request for setting up a second communications connection when the terminal is in a first communications connection and when the terminal has a to-be-sent voice packet of the first communications connection, wherein the first communications connection is a voice call related to the first SIM card and the second communications connection is related to the second SIM card; and respond to the paging request when the terminal does not have the to-be-sent voice packet.

* * * * *